US008155342B2

(12) United States Patent
Marlowe

(10) Patent No.: US 8,155,342 B2
(45) Date of Patent: *Apr. 10, 2012

(54) MULTIMEDIA DEVICE INTEGRATION SYSTEM

(76) Inventor: Ira Marlowe, Fort Lee, NJ (US)

( * ) Notice: Subject to any disclaimer, the term of this patent is extended or adjusted under 35 U.S.C. 154(b) by 516 days.

This patent is subject to a terminal disclaimer.

(21) Appl. No.: 11/475,847

(22) Filed: Jun. 27, 2006

(65) Prior Publication Data

US 2007/0015486 A1  Jan. 18, 2007

Related U.S. Application Data

(63) Continuation-in-part of application No. 11/071,667, filed on Mar. 3, 2005, which is a continuation-in-part of application No. 10/732,909, filed on Dec. 10, 2003, which is a continuation-in-part of application No. 10/316,961, filed on Dec. 11, 2002, now Pat. No. 7,489,786.

(51) Int. Cl.
*H04B 1/00* (2006.01)

(52) U.S. Cl. ............................. 381/86; 701/36; 455/345

(58) Field of Classification Search .................. 381/86; 340/825.24; 700/94; 710/303; 455/99, 3.06; 348/837, 838; 725/75; 701/36
See application file for complete search history.

(56) References Cited

U.S. PATENT DOCUMENTS 3,940,743 A  2/1976 Fitzgerald .................. 340/172.5
(Continued)

FOREIGN PATENT DOCUMENTS
CN  1474252 A  2/2004
(Continued)

OTHER PUBLICATIONS

Gilroy, Amy, "Blitz Safe Bows New SkyLink," This Week in Consumer Electronics (TWICE), Nov. 24, 2003 (1 page).

(Continued)

*Primary Examiner* — Xu Mei
(74) *Attorney, Agent, or Firm* — Anatoly S. Weiser, Esq.; Acuity Law Group

(57) ABSTRACT

An multimedia device integration system is provided. One or more after-market audio or video devices, such as a CD player, CD changer, digital media device (e.g., MP3 player, MP4 player, WMV player, Apple iPod, portable media center, or other device) satellite receiver (e.g., XM or Sirius receiver), DAB receiver, video device (e.g., DVD player), cellular telephone, or any other device or combinations thereof, is integrated for use with an existing OEM or after-market car stereo or video system, wherein control commands can be issued at the car stereo or video system and data from the after-market device can be displayed on the car stereo or video system. Control commands generated at the car stereo or video system are received, processed, converted into a format recognizable by the after-market device, and dispatched to the after-market device for execution. Information from the after-market device is converted into a format recognizable by the car stereo or video system, and dispatched to the car stereo or video system for display thereon. One or more auxiliary input sources can be integrated with the car stereo or video system, and selected using the controls of the car stereo or video system. A docking station is provided for docking a portable audio or video device for integration with the car stereo or video system. Wireless integration between the portable audio or video device and a car stereo or video system is provided, and voice recognition and speech synthesis capabilities are provided in the portable audio or video device or the car stereo or video system.

121 Claims, 36 Drawing Sheets

U.S. PATENT DOCUMENTS

| | | | | |
|---|---|---|---|---|
| 4,047,162 | A | 9/1977 | Dorey et al. | 364/200 |
| 4,068,104 | A | 1/1978 | Werth et al. | 179/175.3 |
| 4,091,455 | A | 5/1978 | Woods et al. | 364/200 |
| 4,234,919 | A | 11/1980 | Bruce et al. | 364/200 |
| 4,562,533 | A | 12/1985 | Hodel et al. | 364/200 |
| 4,772,079 | A | 9/1988 | Douglas et al. | 312/257 |
| 4,817,130 | A | 3/1989 | Frimmel, Jr. | 379/88 |
| 4,943,978 | A | 7/1990 | Rice | 375/1 |
| 5,263,199 | A | 11/1993 | Barnes et al. | |
| RE34,536 | E | 2/1994 | Frimmel, Jr. | 379/88 |
| 5,339,362 | A | 8/1994 | Harris | 381/86 |
| 5,410,675 | A | 4/1995 | Shreve et al. | 395/500 |
| 5,537,673 | A | 7/1996 | Nagashima et al. | |
| 5,794,164 | A | 8/1998 | Beckert et al. | 701/1 |
| 5,808,373 | A | 9/1998 | Hamanishi et al. | |
| 5,859,628 | A | 1/1999 | Ross et al. | |
| 5,897,155 | A | 4/1999 | Kerner et al. | |
| 5,978,689 | A | 11/1999 | Tuoriniemi et al. | |
| 6,005,488 | A | 12/1999 | Symanow et al. | 340/825.56 |
| 6,052,603 | A | 4/2000 | Kinzalow et al. | 455/557 |
| 6,058,319 | A | 5/2000 | Sadler | 455/569 |
| 6,134,456 | A * | 10/2000 | Chen | 455/569.2 |
| 6,157,725 | A | 12/2000 | Becker | 381/86 |
| 6,163,079 | A | 12/2000 | Miyazaki et al. | 307/10.1 |
| 6,163,711 | A | 12/2000 | Juntunen et al. | |
| 6,175,789 | B1 | 1/2001 | Beckert et al. | |
| 6,192,340 | B1 | 2/2001 | Abecassis | |
| 6,243,645 | B1 * | 6/2001 | Moteki et al. | 701/211 |
| 6,255,961 | B1 | 7/2001 | Van Ryzin et al. | |
| 6,278,697 | B1 | 8/2001 | Brody et al. | 370/310 |
| 6,282,464 | B1 | 8/2001 | Obradovich | |
| 6,295,033 | B1 | 9/2001 | Chatzipetros et al. | 343/713 |
| 6,330,337 | B1 | 12/2001 | Nicholson et al. | 381/86 |
| 6,346,917 | B1 | 2/2002 | Fuchs et al. | 343/713 |
| 6,374,177 | B1 | 4/2002 | Lee et al. | 701/200 |
| 6,389,332 | B1 | 5/2002 | Hess et al. | 701/1 |
| 6,389,560 | B1 | 5/2002 | Chew | |
| 6,396,164 | B1 | 5/2002 | Barnea et al. | 307/10.1 |
| 6,397,086 | B1 | 5/2002 | Chen | |
| 6,411,823 | B1 | 6/2002 | Chen | |
| 6,529,804 | B1 | 3/2003 | Draggon et al. | |
| 6,539,358 | B1 * | 3/2003 | Coon et al. | 704/275 |
| 6,591,085 | B1 | 7/2003 | Grady | 455/42 |
| 6,608,399 | B2 | 8/2003 | McConnell et al. | |
| 6,622,083 | B1 | 9/2003 | Knockeart et al. | |
| 6,629,197 | B1 | 9/2003 | Bhogal et al. | 711/111 |
| 6,648,661 | B1 | 11/2003 | Byrne et al. | 439/188 |
| 6,653,948 | B1 | 11/2003 | Kunimatsu et al. | 340/995.19 |
| 6,678,892 | B1 * | 1/2004 | Lavelle et al. | 725/75 |
| 6,721,489 | B1 | 4/2004 | Benyamin et al. | |
| 6,772,212 | B1 | 8/2004 | Lau et al. | |
| 6,816,577 | B2 | 11/2004 | Logan | |
| 6,889,064 | B2 | 5/2005 | Baratono et al. | |
| 6,990,208 | B1 | 1/2006 | Lau et al. | |
| 6,993,615 | B2 | 1/2006 | Falcon | 710/303 |
| 7,031,477 | B1 * | 4/2006 | Mella et al. | 381/86 |
| 7,062,255 | B2 | 6/2006 | Nakanaga | |
| 7,151,950 | B1 | 12/2006 | Oyang et al. | |
| 7,187,947 | B1 | 3/2007 | White et al. | |
| 7,288,918 | B2 | 10/2007 | DiStefano | |
| 7,324,833 | B2 | 1/2008 | White et al. | |
| 7,440,772 | B2 | 10/2008 | White et al. | |
| 7,486,926 | B2 | 2/2009 | White et al. | |
| 7,489,786 | B2 | 2/2009 | Marlowe | |
| 7,493,645 | B1 * | 2/2009 | Tranchina | 725/75 |
| 2001/0044664 | A1 | 11/2001 | Mueller et al. | 700/94 |
| 2002/0009978 | A1 * | 1/2002 | Dukach et al. | 455/99 |
| 2002/0084910 | A1 | 7/2002 | Owens et al. | |
| 2002/0085730 | A1 | 7/2002 | Holland | 381/334 |
| 2002/0091863 | A1 | 7/2002 | Schug | 709/250 |
| 2002/0133610 | A1 | 9/2002 | Hadland | 709/230 |
| 2002/0180767 | A1 | 12/2002 | Northway et al. | 345/698 |
| 2002/0197954 | A1 | 12/2002 | Schmitt et al. | 455/41 |
| 2003/0007649 | A1 | 1/2003 | Riggs | 381/86 |
| 2003/0026440 | A1 * | 2/2003 | Lazzeroni et al. | 381/86 |
| 2003/0053638 | A1 | 3/2003 | Yasuhara | 381/86 |
| 2003/0069000 | A1 | 4/2003 | Kindo et al. | |
| 2003/0086699 | A1 | 5/2003 | Benyamin et al. | 386/96 |
| 2003/0156200 | A1 | 8/2003 | Romano et al. | |
| 2003/0215102 | A1 | 11/2003 | Marlowe | 381/77 |
| 2004/0091123 | A1 | 5/2004 | Stark et al. | 381/86 |
| 2004/0117442 | A1 * | 6/2004 | Thielen | 709/203 |
| 2004/0145457 | A1 | 7/2004 | Schofield et al. | |
| 2004/0151327 | A1 | 8/2004 | Marlowe | 381/86 |
| 2004/0266336 | A1 | 12/2004 | Patsiokas et al. | |
| 2005/0021190 | A1 | 1/2005 | Worrell et al. | |
| 2005/0172001 | A1 | 8/2005 | Zaner et al. | |
| 2005/0239434 | A1 | 10/2005 | Marlowe | 455/345 |
| 2005/0282600 | A1 | 12/2005 | Paradice | |
| 2007/0149115 | A1 | 6/2007 | White et al. | |
| 2007/0230099 | A1 | 10/2007 | Turner et al. | |
| 2007/0293183 | A1 | 12/2007 | Marlowe | |
| 2007/0294710 | A1 | 12/2007 | Meesseman | |
| 2008/0123285 | A1 | 5/2008 | Fadell et al. | |
| 2008/0125031 | A1 | 5/2008 | Fadell et al. | |
| 2009/0017866 | A1 | 1/2009 | White et al. | |
| 2009/0018682 | A1 | 1/2009 | Fadell et al. | |

FOREIGN PATENT DOCUMENTS

| | | |
|---|---|---|
| JP | 11-273321 | 10/1999 |
| JP | 2000-286874 | 10/2000 |
| KR | 1020010035788 | 5/2001 |
| KR | 1020010059192 | 7/2001 |
| WO | WO 2004/053722 | 6/2004 |
| WO | WO 2006/094281 | 9/2006 |
| WO | WO 2008/002954 | 1/2008 |

OTHER PUBLICATIONS

Gilroy, Amy, "XM Exceeds Forecasts," This Week in Consumer Electronics (TWICE), Nov. 24, 2003 (2 pages).

"BlitzSafe News," http://www.blitzsafe.com/blitz_news/news031124/body_news031124.html, Nov. 24, 2003 (1 page).

"XM Satellite Radio Introduces XM Direct," http://www.blitzsafe.com/blitz_news/news031117/body_news031117.html, Nov. 17, 2003 (3 pages).

"Digital Audio Radio," http://www.blitzsafe.com/blitz_news/news052003a/body_news052003a.html, 2003 (4 pages).

"BlitzSafe Winner of 2003 Autosound Grand Prix Accessories Supplier of the Year," Audiovideo Magazine, Mar. 3, 2003 (1 page).

"BlitzSafe Releases World's First XM Satellite Radio, Auxiliary and CD Interfaces for Landrover Freelander 2003," http://www.blitzsafe.com/blitz_news/news092002b/body_news09002b.html, Sep. 16, 2002 (1 page).

"BlitzSafe Releases World's First XM Satellite Radio, Auxiliary and CD Interlaces for Lexus," http://www.blitzsafe.com/blitz_news/news092002a/body_news09002a.html, Sep. 14, 2002 (1 page).

Pohlmann, et al. "Satellite Radio A to Z," http://www.blitzsafe.com/blitz_news/news072002a/body_news072002a.html, 2002 (7 pages).

"BlitzSafe Launches XM and Six Interfaces for the 'Mini Cooper'," http://www.blitzsafe.com/blitz_news/news062002a/body_news062002a.html, Jun. 25, 2002 (1 page).

"Digital Connect," Mobile Electronics, May 2002 (1 page).

Solomon, Brett, "Selling 12V: OEM Integration," Dealerscope, May 2002 (1 page).

"XM Xtra:," Mobile Entertainment, Apr./May 2002 (1 page).

"Blitzsafe Introduces New Line of XM Digital Connect Cables," The 12 Volt News, Feb. 20, 2002 (2 pages).

"XM Radio Losses Mount As Do Subscribers," http://www.blitzsafe.com/blitz_news/news012002d/body_news012002d.html, Jan. 24, 2002 (3 pages).

"Blitzsafe Expects 3 Mil. XM Subscribers Within Three Years," http://www.blitzsafe.com/blitz_news/news012002c/body_news012002c.html, Jan. 2002 (1 page).

"XM Signs Over 30,000 Subscribers in First 8 Weeks," XM Radio, Jan. 7, 2002 (4 pages).

"BlitzSafe Unveils the First DVD Interface," Automedia, Feb. 1999 (1 page).

"MBALP V.2A2 CD Changer Converter Mercedes Benz Model for 1997 and 1996," http://www.blitzsafe.com/blitz_news/pr02111996/body_pr02111996.html, Jun. 11, 1996 (1 page).

"CD Changer Converter—Porsche Model Year 1996," http://www.blitzsafe.com/blitz_news/pr02071996/body_pr02071996.html, Feb. 7, 1996 (1 page).
"CD Changer Converter—Mercedes Benz 1996 MY," http://www.blitzsafe.com/blitz_news/pr08231995/body_pr08231995.html, Aug. 23, 1995 (1 page).
Office Action dated Jun. 5, 2006, from co-pending U.S. Appl. No. 10/316,961 (40 pages).
Office Action dated Nov. 14, 2006, from co-pending U.S. Appl. No. 10/316,961 (51 pages).
Office Action dated Apr. 19, 2007, from co-pending U.S. Appl. No. 10/316,961 (69 pages).
Office Action dated Jul. 12, 2007, from co-pending U.S. Appl. No. 10/316,961 (71 pages).
Office Action dated Feb. 20, 2008, from co-pending U.S. Appl. No. 10/316,961 (52 pages).
Interview Summary dated Apr. 9, 2008, from co-pending U.S. Appl. No. 10/316,961 (4 pages).
Interview Summary dated Apr. 21, 2008, from co-pending U.S. Appl. No. 10/316,961 (4 pages).
Office Action dated Aug. 8, 2006, from co-pending U.S. Appl. No. 10/732,909 (29 pages).
Interview Summary dated Dec. 15, 2006, from co-pending U.S. Appl. No. 10/732,909 (3 pages).
Interview Summary dated Jan. 3, 2007, from co-pending U.S. Appl. No. 10/732,909 (3 pages).
Office Action dated Apr. 20, 2007, from co-pending U.S. Appl. No. 10/732,909 (20 pages).
Office Action dated Oct. 3, 2007, from co-pending U.S. Appl. No. 10/732,909 (28 pages).
Interview Summary dated Oct. 26, 2007, from co-pending U.S. Appl. No. 10/732,909 (3 pages).
International Search Report of the International Searching Authority mailed May 12, 2004, issued in connection with International Patent Appln. No. PCT/US03/39493 (4 pages).
International Search Report of the International Searching Authority mailed Sep. 24, 2007, issued in connection with International Patent Appln. No. PCT/US06/008043 (4 pages).
Written Opinion of the International Searching Authority mailed Sep. 24, 2007, issued in connection with International Patent Appln. No. PCT/US06/008043 (5 pages).
International Preliminary Report on Patentability issued Oct. 16, 2007, issued in connection with International Patent Appln. No. PCT/US06/008043 (1 page).
Russian Official Action with translation, issued by the Patent Office of the Russian Federation on Dec. 24, 2007, in connection with Russian App. No. 2006101060 (21 pages).
Written Opinion, mailed by the Australian Patent Office on Aug. 28, 2007, in connection with Singapore App. No. 200601303-1 (6 pages).
International Search Report of the International Searching Authority mailed Sep. 25, 2008, issued in connection with International Patent Appln. No. PCT/US07/72182 (3 pages).
Written Opinion of the International Searching Authority mailed Sep. 25, 2008, issued in connection with International Patent Appln. No. PCT/US07/72182 (7 pages).
Office Action dated Jul. 9, 2008, from co-pending U.S. Appl. No. 10/732,909 (33 pages).
Notice of Allowance mailed Jul. 31, 2008, issued in connection with co-pending U.S. Appl. No. 10/316,961 (12 pages).
Notice of Allowance mailed Dec. 29, 2008, issued in connection with co-pending U.S. Appl. No. 10/316,961 (8 pages).
Office Action dated Feb. 24, 2009, from co-pending U.S. Appl. No. 10/732,909 (20 pages).
Mobile Electronics: News, "Soundgate to Release New GM and BMW Interfaces," Dec. 2, 2002, ME-Mag.com (1 page).
"Welcome to Ventura Technology," from Venturatechnology.com (2 pages).
Office Action dated Nov. 25, 2009, from co-pending U.S. Appl. No. 10/732,909 (16 pages).
Office Action dated Jun. 23, 2009, from co-pending U.S. Appl. No. 11/071,667 (9 pages).
Office Action dated Mar. 18, 2009, from co-pending U.S. Appl. No. 11/805,799 (10 pages).
Substantive Examination Adverse Report mailed by the Malaysian Patent Office on Mar. 13, 2009 in connection with Malaysian Patent Application No. PI 20060884 (5 pages).
Office Action with English translation, dated May 8, 2009, issued by the Chinese Patent Office in connnection with Chinese Patent Application No. 200610059421.7 (12 pages).
Examiner's First Report dated Mar. 30, 2009, issued by the Australian Patent Office in connection with Australian Patent Application No. 2003297898 (3 pages).
Supplementary European Search Report dated Jun. 30, 2009, issued by the European Patent Office in connection with European Patent Application No. EP03796968 (5 pages).
Office Action mailed by the Japanese Patent Office on Aug. 15, 2008 in connection with Japanese Patent Application No. JP2006-056718 (3 pages).
Office Action mailed by the Japanese Patent Office on Mar. 27, 2009 in connection with Japanese Patent Application No. JP2006-056718 (2 pages).
Office Action dated Dec. 11, 2009, from co-pending Application No. 11/805,799 (14 pages).
Russian Official Action with translation, issued by the Patent Office of the Russian Federation, in connection with Russian App. No. 2006101060 (11 pages).
Official Action dated Dec. 14, 2009, issued by the Canadian Patent Office in connection with Canadian Patent Application No. 2,538,053 (2 pages).
Official Action dated Dec. 25, 2009, issued by the Chinese Patent Office in connection with Chinese Patent Application No. 200610059421.7, with English translation (14 pages).
Official Action dated Jul. 16, 2009, issued by the Mexican Institute of Industrial Property in connection with Mexican Patent Application No. PA/a/2006/002421, with an English translation.(5 pages).
Official Action dated Mar. 19, 2010, issued by the Mexican Institute of Industrial Property in connection with Mexican Patent Application No. PA/a/2006/002421, with an English translation (4 pages).
Office Action dated Mar. 18, 2010, from co-pending U.S. Appl. No. 11/071,667 (13 pages).
Office Action dated Aug. 30, 2010, from co-pending U.S. Appl. No. 11/805,799 (13 pages).
Office Action dated Jul. 20, 2010, from co-pending U.S. Appl. No. 10/732,909 (17 pages).
Examiner's First Report dated Apr. 29, 2010, issued by the Australian Patent Office in connection with Australian Patent Application No. 2006200895 (2 pages).
Office Action of Feb. 2, 2011 in U.S. Appl. No. 10/071,667, 18 pages.
Office Action of Apr. 18, 2011 in U.S. Appl. No. 10/732,909, 18 pages.
Official Action of Mar. 29, 2011 in Chinese Patent Application 200610059421.7.
VoiceBox Technologies, printout from website http://www.voiceboxtechnologies.com/auto.php (2 pages), 2001-2006.
"Video: A Dashboard That is Really a PC," printout from website http://news.com.com/1606-2_3-6052333.html (3 pages), 2006.
"Blitz Safe Offers XM Cables for Radios," printout from website http://www.twice.com/article/CA190041.html?text=blitz+safe (2 pages), 2002.
"Integration Products May Impact Satellite Radio," printout from website http://www.twice.com/article/CA200541.html?text=blitz+safe (3 pages), 2002.
"OEM Integration Poised for Strong Growth," printout from website http://www.twice.com/article/CA200523.html?text=blitz+safe (3 pages), 2002.
"Blitzsafe Overview," from Blitzsafe.com website—"The Worldwide Leader in Aftermarket Interfaces and OEM Engineering" (1 page).
"Delphi XM SKYFI(TM) Radio," product description from XM Satellite Radio website (2 pages), 2003.
The New Delphi XM SKYFi Radio Add it to Any Car or Home Audio System, product description from www.xmradio.com (1 page), 2002.
"Phatnoise Digital Media Players," product description from http:\www.phatnoise.com (2 pages), 1999-2003.

"Automedia," magazine pages from Jun./Jul. 1996 issue (2 pages).
"Automedia," magazine pages from Jan. 1998 issue (2 pages).
"Automedia," magazine pages from Feb. 1998 issue (2 pages).
"Automedia," magazine pages from Jul. 1998 issue (2 pages).
"Automedia," magazine pages from Sep. 1998 issue (2 pages).
"Automedia," magazine pages from Nov. 1998 issue (12 pages).
"Automedia," magazine pages from Feb. 1999 issue (2 pages).
"Car Stereo Review," magazine pages from Jun. 1998 issue (5 pages).
"Car Stereo Review," magazine pages from Jan. 1999 issue (2 pages).
"Car Stereo Review," magazine pages from Apr. 1999 issue (3 pages).
"Car Audio and Electronics," magazine pages from Dec. 1998 issue (2 pages).
"Car Audio and Electronics," magazine pages from Apr. 1999 issue (2 pages).
"Car Audio and Electronics," magazine pages from Jun. 1999 issue (2 pages).
"Carsound," magazine pages from May/Jun. 1999 issue (3 pages).
"Mobile Electronics Retailer," magazine pages from Aug. 1997 issue (4 pages).
"Mobile Electronics," magazine pages from Jul. 1999 issue (7 pages).
"Mobile Electronics," magazine pages from Aug. 2000 issue (2 pages).
"Cesmobile," magazine pages from Jan. 1999 issue (3 pages).
"The 12 Volt News," magazine pages from Mar. 2002 issue (2 pages).
"P.I.E. Millennium Price Guide Make the Precision Decision," Precision Interface Electronics, Inc. (6 pages), 2000.
"PIE 1999 Price Guide," Precision Interface Electronics, Inc. (4 pages).
"Design & Engineering Showcase Award," award presented to Precision Interface Electronics, Inc. for DPX Technology Digital Protocol Converter FRDN/PC-KNW, 2000 International CES (1 page).
"Design & Engineering Showcase Award," award presented to Precision Interface Electronics, Inc. for DPX Technology Digital Protocol Converter GM9/PC-KNW, 2000 International CES (1 page).
Invoice dated Jan. 28, 1998 from Precision Interface Electronics, Inc. for "Ford FCU-Sanyo Protocol," and "Ford RCU Sanyo Protocol" (1 page).
Invoice dated Jan. 29, 1999 from Precision Interface Electronics, Inc. for "Ford NCU-Sanyo Protocol" (1 page).
Invoice dated Apr. 26, 1999 from Precision Interface Electronics, Inc. for "9 Pin GM-Kenwood Protocol," and "10 Pin GM-Kenwood Protocol" (1 page).
Invoice dated Apr. 27, 1999 from Precision Interface Electronics, Inc. for "9 Pin GM-Kenwood Protocol" (1 page).
Invoice dated May 27, 1999 from Precision Interface Electronics, Inc. for "10 Pin GM-Kenwood Protocol," and "9 Pin GM-Kenwood Protocol" (1 page).
Invoice dated Mar. 20, 2000 from Precision Interface Electronics, Inc. for "98-2000 Pre-Wired VW 6 DIS" (1 page).
Invoice dated Mar. 20, 2000 from Precision Interface Electronics, Inc. for "98/2000 Pre-Wired VW 8 DIS," and "1998-2000 Audi to Pan 8 PC" (1 page).
Invoice dated Dec. 17, 2001 from Precision Interface Electronics, Inc. for "98-02 Ford/Lincoln/Mercury" (1 page).
Invoice dated May 29, 2002 from Precision Interface Electronics, Inc. for "95-01 GMC/Chev/Pontiac AUX," and "98-02 Ford/Lincoln/Merc AU" (1 page).
Toyota/Avox Interface Rev. Eng., Peripheral Model TIAS, created Feb. 15, 1998 (1 page).
GM/Kenwood Translator diagram, created Feb. 4, 1999 (2 pages).
Ford/Audiovox Translator diagram, created Dec. 29, 1997 (2 pages).
Component Side Silkscreen, created Dec. 31, 1997 (2 pages).
Component Xray, created Feb. 4, 1992 (2 pages).
"SoundGate, Ventura Announce Sophisticated OEM-Integration Interfaces," article from The 12 Volt News, Dec. 2002 (1 page).
"XMDirect Smart Digital Adapter," product description (3 pages), 2001-2004.
"Breaking Protocol a Look at BlitzSafe's New DMX Protocol Converter Technology," Nov. 1998 printout from http://www.blitzsafe.com/blitz_news/news101998/body_news101998.html (2 pages).
"PIE Virtual Catalog," printout from http://web.archive.org/web/19981205005802/http:/www.pie.net/sec12sbl.htm (2 pages), 2005.
"The UniLink Project," printout from website (2 pages), 1999.
"CD Changer Interfaces, "printout from http://web.archive.org/web/19991012021952/soundgate.com/cd-inter.html (1 page), 1999.
"Digital Obsessions a Spotlight on Audio Gadgetry, ZDNet Music: The PhatNoise Car Audio System," printout from http://web.archive.org/web/20000815203327/music.zdnet.com/features/phatnoise (3 pages), 2000.
"Bypassing and Switching With the CD4053 CMOS Analog MUX," printout from website (4 pages), 2000.
"Device Profile: PhatNoise PhatBox Car MP3 Player," Nov. 1, 2000, printout from http://techupdate.zdnet.com/techupdate/stories/main/0,14179,2649276,00.htm (4 pages).
"The EZ Protoboard," printout from http://web.archive.org/web/20010613095105/http:/www.ajusd.org/~edward/ezproto (2 pages), 2001.
"TDIClub Forums: Reverse Engineering CD Changer Progress,," Apr. 3, 2001, printout from website (3 pages).
"TDIClub Forums: Reverse Engineering CD Changer Progress Reports" Apr. 5, 2001, printout from website (8 pages).
"Multi Technology Equipment—Home of the Neo MP3 Player," printout from http://web.archive.org/web/20010413222617/ssiamerica.com/products/neo35/ (1 page), 2005.
"TDIClub Forums: Reverse Engineering CD Changer Protocol Update," Apr. 18, 2001, printout from website (3 pages).
"The Car CD Changer Interface Page," printout from website (10 pages), 2001-2002.
"SourceForge.net: Project Info—GNUlink," printout from http://sourceforge.net/projects/gnunilink/ (3 pages), 2005.
"EZ Protoboard News," printout from website (3 pages), 2001-2002.
"GNUnilink—For All Your AUX-IN Needs . . . ,"printout from http://gnunilink.sourceforge.net/ (4 pages), 2002.
"VWCDPIC News,"printout from http://web.archive.org/web/20020701101541/http:/www.ajusd.org/~edward/vwcdpic/ (8 pages), 2001-2002.
"VWCDPIC News,"printout from http://web.archive.org/web/20021009014959/http:/www.ajusd.org/~edward/vwcdpic/ (10 pages), 2001-2002.
"Mobile Electronic E-Newsletter" dated Jan. 13, 2005 (4 pages).
"Axxess Introduces Two iPod Integration Units" product description dated Jan. 19, 2005 (1 page).
"Even More iPod Adapters on the Way," printout from twice.com website (2 pages), 2005.
"Alpine Showing First Most-Ready Product," printout from twice.com website (2 pages), 2005.
"Bluetooth Gradually Enters Car Audio," prinout from twice.com website (2 pages), 2005.

\* cited by examiner

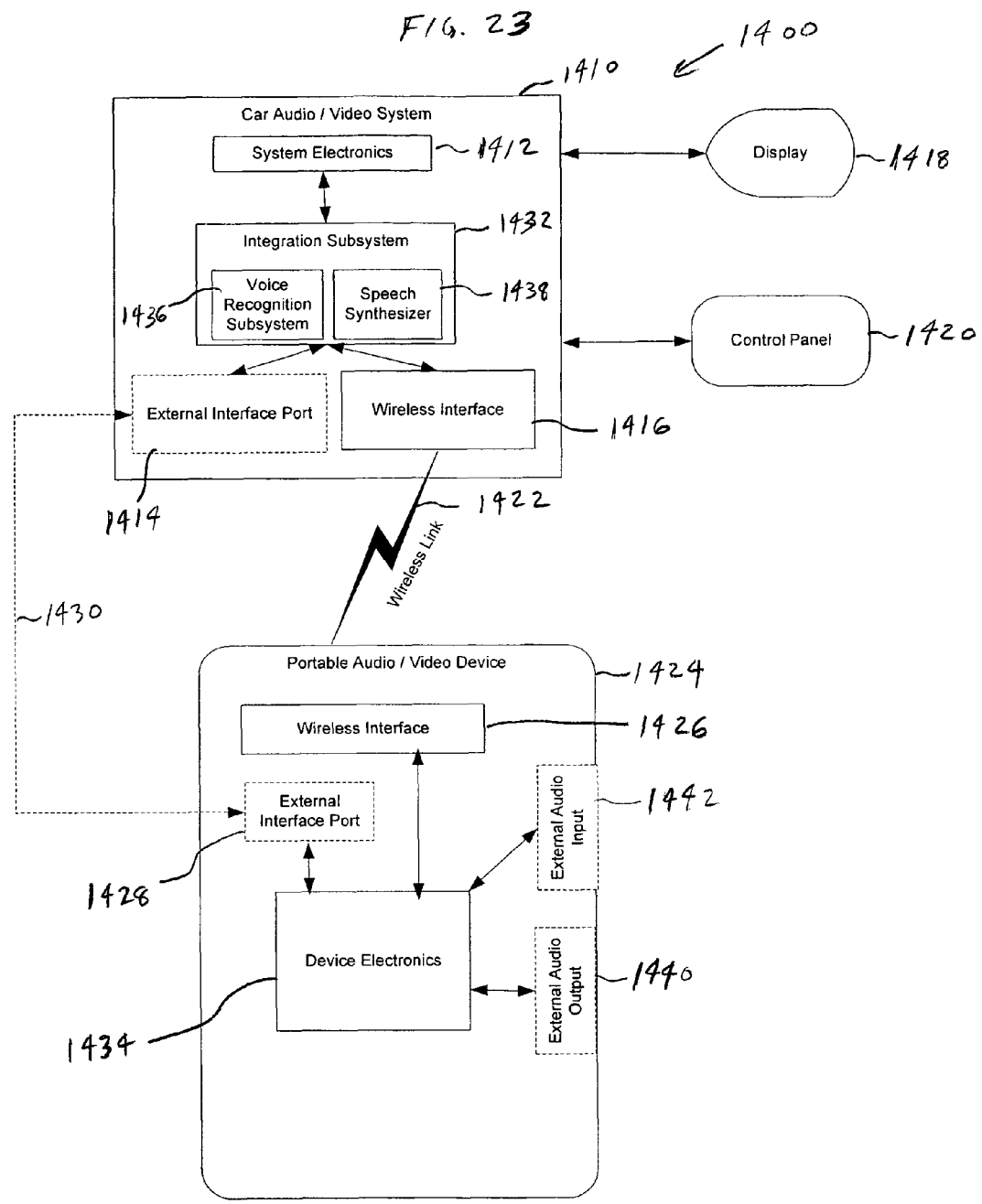

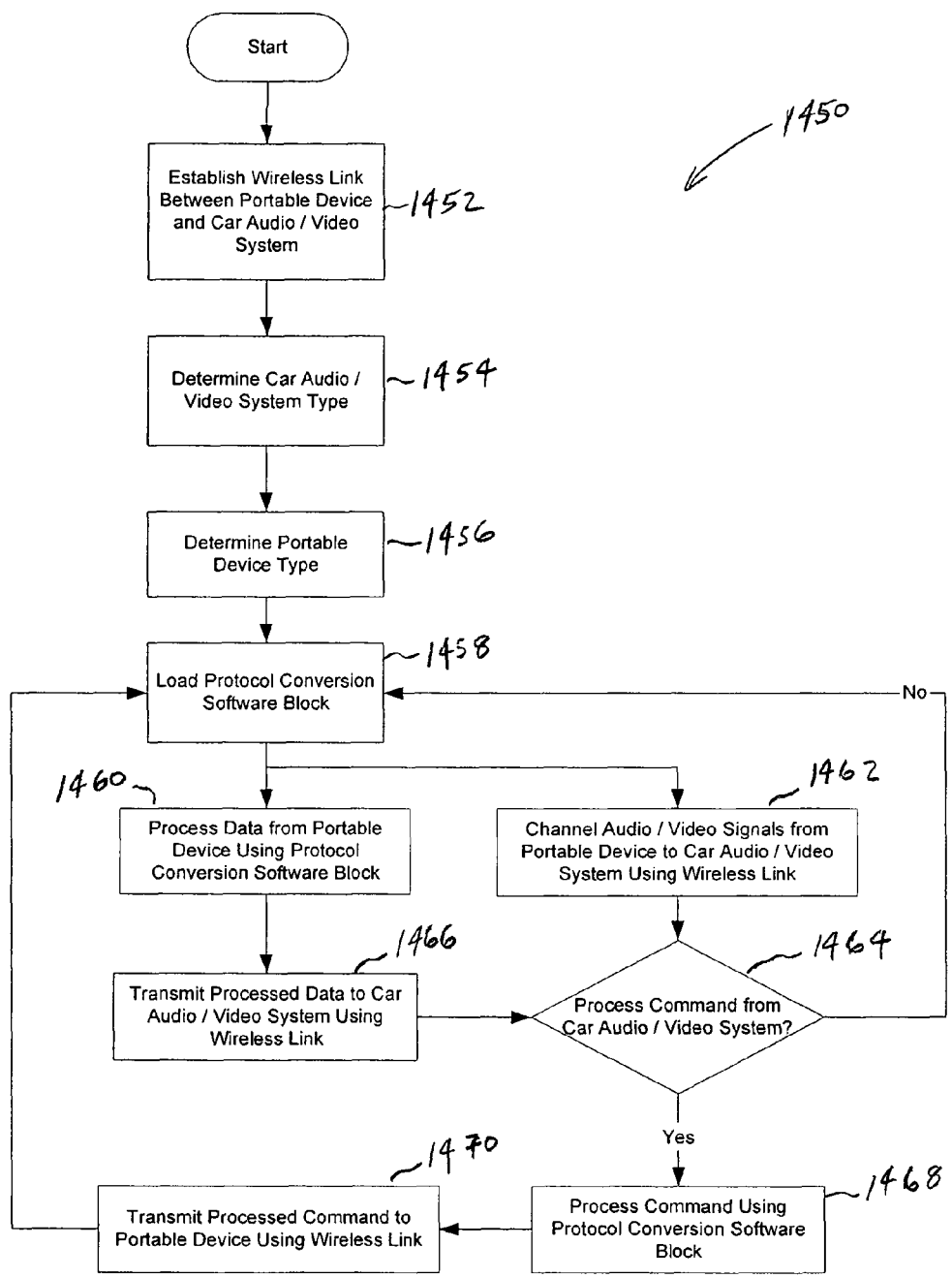

MULTIMEDIA DEVICE INTEGRATION SYSTEM

RELATED APPLICATIONS

This application is a continuation-in-part of U.S. patent application Ser. No. 11/071,667, filed Mar. 3, 2005; which is a continuation-in-part of U.S. patent application Ser. No. 10/732,909 filed Dec. 10, 2003; which is a continuation-in-part of U.S. patent application Ser. No. 10/316,961 filed Dec. 11, 2002, now U.S. Pat. No. 7,489,786, the entire disclosures of which applications are each expressly incorporated herein by reference.

BACKGROUND OF THE INVENTION

1. Field of the Invention

The present invention relates to a multimedia device integration system. More specifically, the present invention relates to a multimedia device integration system for integrating after-market components such as satellite receivers, CD players, CD changers, digital media devices (e.g., MP3 players, MP4 players, WMV players, Apple iPod devices, portable media centers, and other devices), Digital Audio Broadcast (DAB) receivers, auxiliary audio sources, video devices (e.g., DVD players), cellular telephones, and other devices for use with factory-installed (OEM) or after-market car stereo and video systems.

2. Related Art

Automobile audio systems have continued to advance in complexity and the number of options available to automobile purchasers. Early audio systems offered a simple AM and/or FM tuner, and perhaps an analog tape deck for allowing cassettes, 8-tracks, and other types of tapes to be played while driving. Such early systems were closed, in that external devices could not be easily integrated therewith.

With advances in digital technology, CD players have been included with automobile audio systems. Original Equipment Manufacturers (OEMs) often produce car stereos having CD players and/or changers for allowing CDs to be played while driving. However, such systems often include proprietary buses and protocols that do not allow after-market audio systems, such as satellite receivers (e.g., XM satellite tuners), digital audio broadcast (DAB) receivers, digital media players (e.g., Apple iPod, MP3, MP4, WMV, etc.), CD changers, auxiliary input sources, video devices (e.g., DVD players), cellular telephones, and the like, to be easily integrated therewith. Thus, automobile purchasers are frequently forced to either entirely replace the OEM audio system, or use same throughout the life of the vehicle or the duration of ownership. Even if the OEM radio is replaced with an after-market radio, the after-market radio also frequently is not operable with an external device.

A particular problem with integrating after-market audio and video systems with existing car stereo and video systems is that signals generated by both systems are in proprietary formats, and are not capable of being processed by the after-market system. Additionally, signals generated by the after-market system are also in a proprietary format that is not recognizable by the car stereo or video system. Thus, in order to integrate after-market systems with existing car stereo and video systems, it is necessary to convert signals between such systems.

It known in the art to provide one or more expansion modules for OEM and after-market car stereos for allowing external audio products to be integrated with the car stereo. However, such expansion modules only operate with and allow integration of external audio products manufactured by the same manufacturer as the OEM/after-market car stereo. For example, a satellite receiver manufactured by PIONEER, Inc., cannot be integrated with an OEM car radio manufactured by TOYOTA or an after-market car radio manufactured by CLARION, Inc. Thus, existing expansion modules only serve the limited purpose of integrating equipment by the same manufacturer as the car stereo. Thus, it would be desirable to provide an integration system that allows any audio device of any manufacture to be integrated with any OEM or after-market radio system. Further, radio-frequency (RF) transmitters and cassette tape adapters have been developed for allowing music from a device external to a car radio, such as a portable CD player, to be played through the car radio using the FM receiver or the cassette deck of the radio. However, such systems are often prone to interference, and do not provide high fidelity.

Moreover, it would be desirable to provide an integration system that not only achieves integration of various audio and video devices that are alien to a given OEM or after-market car stereo or video system, but also allows for information to be exchanged between the after-market device and the car stereo or video system. For example, it would be desirable to provide a system wherein station, track, time, and song information can be retrieved from the after-market device, formatted, and transmitted to the car stereo or video system for display thereby, such as at an LCD panel of the car stereo or on one or more display panels of a car video system. Such information could be transmitted and displayed on both hard-wired car stereo and video systems (e.g., radios installed in dashboards or at other locations within the car), or integrated for display on one or more software or graphically-driven radio systems operable with graphical display panels. Additionally, it would be desirable to provide a multimedia device integration system that allows a user to control more than one device, such as a CD or satellite receiver and one or more auxiliary sources, and to quickly and conveniently switch between same using the existing controls of the car stereo or video system. Still further, it would be desirable to provide a multimedia device integration system that allows for wireless integration of portable devices for use with car audio and/or video systems, wherein full remote control of the portable device is provided at the controls of the car system.

Accordingly, the present invention addresses these needs by providing a multimedia device integration system that allows a plurality of after-market devices, such as CD players, CD changers, digital media devices (e.g., MP3 players, MP4 players, Apple iPod, WMV players, portable media centers, and other devices), satellite receivers, DAB receivers, auxiliary input sources, video devices (e.g., DVD players), cellular telephones, or any combination thereof, to be integrated into existing car stereo and video systems while allowing information to be displayed on, and control to be provided from, the car stereo or video system.

SUMMARY OF THE INVENTION

The present invention relates to a multimedia device integration system. One or more after-market audio devices, such as CD players, CD changers, digital media devices (e.g., MP3 players, MP4 players, WMV players, Apple iPod devices, portable media centers, and other devices), satellite receivers (e.g., XM or Sirius receivers), digital audio broadcast (DAB) receiver, or auxiliary input sources, can be connected to and operate with an existing stereo system in an automobile, such as an OEM car stereo system or an after-market car stereo system installed in the automobile. The integration system connects to and interacts with the car stereo at any available port of the car stereo, such as a CD input port, a satellite input, or other known type of connection. If the car stereo system is an after-market car stereo system, the present invention generates a signal that is sent to the car stereo to keep same in an operational state and responsive to external data and signals. Commands generated at the control panel are received by the present invention and converted into a format recognizable by the after-market device. The formatted commands are executed by the after-market device, and audio therefrom is channeled to the car stereo. Information from the after-market device is received by the present invention, converted into a format recognizable by the car stereo, and forwarded to the car stereo for display thereby. The formatted information could include information relating to a CD or MP3 track being played, channel, song, and artist information from a satellite receiver or DAB receiver, or video information from one or more external devices connected to the present invention. The information can be presented as one or more menus, textual, or graphical prompts for display on an LCD display of the radio, allowing interaction with the user at the radio. A docking port may be provided for allowing portable external audio devices to be connected to the interface of the present invention.

In an embodiment of the present invention, a dual-input device is provided for integrating both an external audio device and an auxiliary input with an OEM or after-market car stereo. The user can select between the external audio device and the auxiliary input using the controls of the car stereo. The invention can automatically detect the type of device connected to the auxiliary input, and integrate same with the car stereo.

In another embodiment of the present invention, an interface is provided for integrating a plurality of auxiliary input sources with an existing car stereo system. A user can select between the auxiliary sources using the control panel of the car stereo. One or more after-market audio devices can be integrated with the auxiliary input sources, and a user can switch between the audio device and the auxiliary input sources using the car stereo. Devices connected to the auxiliary input sources are inter-operable with the car stereo, and are capable of exchanging commands and data via the interface.

In another embodiment of the present invention, an interface is provided for integrating an external device for use with a car stereo or video system, wherein the interface is positioned within the car stereo or video system. The system comprises a car stereo or video system; an after-market device external to the car stereo or video system; an interface positioned within the car stereo or video system and connected between the car stereo or video system and the after-market device for exchanging data and audio or video signals between the car stereo or video system and the after-market device; means for processing and dispatching commands for controlling the after-market device from the car stereo or video system in a format compatible with the after-market device; and means for processing and displaying data from the after-market device on a display of the car stereo or video system in a format compatible with the car stereo or video system. The after-market device could comprise one or more of a CD changer, CD player, satellite receiver (e.g., XM or Sirius), digital media device (e.g., MP3, MP4, WMV, or Apple iPod device), video device (e.g., DVD player), cellular telephone, or any combination thereof.

In another embodiment of the present invention, an interface is provided for integrating a cellular telephone for use with a car stereo or video system. The system comprises a car stereo or video system; a cellular telephone external to the car stereo or video system; an interface connected between the car stereo or video system and the cellular telephone for exchanging data and audio or video signals between the car stereo or video system and the cellular telephone; means for processing and dispatching commands for controlling the cellular telephone from the car stereo or video system in a format compatible with the cellular telephone; and means for processing and displaying data from the cellular telephone on a display of the car stereo or video system in a format compatible with the car stereo or video system.

In another embodiment of the present invention, an interface is provided for integrating an external video system for use with a car video system. The system comprises a car video system; an after-market video device external to the car video system; an interface connected between the car video system and the after-market video device for exchanging data, audio, and video signals between the car video system and the after-market video device; means for processing and dispatching commands for controlling the after-market video device from the car video system in a format compatible with the after-market video device; and means for processing and displaying data from the after-market video device on a display of the car video system in a format compatible with the car video system.

The present invention also provides an interface for integrating a plurality of after-market devices for use with a car stereo or video system using a single interface. In one embodiment, the system comprises an interface in electrical communication with a car stereo or video system and an after-market device; a plurality of configuration jumpers in the interface for specifying a first device type corresponding to the car stereo or video system and a second device type corresponding to the after-market device; and a plurality of protocol conversion software blocks stored in memory in the interface for converting signals from the after-market device into a first format compatible with the car stereo or video system and for converting signals from the car stereo or video system into a second format compatible with the after-market device, wherein at least one of the protocol conversion software blocks are selected by the interface using settings of the plurality of configuration jumpers. In another embodiment, the system comprises an interface in electrical communication with a car stereo or video system and an after-market device; first and second wiring harnesses attached to the interface, wherein the first wiring harness includes a first electrical configuration corresponding to the car stereo or video system and the second wiring harness includes a second electrical configuration corresponding to the after-market device; and a plurality of protocol conversion software blocks stored in memory in the interface for converting signals from the after-market device into a first format compatible with the car stereo or video system and for converting signals from the car stereo or video system into a second format compatible with the after-market device, wherein at least one of the protocol conversion software blocks are selected by the interface using the first and second electrical configurations of the first and second wiring harnesses. A plurality of wiring harnesses can be provided for integrating a plurality of devices.

The present invention also provides a method for integrating an after-market device for use with a car stereo or video system, comprising the steps of interconnecting the car stereo or video system and the after-market device with an interface; determining a first device type corresponding to the car stereo or video system and a second device type corresponding to the after-market device; loading a protocol conversion software block from memory in the interface using the first and second device types; converting signals from the after-market device into a first format compatible with the car stereo or video system using the protocol conversion software block; and converting signals from the car stereo or video system into a second format compatible with the after-market device using the protocol conversion software block.

The present invention further provides a multimedia device integration system that allows for the wireless integration of a portable audio and/or video device with a car audio and/or video system. The portable device could comprise a CD changer, CD player, satellite receiver (e.g., XM or Sirius), digital media device (e.g., MP3, MP4, WMV, or Apple iPod device), video device (e.g., DVD player), or a cellular telephone. The portable device includes a wireless interface and an integration subsystem positioned within the portable device. The wireless interface establishes a wireless communications channel between the portable device and the car system, and allows for the wireless exchange of control commands, data, video, and audio signals between the portable device and the car system. The integration module receives control commands issued at the car system and transmitted over the wireless channel, processes same into a format compatible with the portable device, and dispatches same to the portable device for execution thereby. The integration module also receives data from the portable device (including, but not limited to, track information, song information, artist information, time information, and other related information), processes the data into a format compatible with the car system, and transmits same over the wireless channel to the car system for display thereon. Optionally, the integration module could be positioned within the car system.

The integration module could also include a voice recognition subsystem for acquiring spoken commands from a user, converting same into control commands compatible with the portable device, and dispatching the processed control commands to the portable device for execution thereby. The voice commands could be received at the car audio and/or video system (i.e., using a microphone connected to the car audio and/or video system or some other vehicle component), or at the portable device (i.e., using a microphone connected to or forming a part of the portable device). Additionally, the integration module could include a speech synthesizer for generating synthesized speech for conveying data generated by the portable device to a user. The synthesized speech could be channeled to the car audio and/or video system by the integration module to be played through the car audio and/or video system.

The present invention further provides a multimedia device integration system that allows for the integration of a portable audio and/or video device with a car audio and/or video system using a docking slot provided in the car system. The portable device includes an integration module positioned within the portable device and an external interface for allowing electrical communication with the car system via the docking slot. Optionally, the integration module could be positioned within the car audio or video system. The integration module could also include a voice recognition subsystem for acquiring spoken commands from a user, converting same into control commands compatible with the portable device, and dispatching the processed control commands to the portable device for execution thereby. Additionally, the integration module could include a speech synthesizer for generating synthesized speech for conveying data generated by the portable device to a user.

BRIEF DESCRIPTION OF THE DRAWINGS

These and other important objects and features of the invention will be apparent from the following Detailed Description of the Invention, taken in connection with the accompanying drawings, in which:

FIG. 7b is an end view of the docking station of FIG. 7a.

FIG. 23 is a diagram showing another embodiment of the present invention, wherein wireless integration is provided between a car audio and/or video system and a portable audio and/or video device, and the car audio and/or video system includes an integration module having speech synthesis and recognition capabilities.

FIG. 24 is a flowchart showing processing logic according to the present invention for wirelessly integrating a portable audio and/or video device for use with a car audio or video system.

DETAILED DESCRIPTION OF THE INVENTION

Figure 1:
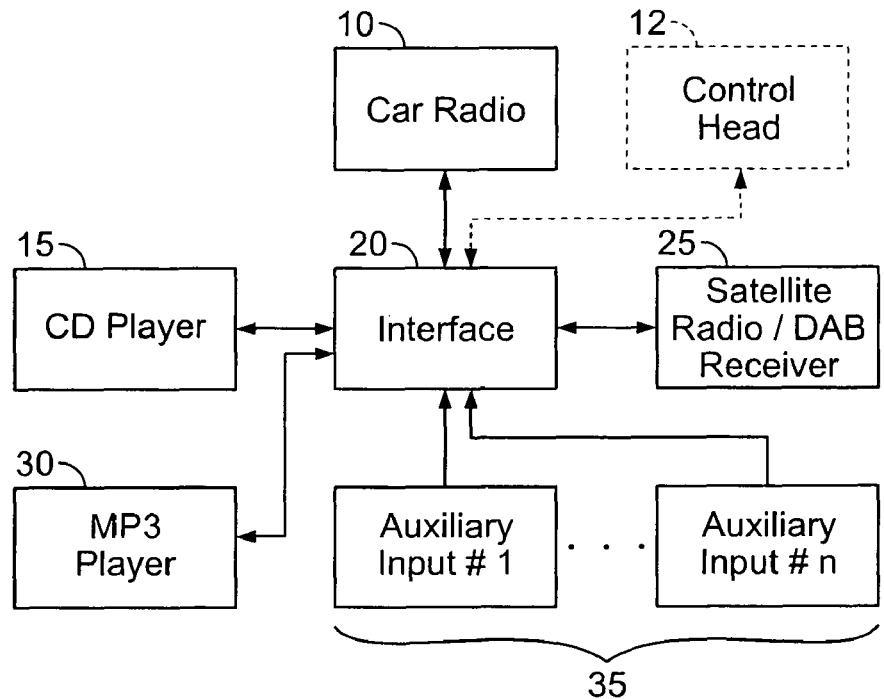
FIG. 1 is a block diagram showing the multimedia device integration system of the present invention.

The present invention relates to a multimedia device integration system. One or more after-market devices, such as a CD player, CD changer, digital media player (e.g., MP3 player, MP4 player, WMV player, Apple iPod, portable media center, or other device), satellite receiver, digital audio broadcast (DAB) receiver, video device (e.g., DVD player), cellular telephone, or the like, can be integrated with an existing car radio or car video device, such as an OEM or after-market car stereo or video system. Control of the after-market device is enabled using the car stereo or car video system, and information from the after-market device, such as channel, artist, track, time, song, and other information, is retrieved form the after-market device, processed, and forwarded to the car stereo or car video system for display thereon. The information channeled to the car stereo or video system can include video from the external device, as well as graphical and menu-based information. A user can review and interact with information via the car stereo. Commands from the car stereo or video system are received, processed by the present invention into a format recognizable by the after-market device device, and transmitted thereto for execution. One or more auxiliary input channels can be integrated by the present invention with the car stereo or video system. The user can switch between one or more after-market devices and one or more auxiliary input channels using the control panel buttons of the car stereo or video system.

As used herein, the term "integration" or "integrated" is intended to mean connecting one or more external devices or inputs to an existing car stereo or video system via an interface, processing and handling signals, audio, and/or video information, allowing a user to control the devices via the car stereo or video system, and displaying data from the devices on the car stereo or video system. Thus, for example, integration of a CD player with a car stereo system allows for the CD player to be remotely controlled via the control panel of the stereo system, and data from the CD player to be sent to the display of the stereo. Of course, control of after-market devices can be provided at locations other than the control panel of the car stereo or video system without departing from the spirit or scope of the present invention. Further, as used herein, the term "inter-operable" is intended to mean allowing the external audio or video device to receive and process commands that have been formatted by the interface of the present invention, as well as allowing a car stereo or video system to display information that is generated by the external audio or video device and processed by the present invention. Additionally, by the term "inter-operable," it is meant allowing a device that is alien to the environment of an existing OEM or after-market car stereo or video system to be utilized thereby.

Also, as used herein, the terms "car stereo" and "car radio" are used interchangeably and are intended to include all presently existing car stereos, radios, video systems, such as physical devices that are present at any location within a vehicle, in addition to software and/or graphically- or display-driven receivers. An example of such a receiver is a software-driven receiver that operates on a universal LCD panel within a vehicle and is operable by a user via a graphical user interface displayed on the universal LCD panel. Further, any future receiver, whether a hardwired or a software/graphical receiver operable on one or more displays, is considered within the definition of the terms "car stereo" and "car radio," as used herein, and is within the spirit and scope of the present invention. Moreover, the term "car" is not limited to any specific type of automobile, but rather, includes all automobiles. Additionally, by the term "after-market," it is meant any device not installed by a manufacturer at the time of sale of the car.

FIG. 1 is a block diagram showing the multimedia device integration (or interface) system of the present invention, generally indicated at 20. A plurality of devices and auxiliary inputs can be connected to the interface 20, and integrated with an OEM or after-market car radio 10. A CD player or changer 15 can be integrated with the radio 10 via interface 20. A satellite radio or DAB receiver 25, such as an XM or Sirius radio satellite receiver or DAB receiver known in the art, could be integrated with the radio 10, via the interface 20. Further, an MP3 player 30 could also be integrated with the radio 10 via interface 20. The MP3 player 30 could be any known digital media device, such as an Apple iPod or any other digital media device. Moreover, a plurality of auxiliary input sources, illustratively indicated as auxiliary input sources 35 (comprising input sources 1 through n, n being any number), could also be integrated with the car radio 10 via interface 20. Optionally, a control head 12, such as that commonly used with after-market CD changers and other similar devices, could be integrated with the car radio 10 via interface 20, for controlling any of the car radio 10, CD player/changer 15, satellite/DAB receiver 25, MP3 player 30, and auxiliary input sources 35. Thus, as can be readily appreciated, the interface 20 of the present invention allows for the integration of a multitude of devices and inputs with an OEM or after-market car radio or stereo.

Figure 2A:
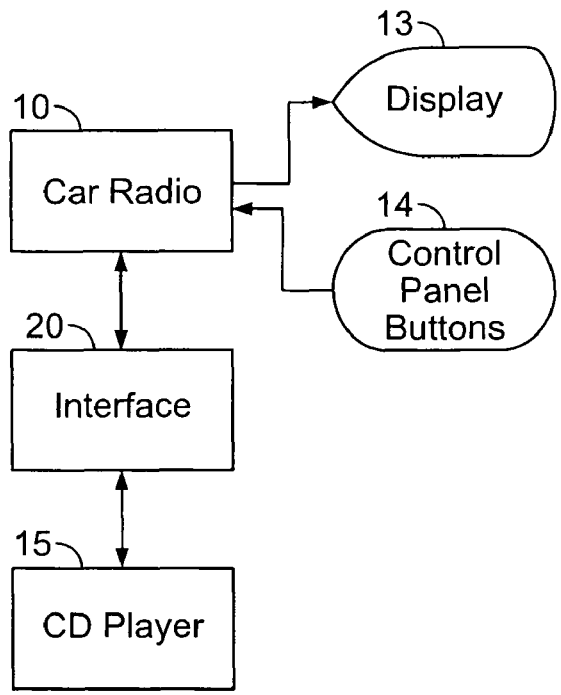
FIG. 2a is a block diagram showing an alternate embodiment of the multimedia device integration system of the present invention, wherein a CD player is integrated with a car radio.

FIG. 2a is a block diagram of an alternate embodiment of the multimedia device interface system of the present invention, wherein a CD player/changer 15 is integrated with an OEM or after-market car radio 10. The CD player 15 is electrically connected with the interface 20, and exchanges data and audio signals therewith. The interface 20 is electrically connected with the car radio 10, and exchanges data and audio signals therewith. In a preferred embodiment of the present invention, the car radio 10 includes a display 13 (such as an alphanumeric, electroluminescent display) for displaying information, and a plurality of control panel buttons 14 that normally operate to control the radio 10. The interface 20 allows the CD player 15 to be controlled by the control buttons 14 of the radio 10. Further, the interface 20 allows information from the CD player 15, such as track, disc, time, and song information, to be retrieved therefrom, processed and formatted by the interface 20, sent to the display 13 of the radio 10.

Importantly, the interface 20 allows for the remote control of the CD player 15 from the radio 10 (e.g., the CD player 15 could be located in the trunk of a car, while the radio 10 is mounted on the dashboard of the car). Thus, for example, one or more discs stored within the CD player 15 can be remotely selected by a user from the radio 10, and tracks on one or more of the discs can be selected therefrom. Moreover, standard CD operational commands, such as pause, play, stop, fast forward, rewind, track forward, and track reverse (among other commands) can be remotely entered at the control panel buttons 14 of the radio 10 for remotely controlling the CD player 15.

Figure 2B:
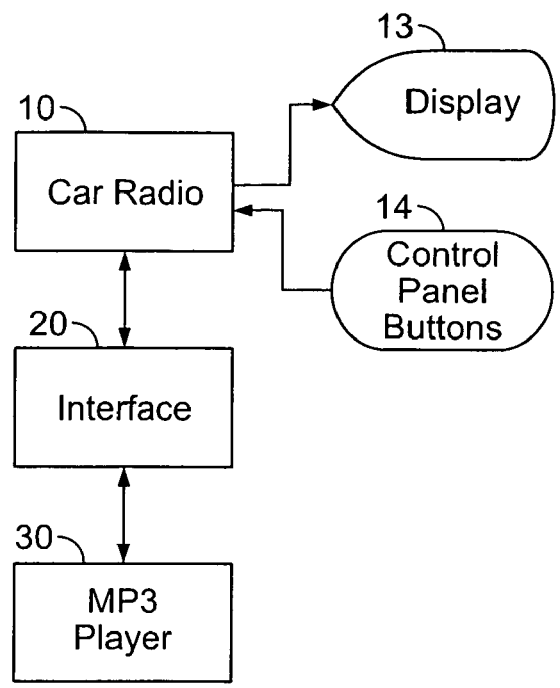
FIG. 2b is a block diagram showing an alternate embodiment of the multimedia device integration system of the present invention, wherein a MP3 player is integrated with a car radio.

FIG. 2b is a block diagram showing an alternate embodiment of the present invention, wherein an MP3 player 30 is integrated with an OEM or after-market car radio 10 via interface 20. As mentioned earlier, the interface 20 of the present invention allows for a plurality of disparate audio devices to be integrated with an existing car radio for use therewith. Thus, as shown in FIG. 2b, remote control of the MP3 player 30 via radio 10 is provided for via interface 20. The MP3 player 30 is electronically interconnected with the interface 20, which itself is electrically interconnected with the car radio 10. The interface 20 allows data and audio signals to be exchanged between the MP3 player 30 and the car radio 10, and processes and formats signals accordingly so that instructions and data from the radio 10 are processable by the MP3 player 30, and vice versa. Operational commands, such as track selection, pause, play, stop, fast forward, rewind, and other commands, are entered via the control panel buttons 14 of car radio 10, processed by the interface 20, and formatted for execution by the MP3 player 30. Data from the MP3 player, such as track, time, and song information, is received by the interface 20, processed thereby, and sent to the radio 10 for display on display 13. Audio from the MP3 player 30 is selectively forwarded by the interface 20 to the radio 10 for playing.

Figure 2C:
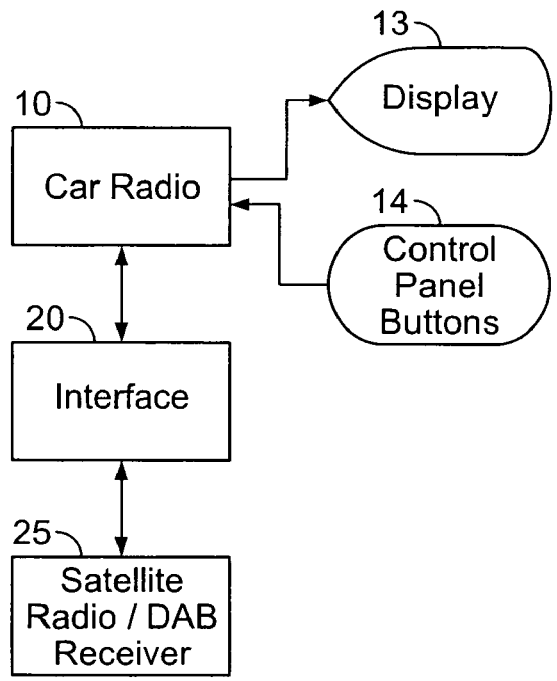
FIG. 2c is a block diagram showing an alternate embodiment of the multimedia device integration system of the present invention, wherein a satellite or DAB receiver is integrated with a car radio.

FIG. 2c is a block diagram showing an alternate embodiment of the present invention, wherein a satellite receiver or DAB receiver 25 is integrated with an OEM or after-market car radio 10 via the interface 20. Satellite/DAB receiver 25 can be any satellite radio receiver known in the art, such as XM or Sirius, or any DAB receiver known in the art. The satellite/DAB receiver 25 is electrically interconnected with the interface 20, which itself is electrically interconnected with the car radio 10. The satellite/DAB receiver 25 is remotely operable by the control panel buttons 14 of the radio 10. Commands from the radio 10 are received by the interface 20, processed and formatted thereby, and dispatched to the satellite/DAB receiver 25 for execution thereby. Information from the satellite/DAB receiver 25, including time, station, and song information, is received by the interface 20, processed, and transmitted to the radio 10 for display on display 13. Further, audio from the satellite/DAB receiver 25 is selectively forwarded by the interface 20 for playing by the radio 10.

Figure 2D:
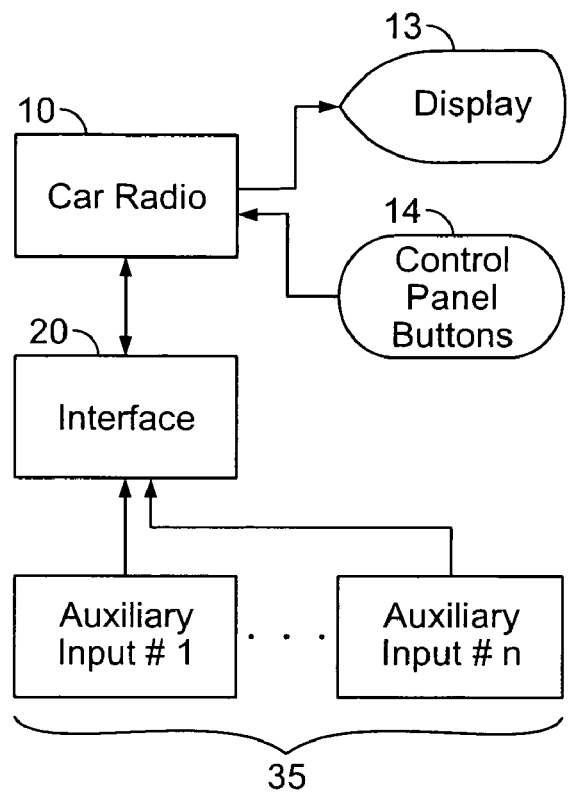
FIG. 2d is a block diagram showing an alternate embodiment of the multimedia device integration system of the present invention, wherein a plurality of auxiliary input sources are integrated with a car radio.

FIG. 2d is a block diagram showing an alternate embodiment of the present invention, wherein one or more auxiliary input sources 35 are integrated with an OEM or after-market car radio 10. The auxiliary inputs 35 can be connected to analog sources, or can be digitally coupled with one or more audio devices, such as after-market CD players, CD changers, MP3 players, satellite receivers, DAB receivers, and the like, and integrated with an existing car stereo. Preferably, four auxiliary input sources are connectable with the interface 20, but any number of auxiliary input sources could be included. Audio from the auxiliary input sources 35 is selectively forwarded to the radio 10 under command of the user. As will be discussed herein in greater detail, a user can select a desired input source from the auxiliary input sources 35 by depressing one or more of the control panel buttons 14 of the radio 10. The interface 20 receives the command initiated from the control panel, processes same, and connects the corresponding input source from the auxiliary input sources 35 to allow audio therefrom to be forwarded to the radio 10 for playing. Further, the interface 20 determines the type of audio devices connected to the auxiliary input ports 35, and integrates same with the car stereo 10.

As mentioned previously, the present invention allows one or more external audio devices to be integrated with an existing OEM or after-market car stereo, along with one or more auxiliary input sources, and the user can select between these sources using the controls of the car stereo. Such "dual input" capability allows operation with devices connected to either of the inputs of the device, or both. Importantly, the device can operate in "plug and play" mode, wherein any device connected to one of the inputs is automatically detected by the present invention, its device type determined, and the device automatically integrated with an existing OEM or after-market car stereo. Thus, the present invention is not dependent any specific device type to be connected therewith to operate. For example, a user can first purchase a CD changer, plug same into a dual interface, and use same with the car stereo. At a point later in time, the user could purchase an XM tuner, plug same into the device, and the tuner will automatically be detected and integrated with the car stereo, allowing the user to select from and operate both devices from the car stereo. It should be noted that such plug and play capability is not limited to a dual input device, but is provided for in every embodiment of the present invention. The dual-input configuration of the preset invention is illustrated in FIGS. 2e-2h and described below.

Figure 2E:
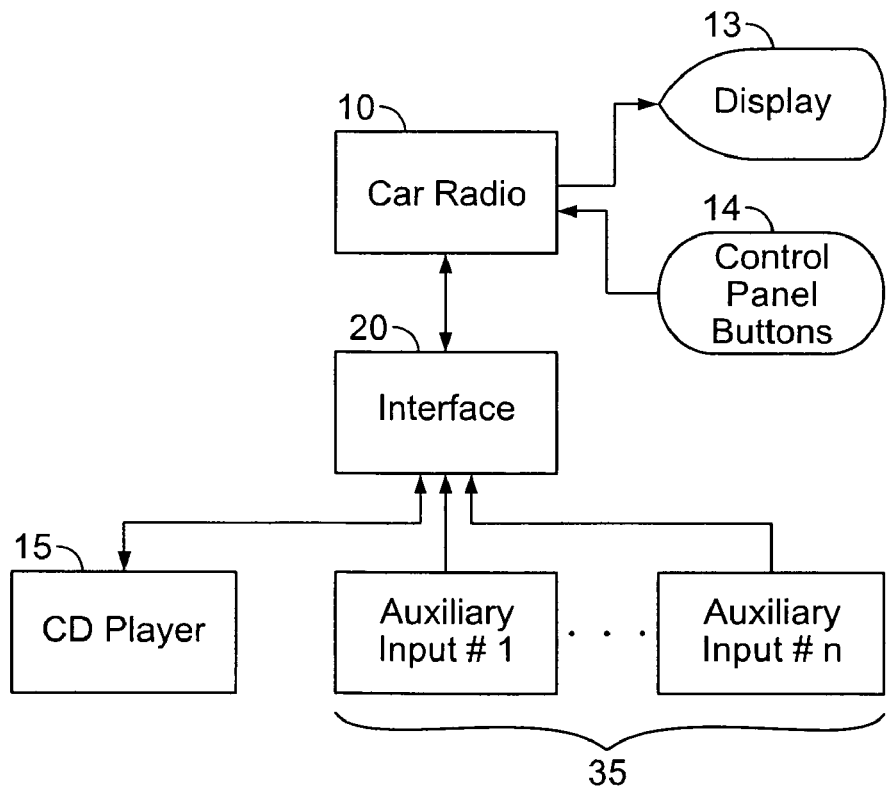
FIG. 2e is a block diagram showing an alternate embodiment of the multimedia device integration system of the present invention, wherein a CD player and a plurality of auxiliary input sources are integrated with a car radio.

FIG. 2e is a block diagram showing an alternate embodiment of the present invention, wherein an external CD player/changer 15 and one or more auxiliary input sources 35 are integrated with an OEM or after-market car stereo 10. Both the CD player 15 and one or more of the auxiliary input sources 35 are electrically interconnected with the interface 20, which, in turn, is electrically interconnected to the radio 10. Using the controls 14 of the radio 10, a user can select between the CD player 15 and one or more of the inputs 35 to selectively channel audio from these sources to the radio. The command to select from one of these sources is received by the interface 20, processed thereby, and the corresponding source is channeled to the radio 10 by the interface 20. As will be discussed later in greater detail, the interface 20 contains internal processing logic for selecting between these sources.

Figure 2F:
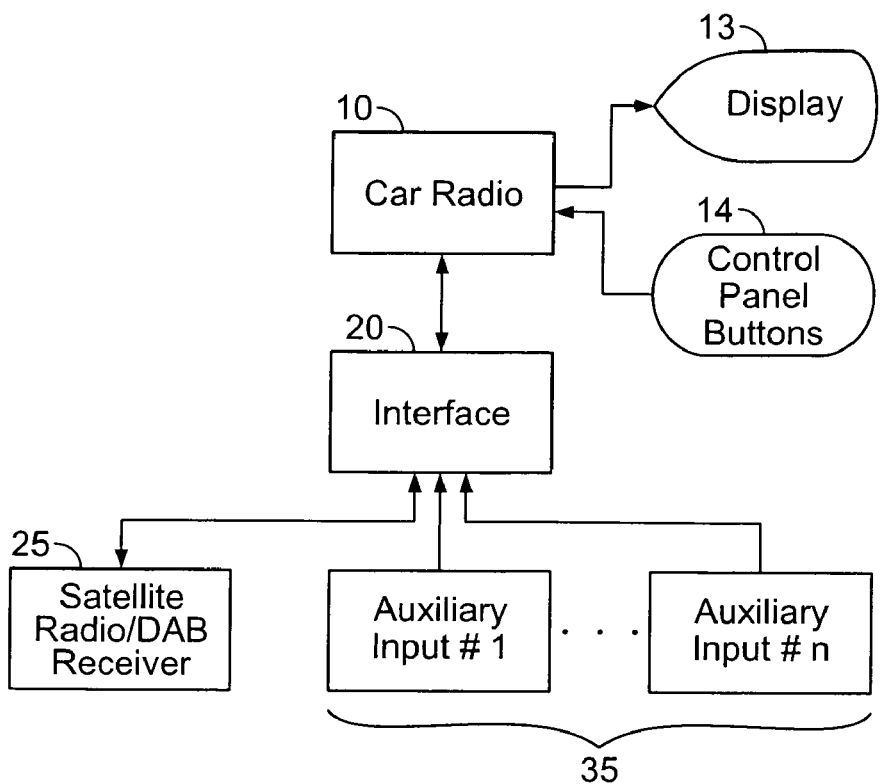
FIG. 2f is a block diagram showing an alternate embodiment of the present invention, wherein a satellite or DAB receiver and a plurality of auxiliary input source are integrated with a car radio.

FIG. 2f is a block diagram of an alternate embodiment of the present invention, wherein a satellite receiver or DAB receiver and one or more auxiliary input sources are integrated by the interface 20 with an OEM or after-market car radio 10. Similar to the embodiment of the present invention illustrated in FIG. 2e and described earlier, the interface 20 allows a user to select between the satellite/DAB receiver 25 and one or more of the auxiliary input sources 35 using the controls 14 of the radio 10. The interface 20 contains processing logic, described in greater detail below, for allowing switching between the satellite/DAB receiver 25 and one or more of the auxiliary input sources 35.

Figure 2G:
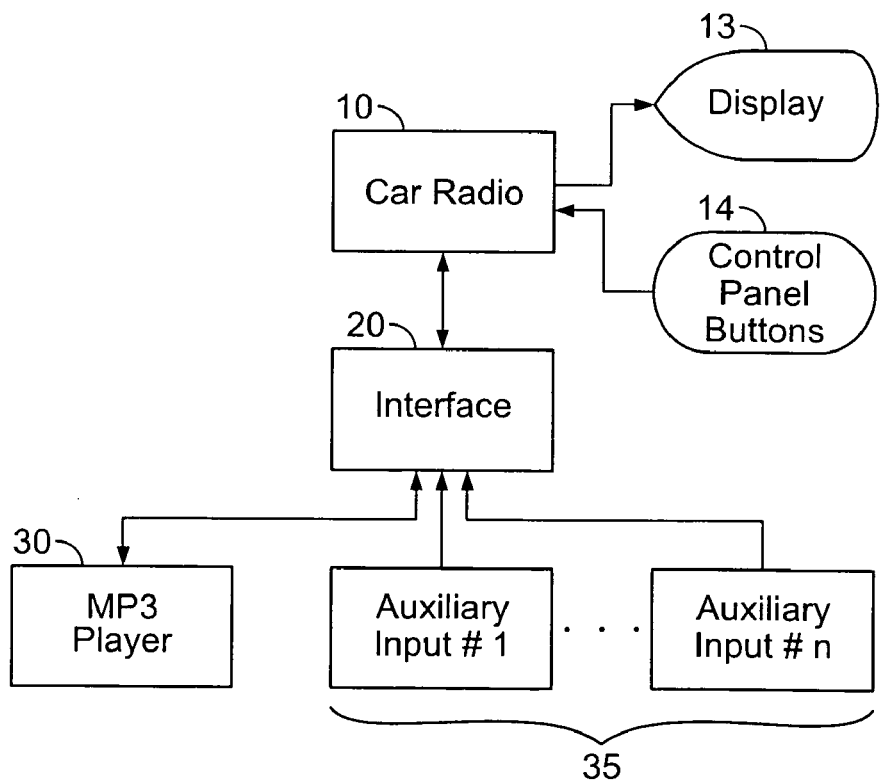
FIG. 2g is a block diagram showing an alternate embodiment of the present invention, wherein a MP3 player and a plurality of auxiliary input sources are integrated with a car radio.

FIG. 2g is a block diagram of an alternate embodiment of the present invention, wherein a MP3 player 30 and one or more auxiliary input sources 35 are integrated by the interface 20 with an OEM or after-market car radio 10. Similar to the embodiments of the present invention illustrated in FIGS. 2e and 2f and described earlier, the interface 20 allows a user to select between the MP3 player 30 and one or more of the auxiliary input sources 35 using the controls 14 of the radio 10. The interface 20 contains processing logic, as will be discussed later in greater detail, for allowing switching between the MP3 player 30 and one or more of the auxiliary input sources 35.

Figure 2H:
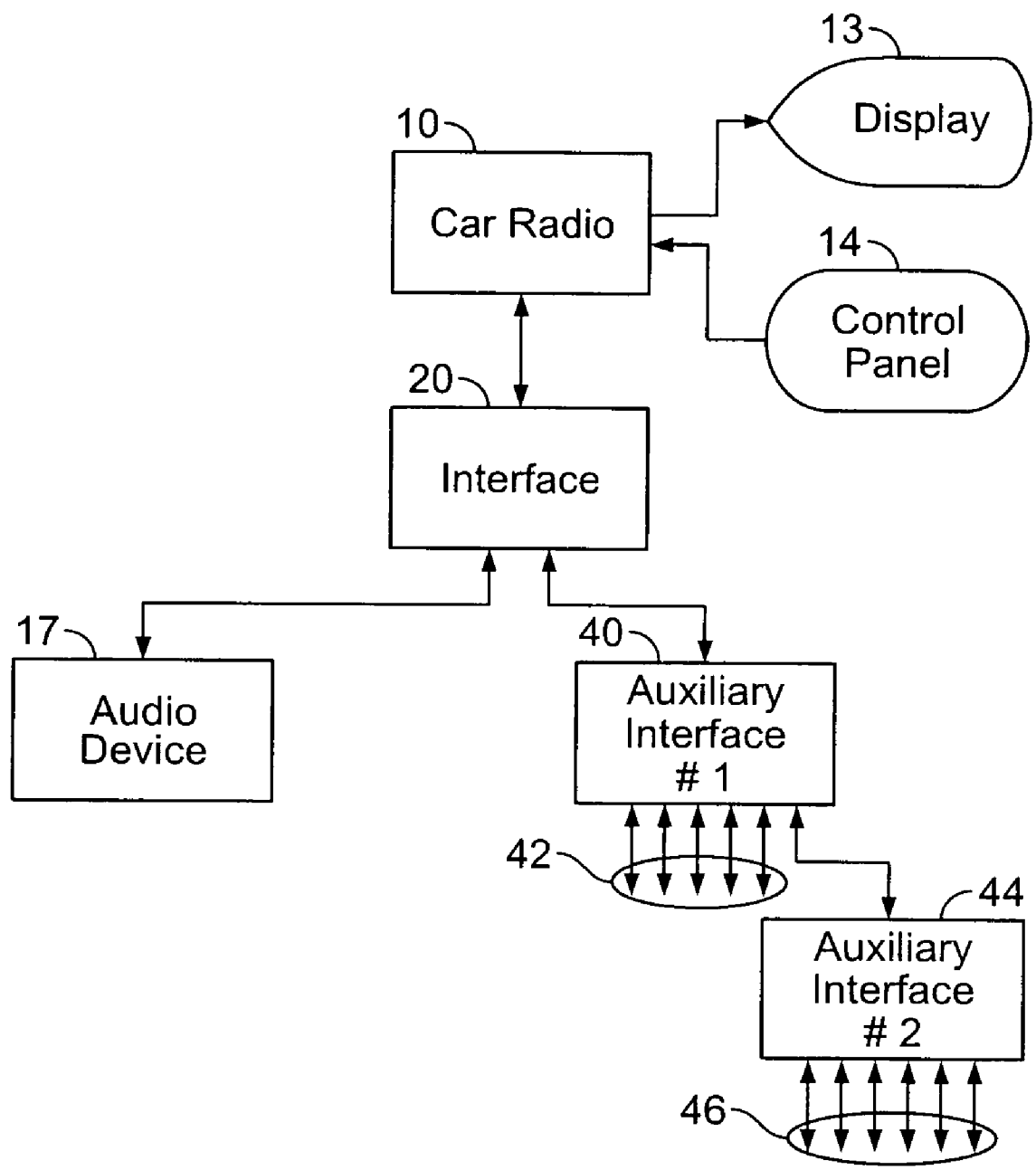
FIG. 2h is a block diagram showing an alternate embodiment of the present invention, wherein a plurality of auxiliary interfaces and an audio device are integrated with a car stereo.

FIG. 2h is a block diagram showing an alternate embodiment of the present invention, wherein a plurality of auxiliary interfaces 40 and 44 and an audio device 17 are integrated with an OEM or after-market car stereo 10. Importantly, the present invention can be expanded to allow a plurality of auxiliary inputs to be connected to the car stereo 10 in a tree-like fashion. Thus, as can be seen in FIG. 2h, a first auxiliary interface 40 is connected to the interface 20, and allows data and audio from the ports 42 to be exchanged with the car radio 10. Connected to one of the ports 42 is another auxiliary interface 44, which, in turn, provides a plurality of input ports 46. Any device connected to any of the ports 42 or 46 can be integrated with the car radio 10. Further, any device connected to the ports 42 or 46 can be inter-operable with the car radio 10, allowing commands to be entered from the car radio 10 (e.g., such as via the control panel 14) for commanding the device, and information from the device to be displayed by the car radio 10. Conceivably, by configuring the interfaces 40, 44, and successive interfaces in a tree configuration, any number of devices can be integrated using the present invention.

The various embodiments of the present invention described above and shown in FIGS. 1 through 2h are illustrative in nature and are not intended to limit the spirit or scope of the present invention. Indeed, any conceivable audio device or input source, in any desired combination, can be integrated by the present invention into existing car stereo systems. Further, it is conceivable that not only can data and audio signals be exchanged between the car stereo and any external device, but also video information that can be captured by the present invention, processed thereby, and transmitted to the car stereo for display thereby and interaction with a user thereat.

Various circuit configurations can be employed to carry out the present invention. Examples of such configurations are described below and shown in FIGS. 3a-3d.

Figure 3A:
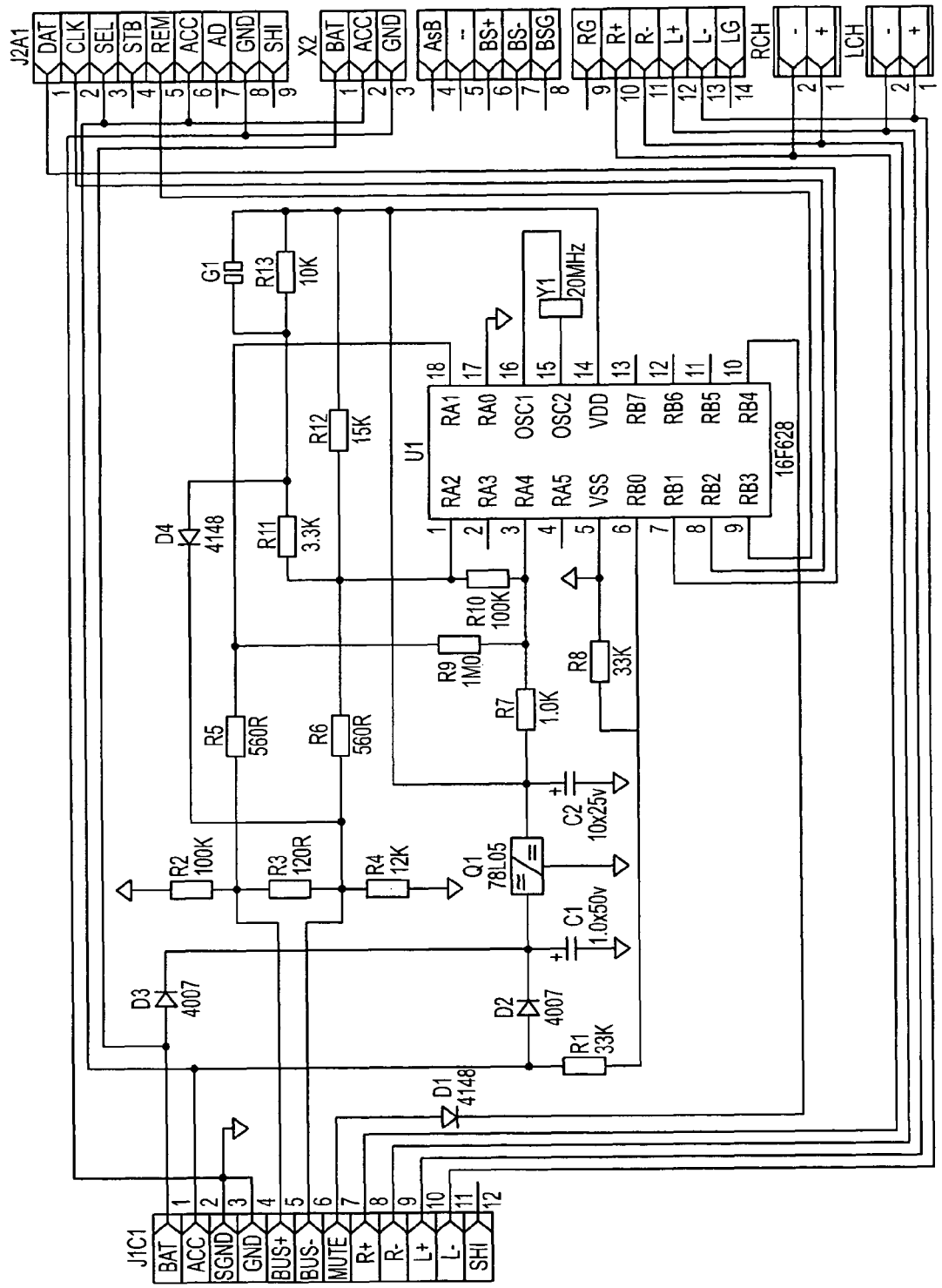
FIG. 3a is a circuit diagram showing a device according to the present invention for integrating a CD player or an auxiliary input source with a car radio.

FIG. 3a is an illustrative circuit diagram according to the present invention for integrating a CD player or an auxiliary input source with an existing car stereo system. A plurality of ports J1C1, J2A1, X2, RCH, and LCH are provided for allowing connection of the interface system of the present invention between an existing car radio, an after-market CD player or changer, or an auxiliary input source. Each of these ports could be embodied by any suitable electrical connector known in the art. Port J1C1 connects to the input port of an OEM car radio, such as that manufactured by TOYOTA, Inc.

Conceivably, port J1C1 could be modified to allow connection to the input port of an after-market car radio. Ports J2A1, X2, RCH, and LCH connect to an after-market CD changer, such as that manufactured by PANASONIC, Inc., or to an auxiliary input source.

Microcontroller U1 is in electrical communication with each of the ports J1C1, J2A1, and X2, and provides functionality for integrating the CD player or auxiliary input source connected to the ports J2A1, X2, RCH, and LCH. For example, microcontroller U1 receives control commands, such as button or key sequences, initiated by a user at control panel of the car radio and received at the connector J1C1, processes and formats same, and dispatches the formatted commands to the CD player or auxiliary input source via connector J2A1. Additionally, the microcontroller U1 receives information provided by the CD player or auxiliary input source via connector J2A1, processes and formats same, and transmits the formatted data to the car stereo via connector J1C1 for display on the display of the car stereo. Audio signals provided at the ports J2A1, X2, RCH and LCH is selectively channeled to the car radio at port J1C1 under control of one or more user commands and processing logic, as will be discussed in greater detail, embedded within microcontroller U1.

In a preferred embodiment of the present invention, the microcontroller U1 comprises the 16F628 microcontroller manufactured by MICROCHIP, Inc. The 16F628 chip is a CMOS, flash-based, 8-bit microcontroller having an internal, 4 MHz internal oscillator, 128 bytes of EEPROM data memory, a capture/compare/PWM, a USART, 2 comparators, and a programmable voltage reference. Of course, any suitable microcontroller known in the art can be substituted for microcontroller U1 without departing from the spirit or scope of the present invention.

A plurality of discrete components, such as resistors R1 through R13, diodes D1 through D4, capacitors C1 and C2, and oscillator Y1, among other components, are provided for interfacing the microcontroller U1 with the hardware connected to the connectors J1C1, J2A1, X2, RCH, and LCH. These components, as will be readily appreciated to one of ordinary skill in the art, can be arranged as desired to accommodate a variety of microcontrollers, and the numbers and types of discrete components can be varied to accommodate other similar controllers. Thus, the circuit shown in FIG. 3a and described herein is illustrative in nature, and modifications thereof are considered to be within the spirit and scope of the present invention.

Figure 3B:
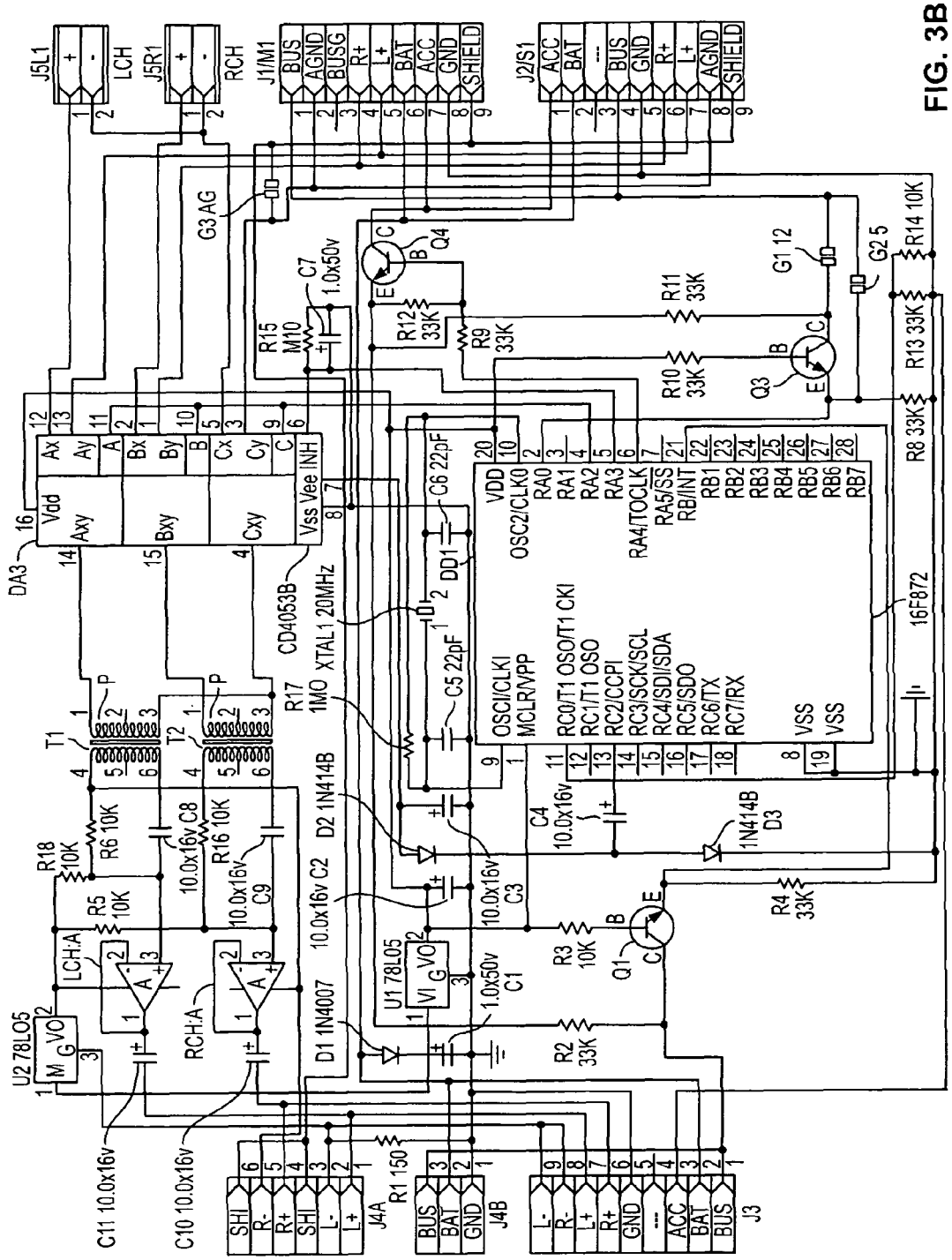
FIG. 3b is a circuit diagram showing a device according to the present invention for integrating both a CD player and an auxiliary input source with a car radio, wherein the CD player and the auxiliary input are switchable by a user.

FIG. 3b is a diagram showing an illustrative circuit configuration according to the present invention, wherein one or more after-market CD changers/players and an auxiliary input source are integrated with an existing car stereo, and wherein the user can select between the CD changer/player and the auxiliary input using the controls of the car stereo. A plurality of connectors are provided, illustratively indicated as ports J4A, J4B, J3, J5L1, J5R1, J1, and J2. Ports J4A, J4B, and J3 allow the audio device interface system of the present invention to be connected to one or more existing car stereos, such as an OEM car stereo or an after-market car stereo. Each of these ports could be embodied by any suitable electrical connector known in the art. For example, ports J4A and J4B can be connected to an OEM car stereo manufactured by BMW, Inc. Port J3 can be connected to a car stereo manufactured by LANDROVER, Inc. Of course, any number of car stereos, by any manufacturer, could be provided. Ports J1 and J2 allow connection to an after-market CD changer or player, such as that manufactured by ALPINE, Inc., and an auxiliary input source. Optionally, ports J5L1 and J5R1 allow integration of a standard analog (line-level) source. Of course, a single standalone CD player or auxiliary input source could be connected to either of ports J1 or J2.

Microcontroller DD1 is in electrical communication with each of the ports J4A, J4B, J3, J5L1, J5R1, J1, and J2, and provides functionality for integrating the CD player and auxiliary input source connected to the ports J1 and J2 with the car stereo connected to the ports J4A and J4B or J3. For example, microcontroller DD1 receives control commands, such as button or key sequences, initiated by a user at control panel of the car radio and received at the connectors J4A and J4B or J3, processes and formats same, and dispatches the formatted commands to the CD player and auxiliary input source via connectors J1 or J2. Additionally, the microcontroller DD1 receives information provided by the CD player and auxiliary input source via connectors J1 or J2, processes and formats same, and transmits the formatted data to the car stereo via connectors J4A and J4B or J3 for display on the display of the car stereo. Further, the microcontroller DD1 controls multiplexer DA3 to allow selection between the CD player/changer and the auxiliary input. Audio signals provided at the ports J1, J2, J5L1 and J5R1 is selectively channeled to the car radio at ports J4A and J4B or J3 under control of one or more user commands and processing logic, as will be discussed in greater detail, embedded within microcontroller DD1.

In a preferred embodiment of the present invention, the microcontroller DD1 comprises the 16F872 microcontroller manufactured by MICROCHIP, Inc. The 16F872 chip is a CMOS, flash-based, 8-bit microcontroller having 64 bytes of EEPROM data memory, self-programming capability, an ICD, 5 channels of 10 bit Analog-to-Digital (A/D) converters, 2 timers, capture/compare/PWM functions, a USART, and a synchronous serial port configurable as either a 3-wire serial peripheral interface or a 2-wire inter-integrated circuit bus. Of course, any suitable microcontroller known in the art can be substituted for microcontroller DD1 without departing from the spirit or scope of the present invention. Additionally, in a preferred embodiment of the present invention, the multiplexer DA3 comprises the CD4053 triple, two-channel analog multiplexer/demultiplexer manufactured by FAIRCHILD SEMICONDUCTOR, Inc. Any other suitable multiplexer can be substituted for DA3 without departing from the spirit or scope of the present invention.

A plurality of discrete components, such as resistors R1 through R18, diodes D1 through D3, capacitors C1-C11, and G1-G3, transistors Q1-Q3, transformers T1 and T2, amplifiers LCH:A and LCH:B, oscillator XTAL1, among other components, are provided for interfacing the microcontroller DD1 and the multiplexer DA3 with the hardware connected to the connectors J4A, J4B, J3, J5L1, J5R1, J1, and J2. These components, as will be readily appreciated to one of ordinary skill in the art, can be arranged as desired to accommodate a variety of microcontrollers and multiplexers, and the numbers and types of discrete components can be varied to accommodate other similar controllers and multiplexers. Thus, the circuit shown in FIG. 3b and described herein is illustrative in nature, and modifications thereof are considered to be within the spirit and scope of the present invention.

Figure 3C:
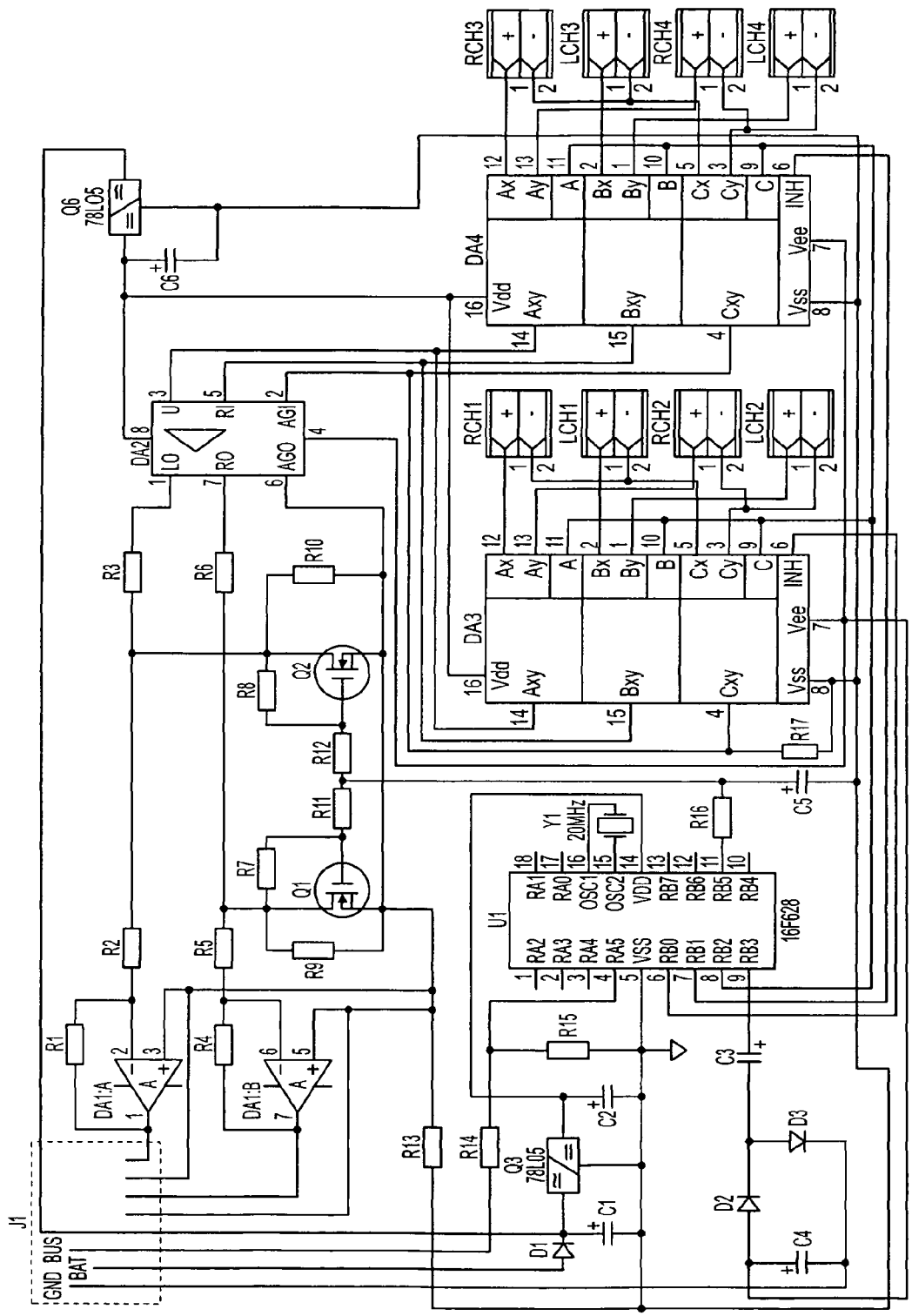
FIG. 3c is a circuit diagram showing a device according to the present invention for integrating a plurality of auxiliary input sources with a car radio.

FIG. 3c is a diagram showing an illustrative circuit configuration for integrating a plurality of auxiliary inputs using the controls of the car stereo. A plurality of connectors are provided, illustratively indicated as ports J1, RCH1, LCH1, RCH2, LCH2, RCH3, LCH3, RCH4, and LCH4. Port J1 allows the multimedia device integration system of the present invention to be connected to one or more existing car stereos. Each of these ports could be embodied by any suitable electrical connector known in the art. For example, port J1 could be connected to an OEM car stereo manufactured by HONDA, Inc., or any other manufacturer. Ports RCH1, LCH1, RCH2, LCH2, RCH3, LCH3, RCH4, and LCH4 allow connection with the left and right channels of four auxiliary input sources. Of course, any number of auxiliary input sources and ports/connectors could be provided.

Microcontroller U1 is in electrical communication with each of the ports J1, RCH1, LCH1, RCH2, LCH2, RCH3, LCH3, RCH4, and LCH4, and provides functionality for integrating one or more auxiliary input sources connected to the ports RCH1, LCH1, RCH2, LCH2, RCH3, LCH3, RCH4, and LCH4 with the car stereo connected to the port J1. Further, the microcontroller U1 controls multiplexers DA3 and DA4 to allow selection amongst any of the auxiliary inputs using the controls of the car stereo. Audio signals provided at the ports RCH1, LCH1, RCH2, LCH2, RCH3, LCH3, RCH4, and LCH4 are selectively channeled to the car radio at port J1 under control of one or more user commands and processing logic, as will be discussed in greater detail, embedded within microcontroller U1. In a preferred embodiment of the present invention, the microcontroller U1 comprises the 16F872 microcontroller discussed earlier. Additionally, in a preferred embodiment of the present invention, the multiplexers DA3 and DA4 comprises the CD4053 triple, two-channel analog multiplexer/demultiplexer, discussed earlier. Any other suitable microcontroller and multiplexers can be substituted for U1, DA3, and DA4 without departing from the spirit or scope of the present invention.

A plurality of discrete components, such as resistors R1 through R15, diodes D1 through D3, capacitors C1-C5, transistors Q1-Q2, amplifiers DA1:A and DA1:B, and oscillator Y1, among other components, are provided for interfacing the microcontroller U1 and the multiplexers DA3 and DA4 with the hardware connected to the ports J1, RCH1, LCH1, RCH2, LCH2, RCH3, LCH3, RCH4, and LCH4. These components, as will be readily appreciated to one of ordinary skill in the art, can be arranged as desired to accommodate a variety of microcontrollers and multiplexers, and the numbers and types of discrete components can be varied to accommodate other similar controllers and multiplexers. Thus, the circuit shown in FIG. 3c and described herein is illustrative in nature, and modifications thereof are considered to be within the spirit and scope of the present invention.

Figure 3D:
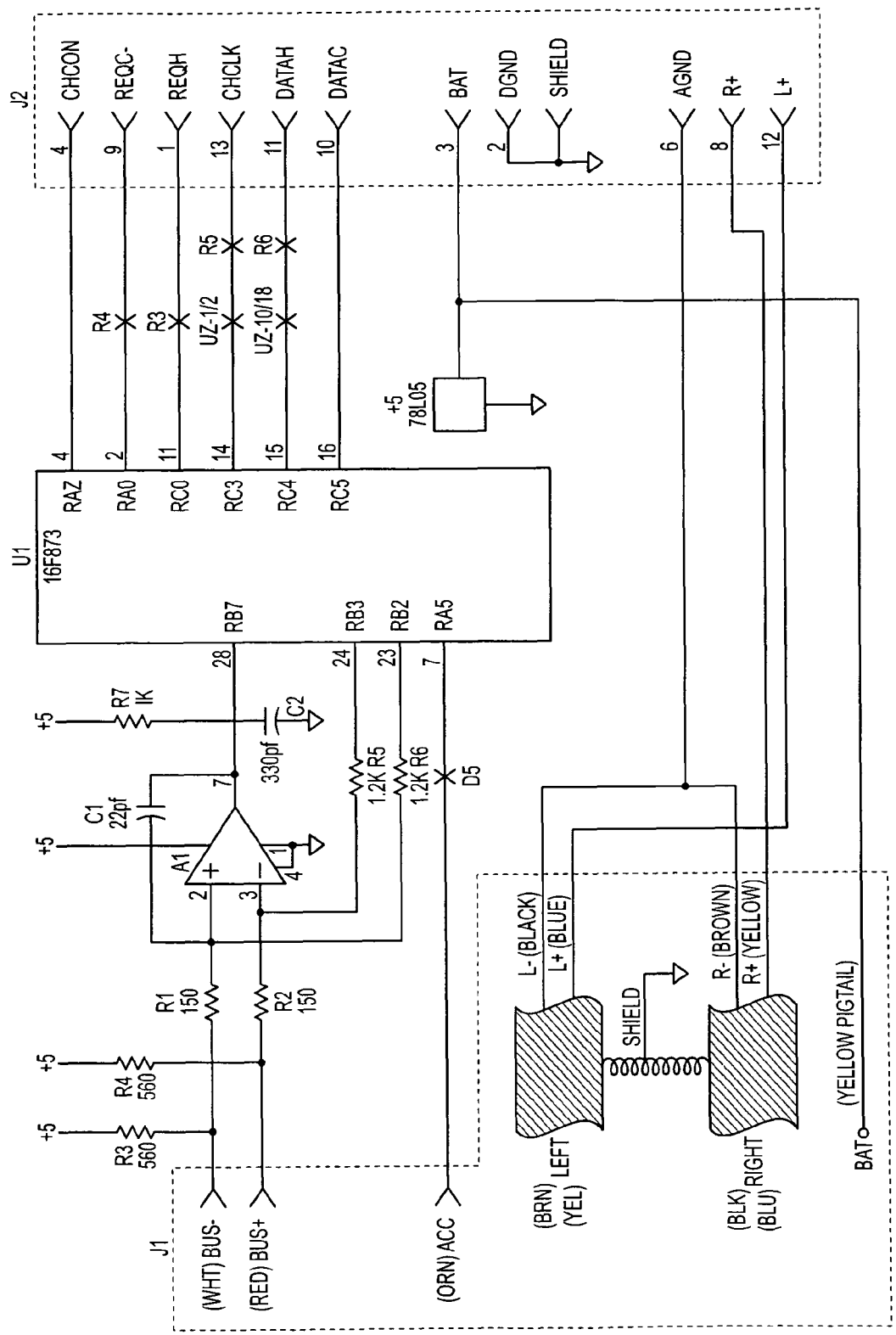
FIG. 3d is a circuit diagram showing a device according to the present invention for integrating a satellite or DAB receiver with a car radio.

FIG. 3d is an illustrative circuit diagram according to the present invention for integrating a satellite receiver with an existing OEM or after-market car stereo system. Ports J1 and J2 are provided for allowing connection of the integration system of the present invention between an existing car radio and a satellite receiver. These ports could be embodied by any suitable electrical connector known in the art. Port J2 connects to the input port of an existing car radio, such as that manufactured by KENWOOD, Inc. Port 1 connects to an after-market satellite receiver, such as that manufactured by PIONEER, Inc.

Microcontroller U1 is in electrical communication with each of the ports J1 and J2, and provides functionality for integrating the satellite receiver connected to the port J1 with the car stereo connected to the port J2. For example, microcontroller U1 receives control commands, such as button or key sequences, initiated by a user at control panel of the car radio and received at the connector J2, processes and formats same, and dispatches the formatted commands to the satellite receiver via connector J2. Additionally, the microcontroller U1 receives information provided by the satellite receiver via connector J1, processes and formats same, and transmits the formatted data to the car stereo via connector J2 for display on the display of the car stereo. Audio signals provided at the port J1 is selectively channeled to the car radio at port J2 under control of one or more user commands and processing logic, as will be discussed in greater detail, embedded within microcontroller U1.

In a preferred embodiment of the present invention, the microcontroller U1 comprises the 16F873 microcontroller manufactured by MICROCHIP, Inc. The 16F873 chip is a CMOS, flash-based, 8-bit microcontroller having 128 bytes of EEPROM data memory, self-programming capability, an ICD, 5 channels of 10 bit Analog-to-Digital (A/D) converters, 2 timers, 2 capture/compare/PWM functions, a synchronous serial port that can be configured as a either a 3-wire serial peripheral interface or a 2-wire inter-integrated circuit bus, and a USART. Of course, any suitable microcontroller known in the art can be substituted for microcontroller U1 without departing from the spirit or scope of the present invention. A plurality of discrete components, such as resistors R1 through R7, capacitors C1 and C2, and amplifier A1, among other components, are provided for interfacing the microcontroller U1 with the hardware connected to the connectors J1 and J2. These components, as will be readily appreciated to one of ordinary skill in the art, can be arranged as desired to accommodate a variety of microcontrollers, and the numbers and types of discrete components can be varied to accommodate other similar controllers. Thus, the circuit shown in FIG. 3d and described herein is illustrative in nature, and modifications thereof are considered to be within the spirit and scope of the present invention.

FIGS. 4a through 6 are flowcharts showing processing logic according to the present invention. Such logic can be embodied as software and/or instructions stored in a read-only memory circuit (e.g., and EEPROM circuit), or other similar device. In a preferred embodiment of the present invention, the processing logic described herein is stored in one or more microcontrollers, such as the microcontrollers discussed earlier with reference to FIGS. 3a-3d. Of course, any other suitable means for storing the processing logic of the present invention can be employed.

Figure 4A:
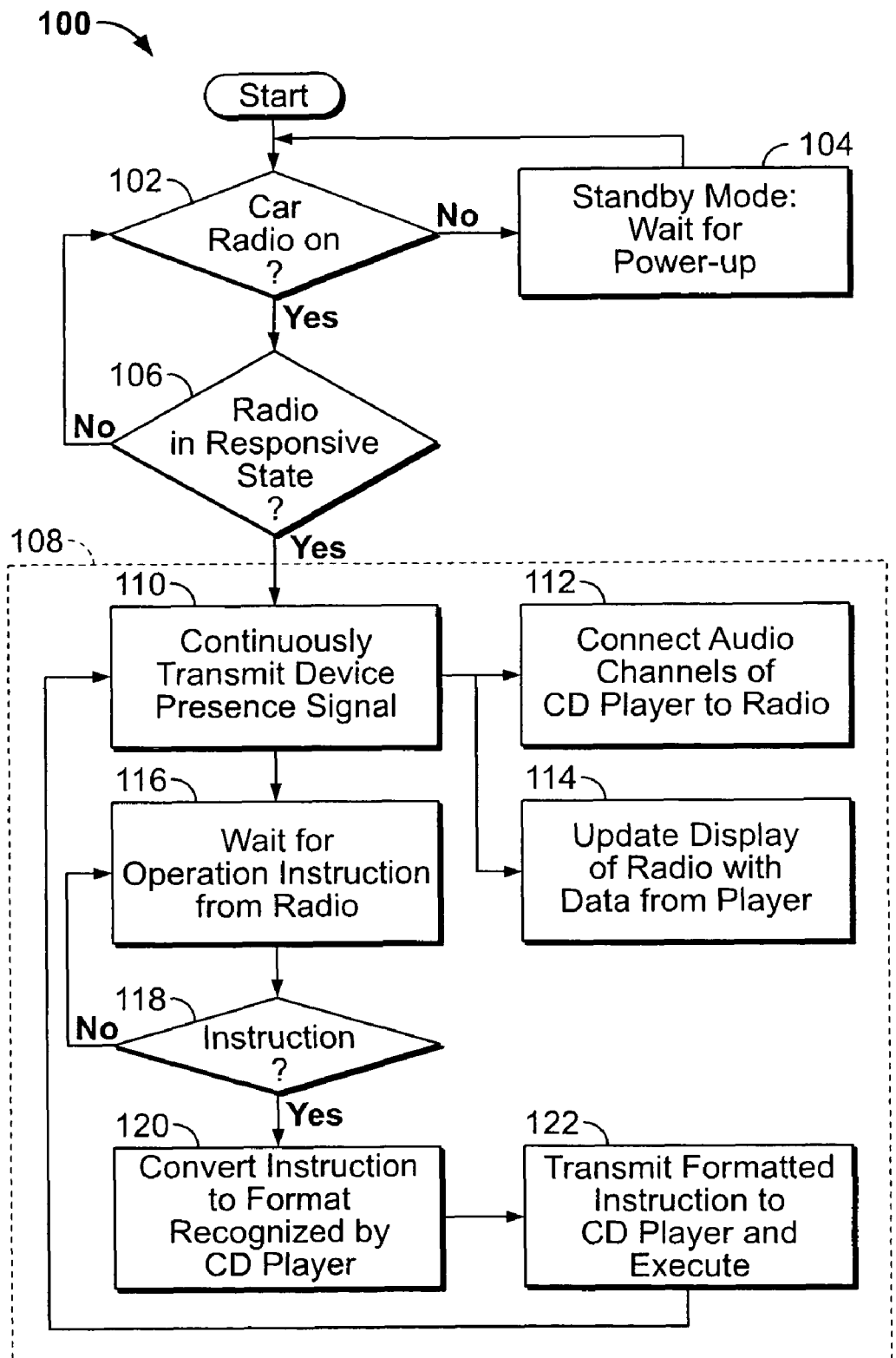
FIG. 4a is a flowchart showing processing logic according to the present invention for integrating a CD player with a car radio.

FIG. 4a is a flowchart showing processing logic, indicated generally at 100, for integrating a CD player or changer with an existing OEM or after-market car stereo system. Beginning in step 100, a determination is made as to whether the existing car stereo is powered on. If a negative determination is made, step 104 is invoked, wherein the present invention enters a standby mode and waits for the car stereo to be powered on. If a positive determination is made, step 106 is invoked, wherein a second determination is made as to whether the car stereo is in a state responsive to signals external to the car stereo. If a negative determination is made, step 106 is re-invoked.

If a positive determination is made in step 106, a CD handling process, indicated as block 108, is invoked, allowing the CD player/changer to exchange data and audio signals with any existing car stereo system. Beginning in step 110, a signal is generated by the present invention indicating that a CD player/changer is present, and the signal is continuously transmitted to the car stereo. Importantly, this signal prevents the car stereo from shutting off, entering a sleep mode, or otherwise being unresponsive to signals and/or data from an external source. If the car radio is an OEM car radio, the CD player presence signal need not be generated. Further, the signal need not be limited to a CD player device presence signal, but rather, could be any type of device presence signal (e.g., MP3 player device presence signal, satellite receiver presence signal, video device presence signal, cellular telephone presence signal, or any other type of device presence signal). Concurrently with step 110, or within a short period of time before or after the execution of step 110, steps 112 and 114 are invoked. In step 112, the audio channels of the CD player/changer are connected (channeled) to the car stereo system, allowing audio from the CD player/changer to be played through the car stereo. In step 114, data is retrieved by the present invention from the CD player/changer, including track and time information, formatted, and transmitted to the car stereo for display by the car stereo. Thus, information produced by the external CD player/changer can be quickly and conveniently viewed by a driver by merely viewing the display of the car stereo. After steps 110, 112, and 114 have been executed, control passes to step 116.

In steps 116, the present invention monitors the control panel buttons of the car stereo for CD operational commands. Examples of such commands include track forward, track reverse, play, stop, fast forward, rewind, track program, random track play, and other similar commands. In step 118, if a command is not detected, step 116 is re-invoked. Otherwise, if a command is received, step 118 invokes step 120, wherein the received command is converted into a format recognizable by the CD player/changer connected to the present invention. For example, in this step, a command issued from a GM car radio is converted into a format recognizable by a CD player/changer manufactured by ALPINE, Inc. Any conceivable command from any type of car radio can be formatted for use by a CD player/changer of any type or manufacture. Once the command has been formatted, step 122 is invoked, wherein the formatted command is transmitted to the CD player/changer and executed. Step 110 is then re-invoked, so that additional processing can occur.

Figure 4B:
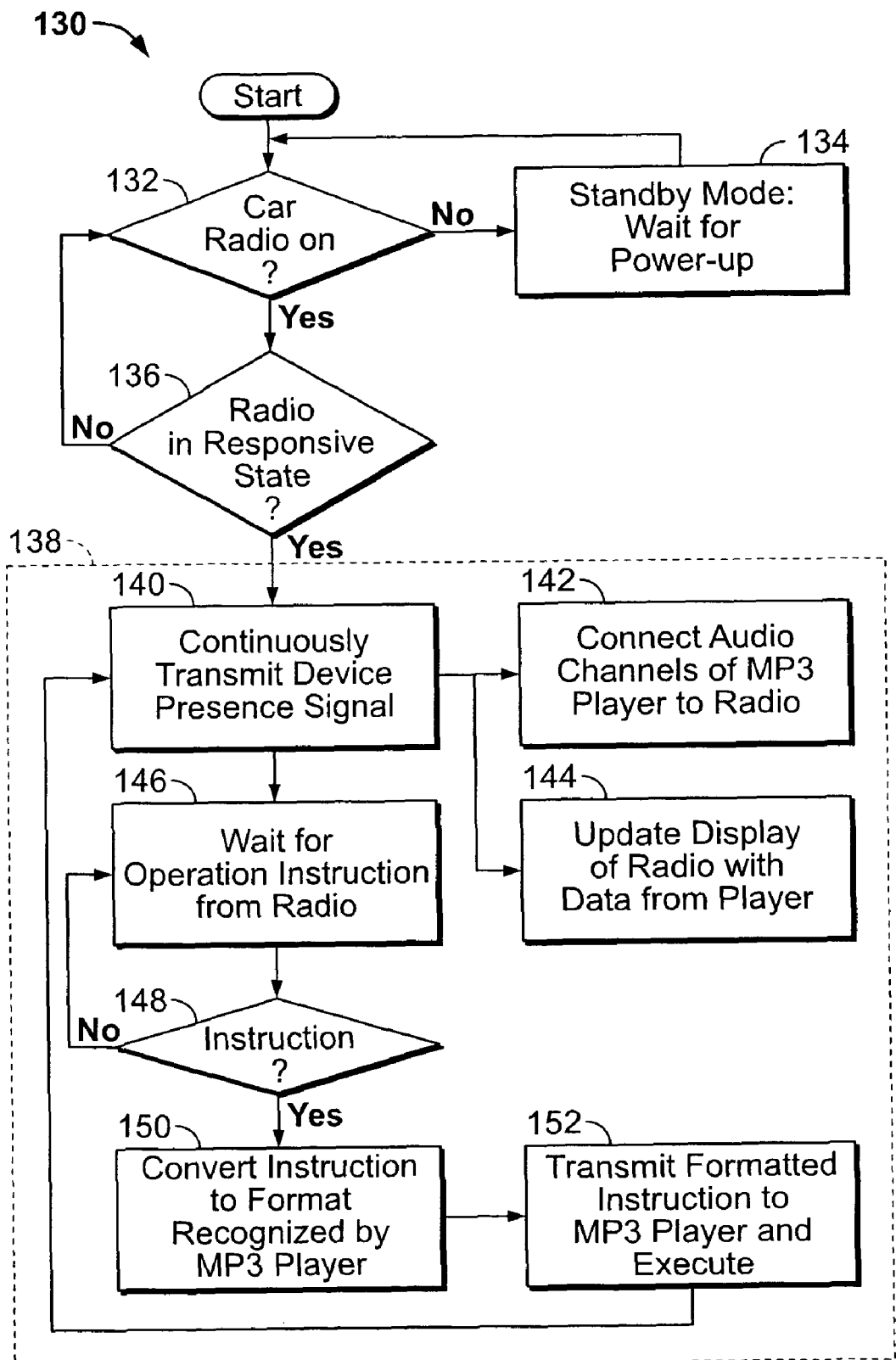
FIG. 4b is a flowchart showing processing logic according to the present invention for integrating a MP3 player with a car radio.

FIG. 4b is a flowchart showing processing logic, indicated generally at 130, for integrating an MP3 player with an existing car stereo system. Examples of MP3 players that can be integrated by the present invention include, but are not limited to, the Apple ipod and other types of digital media devices. Beginning in step 132, a determination is made as to whether the existing car stereo is powered on. If a negative determination is made, step 134 is invoked, wherein the present invention enters a standby mode and waits for the car stereo to be powered on. If a positive determination is made, step 136 is invoked, wherein a second determination is made as to whether the car stereo is in a state responsive to signals external to the car stereo. If a negative determination is made, step 136 is re-invoked.

If a positive determination is made in step 136, an MP3 handling process, indicated as block 138, is invoked, allowing the MP3 player to exchange data and audio signals with any existing car stereo system. Beginning in step 140, a signal is generated by the present invention indicating that an MP3 player is present, and the signal is continuously transmitted to the car stereo. Importantly, this signal prevents the car stereo from shutting off, entering a sleep mode, or otherwise being unresponsive to signals and/or data from an external source. In step 142, the audio channels of the MP3 player are connected (channeled) to the car stereo system, allowing audio from the MP3 player to be played through the car stereo. In step 144, data is retrieved by the present invention from the MP3 player, including track, time, title, and song information, formatted, and transmitted to the car stereo for display by the car stereo. Thus, information produced by the MP3 player can be quickly and conveniently viewed by a driver by merely viewing the display of the car stereo. After steps 140, 142, and 144 have been executed, control passes to step 146.

In steps 146, the present invention monitors the control panel buttons of the car stereo for MP3 operational commands. Examples of such commands include track forward, track reverse, play, stop, fast forward, rewind, track program, random track play, and other similar commands. In step 148, if a command is not detected, step 146 is re-invoked. Otherwise, if a command is received, step 148 invokes step 150, wherein the received command is converted into a format recognizable by the MP3 player connected to the present invention. For example, in this step, a command issued from a HONDA car radio is converted into a format recognizable by an MP3 player manufactured by PANASONIC, Inc. Any conceivable command from any type of car radio can be formatted for use by an MP3 player of any type or manufacture. Once the command has been formatted, step 152 is invoked, wherein the formatted command is transmitted to the MP3 player and executed. Step 140 is then re-invoked, so that additional processing can occur.

Figure 4C:
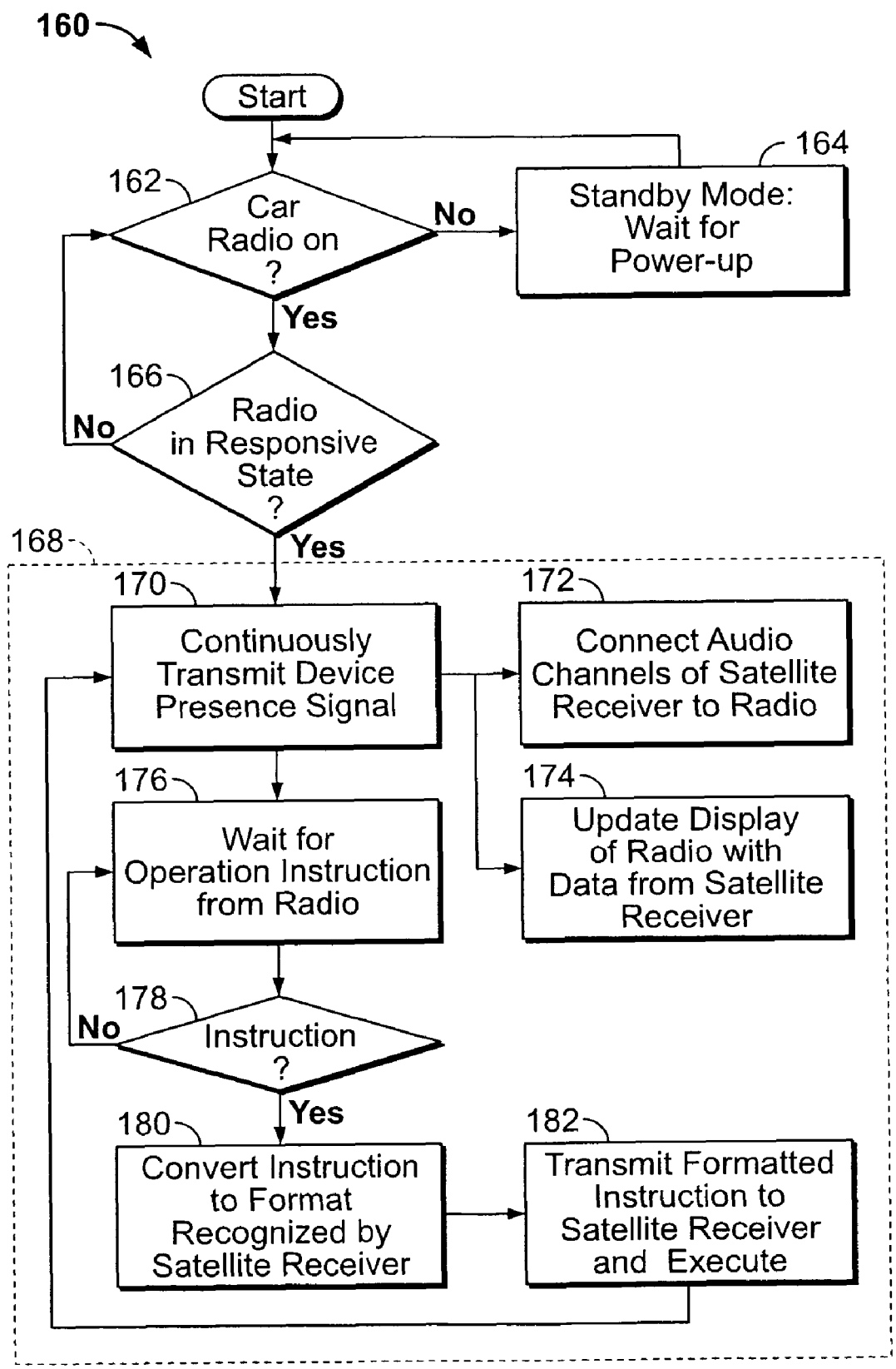
FIG. 4c is a flowchart showing processing logic according to the present invention for integrating a satellite receiver with a car radio.

FIG. 4c is a flowchart showing processing logic, indicated generally at 160, for integrating a satellite receiver or a DAB receiver with an existing car stereo system. Beginning in step 162, a determination is made as to whether the existing car stereo is powered on. If a negative determination is made, step 164 is invoked, wherein the present invention enters a standby mode and waits for the car stereo to be powered on. If a positive determination is made, step 166 is invoked, wherein a second determination is made as to whether the car stereo is in a state responsive to signals external to the car stereo. If a negative determination is made, step 166 is re-invoked.

If a positive determination is made in step 166, a satellite/DAB receiver handling process, indicated as block 168, is invoked, allowing the satellite/DAB receiver to exchange data and audio signals with any existing car stereo system. Beginning in step 170, a signal is generated by the present invention indicating that a satellite or DAB receiver is present, and the signal is continuously transmitted to the car stereo. Importantly, this signal prevents the car stereo from shutting off, entering a sleep mode, or otherwise being unresponsive to signals and/or data from an external source. In step 172, the audio channels of the satellite/DAB receiver are connected (channeled) to the car stereo system, allowing audio from the satellite receiver or DAB receiver to be played through the car stereo. In step 174, data is retrieved by the present invention from the satellite/DAB receiver, including channel number, channel name, artist name, song time, and song title, formatted, and transmitted to the car stereo for display by the car stereo. The information could be presented in one or more menus, or via a graphical interface viewable and manipulable by the user at the car stereo. Thus, information produced by the receiver can be quickly and conveniently viewed by a driver by merely viewing the display of the car stereo. After steps 170, 172, and 174 have been executed, control passes to step 176.

In steps 176, the present invention monitors the control panel buttons of the car stereo for satellite/DAB receiver operational commands. Examples of such commands include station up, station down, station memory program, and other similar commands. In step 178, if a command is not detected, step 176 is re-invoked. Otherwise, if a command is received, step 178 invokes step 180, wherein the received command is converted into a format recognizable by the satellite/DAB receiver connected to the present invention. For example, in this step, a command issued from a FORD car radio is converted into a format recognizable by a satellite receiver manufactured by PIONEER, Inc. Any conceivable command from any type of car radio can be formatted for use by a satellite/DAB receiver of any type or manufacture. Once the command has been formatted, step 182 is invoked, wherein the formatted command is transmitted to the satellite/DAB receiver and executed. Step 170 is then re-invoked, so that additional processing can occur.

Figure 4D:
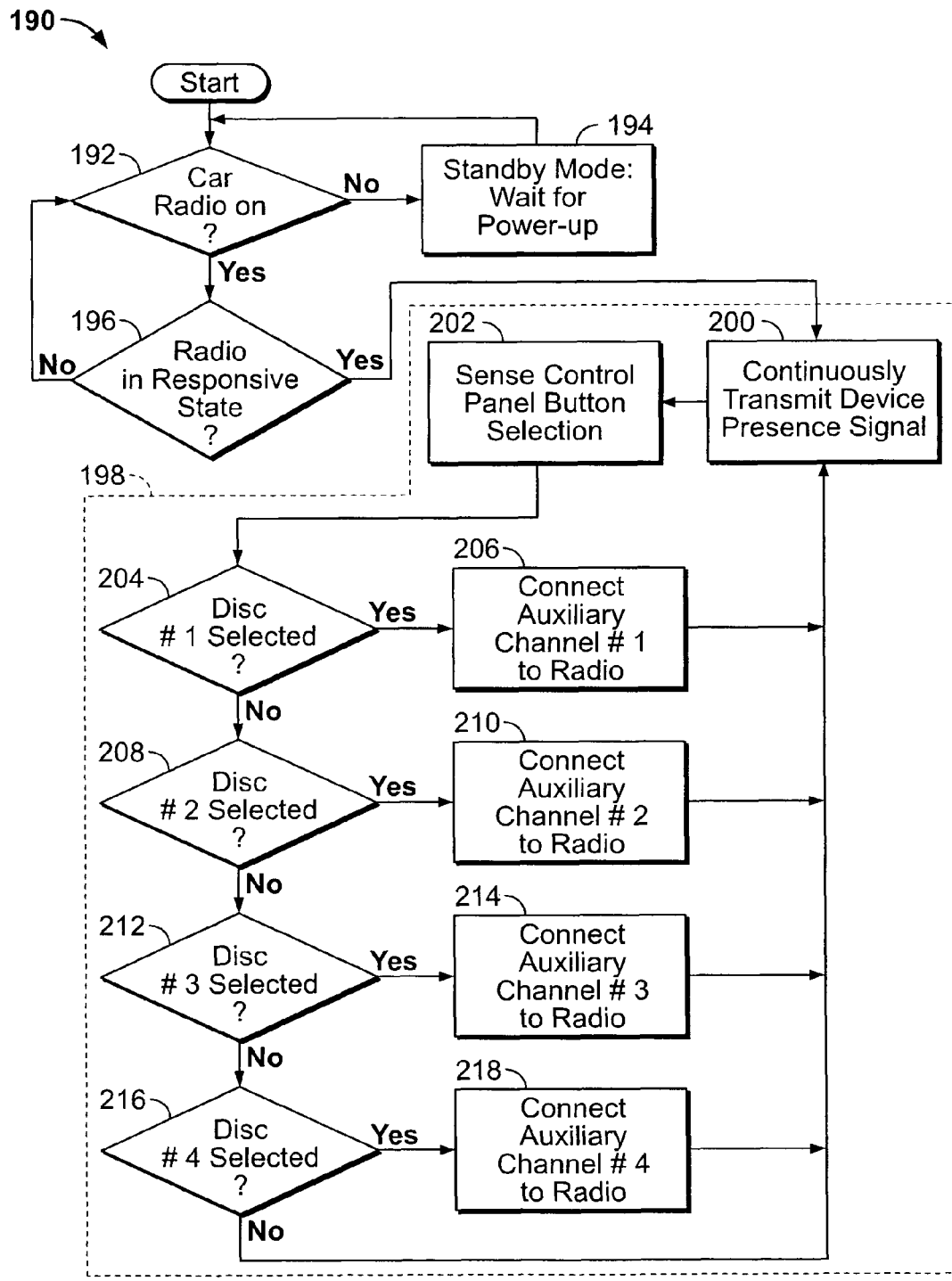
FIG. 4d is a flowchart showing processing logic according to the present invention for integrating a plurality of auxiliary input sources with a car radio.

FIG. 4d is a flowchart showing processing logic, indicated generally at 190, for integrating a plurality of auxiliary input sources with a car radio. Beginning in step 192, a determination is made as to whether the existing car stereo is powered on. If a negative determination is made, step 194 is invoked, wherein the present invention enters a standby mode and waits for the car stereo to be powered on. If a positive determination is made, step 196 is invoked, wherein a second determination is made as to whether the car stereo is in a state responsive to signals external to the car stereo. If a negative determination is made, step 196 is re-invoked.

If a positive determination is made in step 196, an auxiliary input handling process, indicated as block 198, is invoked, allowing one or more auxiliary inputs to be connected (channeled) to the car stereo. Further, if a plurality of auxiliary inputs exist, the logic of block 198 allows a user to select a desired input from the plurality of inputs. Beginning in step 200, a signal is generated by the present invention indicating that an external device is present, and the signal is continuously transmitted to the car stereo. Importantly, this signal prevents the car stereo from shutting off, entering a sleep mode, or otherwise being unresponsive to signals and/or data from an external source. Then, in step 202, the control panel buttons of the car stereo are monitored.

In a preferred embodiment of the present invention, each of the one or more auxiliary input sources are selectable by selecting a CD disc number on the control panel of the car radio. Thus, in step 204, a determination is made as to whether the first disc number has been selected. If a positive determination is made, step 206 is invoked, wherein the first auxiliary input source is connected (channeled) to the car stereo. If a negative determination is made, step 208 is invoked, wherein a second determination is made as to whether the second disc number has been selected. If a positive determination is made, step 210 is invoked, wherein the second auxiliary input source is connected (channeled) to the car stereo. If a negative determination is made, step 212 is invoked, wherein a third determination is made as to whether the third disc number has been selected. If a positive determination is made, step 214 is invoked, wherein the third auxiliary input source is connected (channeled) to the car stereo. If a negative determination is made, step 216 is invoked, wherein a fourth determination is made as to whether the fourth disc number has been selected. If a positive determination is made, step 218 is invoked, wherein the fourth auxiliary input source is connected (channeled) to the car stereo. If a negative determination is made, step 200 is re-invoked, and the process disclosed for block 198 repeated. Further, if any of steps 206, 210, 214, or 218 are executed, then step 200 is re-invoked and block 198 repeated.

The process disclosed in block 198 allows a user to select from one of four auxiliary input sources using the control buttons of the car stereo. Of course, the number of auxiliary input sources connectable with and selectable by the present invention can be expanded to any desired number. Thus, for example, 6 auxiliary input sources could be provided and switched using corresponding selection key(s) or keystroke(s) on the control panel of the radio. Moreover, any desired keystroke, selection sequence, or button(s) on the control panel of the radio, or elsewhere, can be utilized to select from the auxiliary input sources without departing from the spirit or scope of the present invention.

Figure 4E:
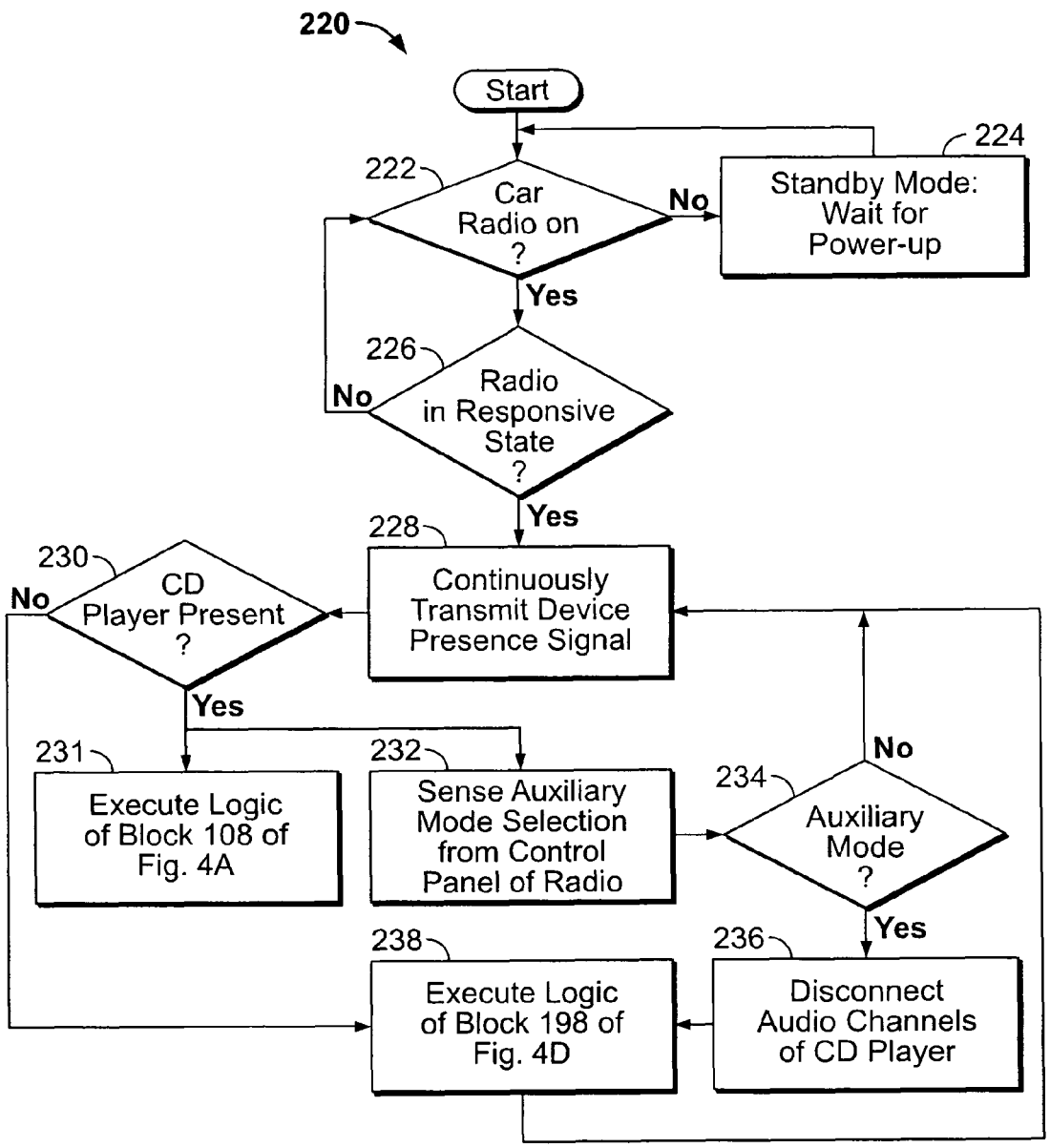
FIG. 4e is a flowchart showing processing logic according to the present invention for integrating a CD player and one or more auxiliary input sources with a car radio.

FIG. 4e is a flowchart showing processing logic, indicated generally at 220, for integrating a CD player and one or more auxiliary input sources with a car radio. Beginning in step 222, a determination is made as to whether the existing car stereo is powered on. If a negative determination is made, step 224 is invoked, wherein the present invention enters a standby mode and waits for the car stereo to be powered on. If a positive determination is made, step 226 is invoked, wherein a second determination is made as to whether the car stereo is in a state responsive to signals external to the cars stereo. If a negative determination is made, step 226 is re-invoked.

If a positive determination is made in step 226, then step 228 is invoked, wherein a signal is generated by the present invention indicating that an external device is present, and the signal is continuously transmitted to the car stereo. Importantly, this signal prevents the car stereo from shutting off, entering a sleep mode, or otherwise being unresponsive to signals and/or data from an external source. Then, in step 230, a determination is made as to whether a CD player is present (i.e., whether an external CD player or changer is connected to the multimedia device integration system of the present invention). If a positive determination is made, steps 231 and 232 are invoked. In step 231, the logic of block 108 of FIG. 4a (the CD handling process), described earlier, is invoked, so that the CD player/changer can be integrated with the car stereo and utilized by a user. In step 232, a sensing mode is initiated, wherein the present invention monitors for a selection sequence (as will be discussed in greater detail) initiated by the user at the control panel of the car stereo for switching from the external CD player/changer to one or more auxiliary input sources. Step 234 is then invoked, wherein a determination is made as to whether such a sequence has been initiated. If a negative determination is made, step 234 re-invokes step 228, so that further processing can occur. Otherwise, if a positive determination is made (i.e., the user desires to switch from the external CD player/changer to one of the auxiliary input sources), step 236 is invoked, wherein the audio channels of the CD player/changer are disconnected from the car stereo. Then, step 238 is invoked, wherein the logic of block 198 of FIG. 4d (the auxiliary input handling process), discussed earlier, is executed, allowing the user to select from one of the auxiliary input sources. In the event that a negative determination is made in step 230 (no external CD player/changer is connected to the present invention), then step 238 is invoked, and the system goes into auxiliary mode. The user can then select from one or more auxiliary input sources using the controls of the radio.

Figure 4F:
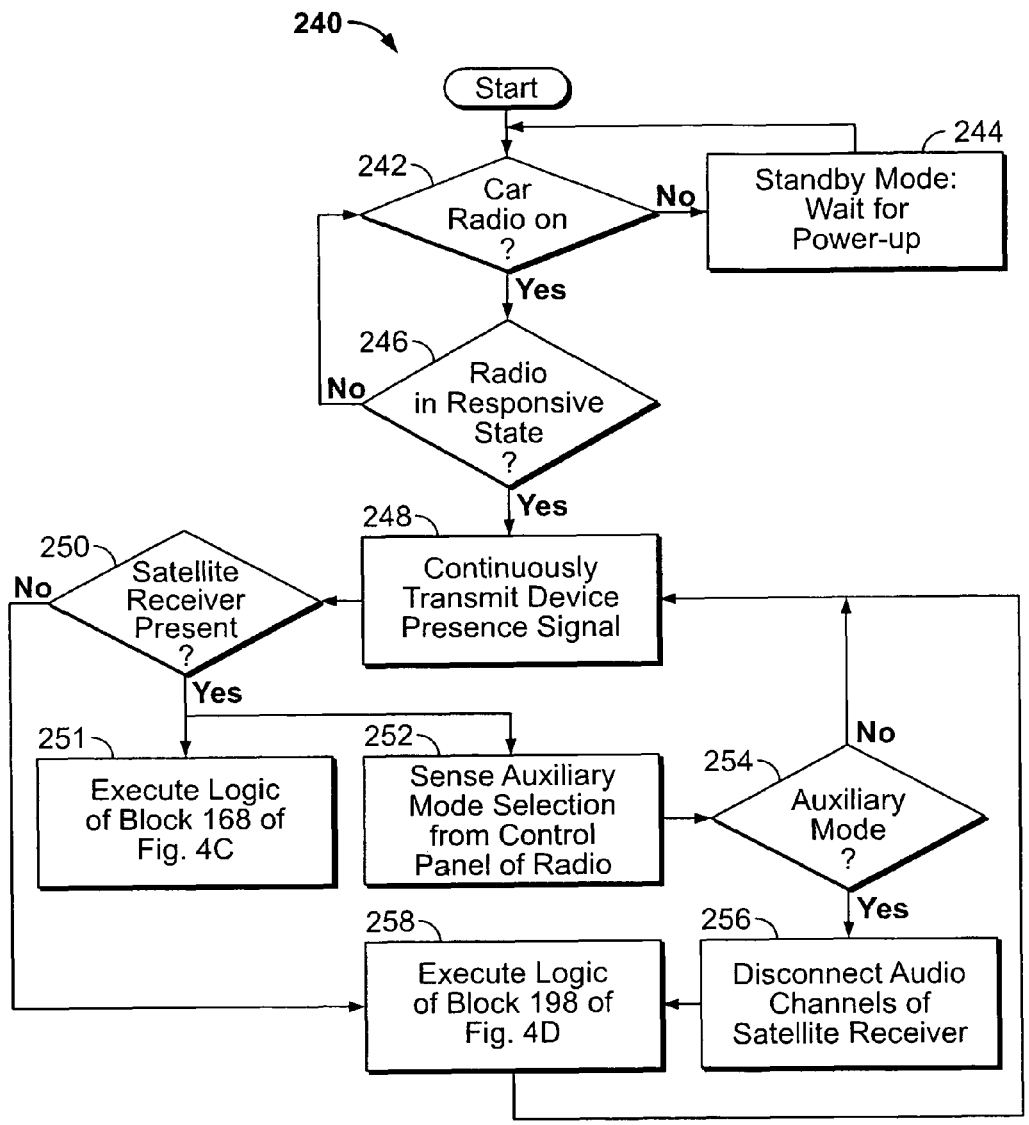
FIG. 4f is a flowchart showing processing logic according to the present invention for integrating a satellite or DAB receiver and one or more auxiliary input sources with a car radio.

FIG. 4f is a flowchart showing processing logic, indicated generally at 240, for integrating a satellite receiver or DAB receiver and one or more auxiliary input sources with a car radio. Beginning in step 242, a determination is made as to whether the existing car stereo is powered on. If a negative determination is made, step 244 is invoked, wherein the present invention enters a standby mode and waits for the car stereo to be powered on. If a positive determination is made, step 246 is invoked, wherein a second determination is made as to whether the car stereo is in a state responsive to signals external to the car stereo. If a negative determination is made, step 246 is re-invoked.

If a positive determination is made in step 246, then step 248 is invoked, wherein a signal is generated by the present invention indicating that an external device is present, and the signal is continuously transmitted to the car stereo. Importantly, this signal prevents the car stereo from shutting off, entering a sleep mode, or otherwise being unresponsive to signals and/or data from an external source. Then, in step 250, a determination is made as to whether a satellite receiver or DAB receiver is present (i.e., whether an external satellite receiver or DAB receiver is connected to the multimedia device integration system of the present invention). If a positive determination is made, steps 251 and 252 are invoked. In step 251, the logic of block 168 of FIG. 4c (the satellite/DAB receiver handling process), described earlier, is invoked, so that the satellite receiver can be integrated with the car stereo and utilized by a user. In step 252, a sensing mode is initiated, wherein the present invention monitors for a selection sequence (as will be discussed in greater detail) initiated by the user at the control panel of the car stereo for switching from the external satellite receiver to one or more auxiliary input sources. Step 254 is then invoked, wherein a determination is made as to whether such a sequence has been initiated. If a negative determination is made, step 254 re-invokes step 258, so that further processing can occur. Otherwise, if a positive determination is made (i.e., the user desires to switch from the external satellite/DAB receiver to one of the auxiliary input sources), step 256 is invoked, wherein the audio channels of the satellite receiver are disconnected from the car stereo. Then, step 258 is invoked, wherein the logic of block 198 of FIG. 4d (the auxiliary input handling process), discussed earlier, is executed, allowing the user to select from one of the auxiliary input sources. In the event that a negative determination is made in step 250 (no external satellite/DAB receiver is connected to the present invention), then step 258 is invoked, and the system goes into auxiliary mode. The user can then select from one or more auxiliary input sources using the controls of the radio.

Figure 4G:
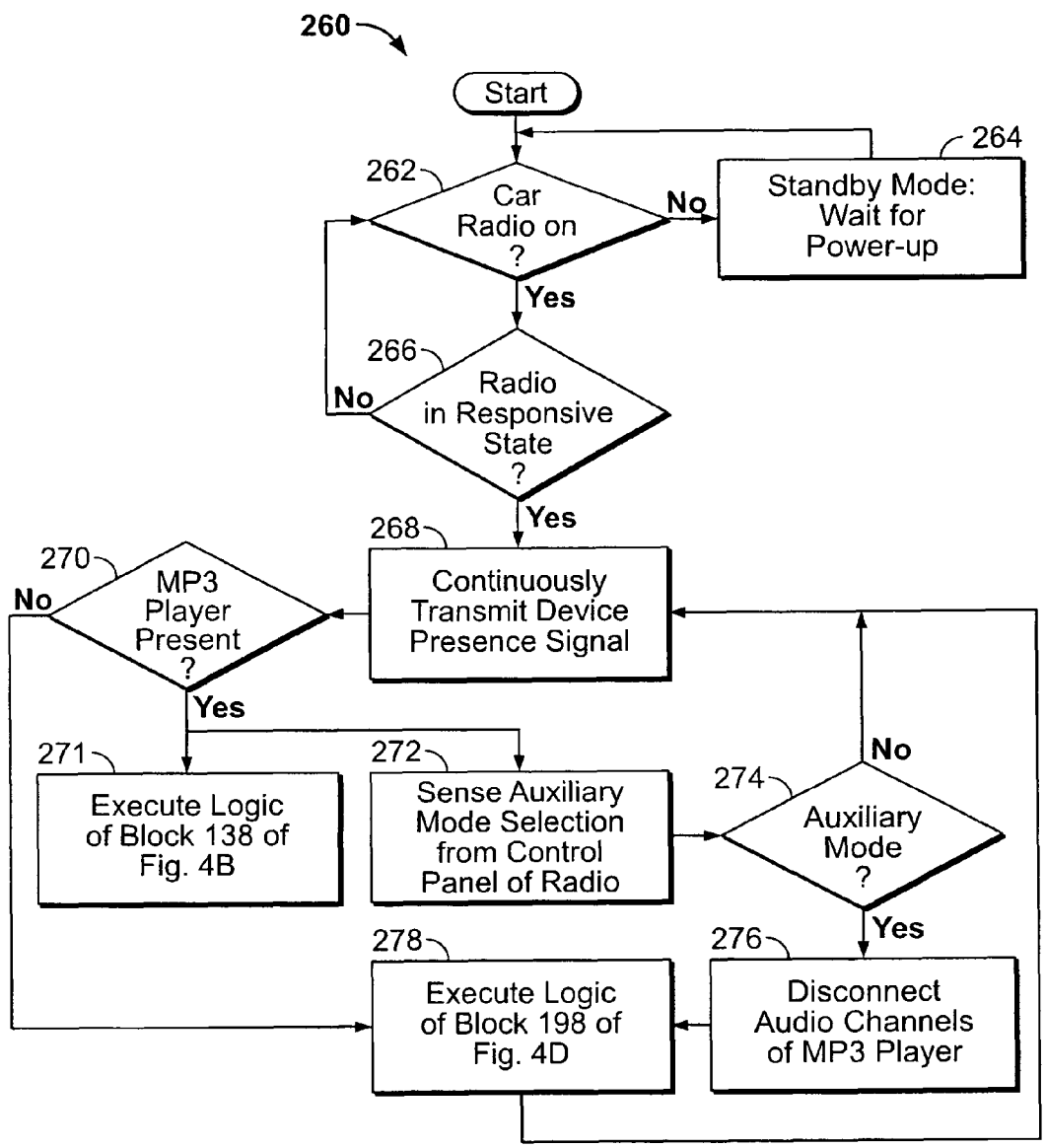
FIG. 4g is a flowchart showing processing logic according to the present invention for integrating a MP3 player and one or more auxiliary input sources with a car stereo.

FIG. 4g is a flowchart showing processing logic according to the present invention for integrating an MP3 player and one or more auxiliary input sources with a car stereo. Beginning in step 262, a determination is made as to whether the existing car stereo is powered on. If a negative determination is made, step 264 is invoked, wherein the present invention enters a standby mode and waits for the car stereo to be powered on. If a positive determination is made, step 266 is invoked, wherein a second determination is made as to whether the car stereo is in a state responsive to signals external to the car stereo. If a negative determination is made, step 266 is re-invoked.

If a positive determination is made in step 266, then step 268 is invoked, wherein a signal is generated by the present invention indicating that an external device is present, and the signal is continuously transmitted to the car stereo. Importantly, this signal prevents the car stereo from shutting off, entering a sleep mode, or otherwise being unresponsive to signals and/or data from an external source. Then, in step 270, a determination is made as to whether an MP3 player is present (i.e., whether an external MP3 player is connected to the multimedia device integration system of the present invention). If a positive determination is made, steps 271 and 272 are invoked. In step 271, the logic of block 138 of FIG. 4b (the MP3 handling process), described earlier, is invoked, so that the CD player/changer can be integrated with the car stereo and utilized by a user. In step 272, a sensing mode is initiated, wherein the present invention monitors for a selection sequence (as will be discussed in greater detail) initiated by the user at the control panel of the car stereo for switching from the external CD player/changer to one or more auxiliary input sources. Step 274 is then invoked, wherein a determination is made as to whether such a sequence has been initiated. If a negative determination is made, step 274 re-invokes step 278, so that further processing can occur. Otherwise, if a positive determination is made (i.e., the user desires to switch from the external MP3 player to one of the auxiliary input sources), step 276 is invoked, wherein the audio channels of the MP3 player are disconnected from the car stereo. Then, step 278 is invoked, wherein the logic of block 198 of FIG. 4d (the auxiliary input handling process), discussed earlier, is executed, allowing the user to select from one of the auxiliary input sources. In the event that a negative determination is made in step 270 (no external MP3 player is connected to the present invention), then step 278 is invoked, and the system goes into auxiliary mode. The user can then select from one or more auxiliary input sources using the controls of the radio.

As mentioned previously, to enable integration, the present invention contains logic for converting command signals issued from an after-market or OEM car stereo into a format compatible with one or more external audio devices connected to the present invention. Such logic can be applied to convert any car stereo signal for use with any external device. For purposes of illustration, a sample code portion is shown in Table 1, below, for converting control signals from a BMW car stereo into a format understandable by a CD changer:

TABLE 1

```
;=====================================================
;   Radio requests changer to STOP (exit PLAY mode)
;   Decoding 6805183801004C message
;=====================================================
Encode_RD_stop_msg:
        movlw           0x68
        xorwf           BMW_Recv_buff,W
        skpz
        return
        movlw           0x05
        xorwf           BMW_Recv_buff+1,W
        skpz
        return
        movlw           0x18
        xorwf           BMW_Recv_buff+2,W
        skpz
        return
        movlw           0x38
        xorwf           BMW_Recv_buff+3,W
        skpz
        return
        movlw           0x01
        xorwf           BMW_Recv_buff+4,W
        skpz
        return
        tstf            BMW_Recv_buff+5
        skpz
        return
        movlw           0x4C
        xorwf           BMW_Recv_buff+6,W
        skpz
        return
        bsf             BMW_Recv_STOP_msg
        return
```

The code portion shown in Table 1 receives a STOP command issued by a BMW stereo, in a format proprietary to BMW stereos. Preferably, the received command is stored in a first buffer, such as BMW_Recv_buff. The procedure "Encode_RD_stop_msg" repetitively applies an XOR function to the STOP command, resulting in a new command that is in a format compatible with the after-market CD player. The command is then stored in an output buffer for dispatching to the CD player.

Additionally, the present invention contains logic for retrieving information from an after-market audio device, and converting same into a format compatible with the car stereo for display thereby. Such logic can be applied to convert any data from the external device for display on the car stereo. For purposes of illustration, a sample code portion is shown in Table 2, below, for converting data from a CD changer into a format understandable by a BMW car stereo:

TABLE 2

```
;       ============================================
;       Changer replies with STOP confirmation
;       Encoding 180A68390002003F0001027D message
;       ============================================
Load_CD_stop_msg:
        movlw   0x18
        movwf   BMW_Send_buff
        movlw   0x0A
        movwf   BMW_Send_buff+1
        movlw   0x68
        movwf   BMW_Send_buff+2
        movlw   0x39
        movwf   BMW_Send_buff+3
        movlw   0x00            ;current status_XX=00,
                                 power off
        movwf   BMW_Send_buff+4
        movlw   0x02            ;current status_YY=02,
                                 power off
        movwf   BMW_Send_buff+5
        clrf    BMW_Send_buff+6 ;separate field,
                                 always =0
        movfw   BMW_MM_stat     ;current status_MM,
                                 magazine config
        movwf   BMW_Send_buff+7
        clrf    BMW_Send_buff+8 ;separate field,
                                 always =0
        movfw   BMW_DD_stat     ;current status_DD,
                                 current disc
        movwf   BMW_Send_buff+9
        movfw   BMW_TT_stat     ;current status_TT,
                                 current track
        movwf   BMW_Send_buff+10
        xorwf   BMW_Send_buff+9,W  ;calculate check sum
        xorwf   BMW_Send_buff+8,W
        xorwf   BMW_Send_buff+7,W
        xorwf   BMW_Send_buff+6,W
        xorwf   BMW_Send_buff+5,W
        xorwf   BMW_Send_buff+4,W
        xorwf   BMW_Send_buff+3,W
        xorwf   BMW_Send_buff+2,W
        xorwf   BMW_Send_buff+1,W
        xorwf   BMW_Send_buff,W
        movwf   BMW_Send_buff+11   ;store check sum
        movlw   D'12'              ;12 bytes total
        movwf   BMW_Send_cnt
        bsf     BMW_Send_on        ;ready to send
        return
```

The code portion shown in Table 2 receives a STOP confirmation message from the CD player, in a format proprietary to the CD player. Preferably, the received command is stored in a first buffer, such as BMW_Send_buff. The procedure "Load_CD_stop_msg" retrieves status information, magazine information, current disc, and current track information from the CD changer, and constructs a response containing this information. Then, a checksum is calculated and stored in another buffer. The response and checksum are in a format compatible with the BMW stereo, and are ready for dispatching to the car stereo.

The present invention also includes logic for converting signals from an OEM car stereo system for use with a digital media device such as an MP3, MP4, or Apple ipod player. Shown below are code samples for allowing commands and data to be exchanged between a Ford car stereo and an Apple iPod device:

TABLE 3

```
//decoding Ford "play" command :41-C0-80-CA-01+
    if ( ACP_rx_ready == ON ) {
        ACP_rx_ready = OFF;
        ACP_rx_taddr = ACP_rx_buff[1];
        ACP_rx_saddr = ACP_rx_buff[2];
        ACP_rx_data1 = ACP_rx_buff[3];
```

TABLE 3-continued

```
        ACP_rx_data2 = ACP_rx_buff[4];
        ACP_rx_data3 = ACP_rx_buff[5];
        if ( (ACP_rx_saddr == 0x80) ) {
            switch ( ACP_rx_taddr ) {
                case 0xC0:
                    if ( ACP_rx_data1 == 0xCA ) {
                        if ( ACP_rx_data2 == 0x01 ) {
                            flags.ACP_play_req = 1;
                        }
                        break;
                    }
                    break;
            }
        }
    }
```

In the code portion shown in Table 3, a "Play" command selected by a user at the controls of a Ford OEM car stereo is received, and portions of the command are stored in one or more buffer arrays. Then, as shown below in Table 4, the decoded portions of the command stored in the one or more buffer arrays are used to construct a "Play/Pause" command in a format compatible with the Apple iPod device, and the command is sent to the Apple iPod for execution thereby:

TABLE 4

```
// encoding iPod "play/pause" command 0xFF 0x55 0x03
   0x02 0x00 0x01 0xFA
    if ( iPod_play_req == ON ) {
        iPod_play_req = OFF;
        iPod_tx_data[0] = 0x55;
        iPod_tx_data[1] = 0x03;
        iPod_tx_data[2] = 0x02;
        iPod_tx_data[3] = 0x00;
        iPod_tx_data[4] = 0x01;
        iPod_tx_counter = 5;
        iPod_tx_ready = ON;
    }
```

While the code portions shown in Tables 1-2 are implemented using assembler language, and the code portions shown in Tables 3-4 are implemented using the C programming language, it is to be expressly understood that any low or high level language known in the art could be utilized without departing from the spirit or scope of the invention. It will be appreciated that various other code portions can be developed for converting signals from any after-market or OEM car stereo for use by an after-market external audio device, and vice versa.

Figure 5:
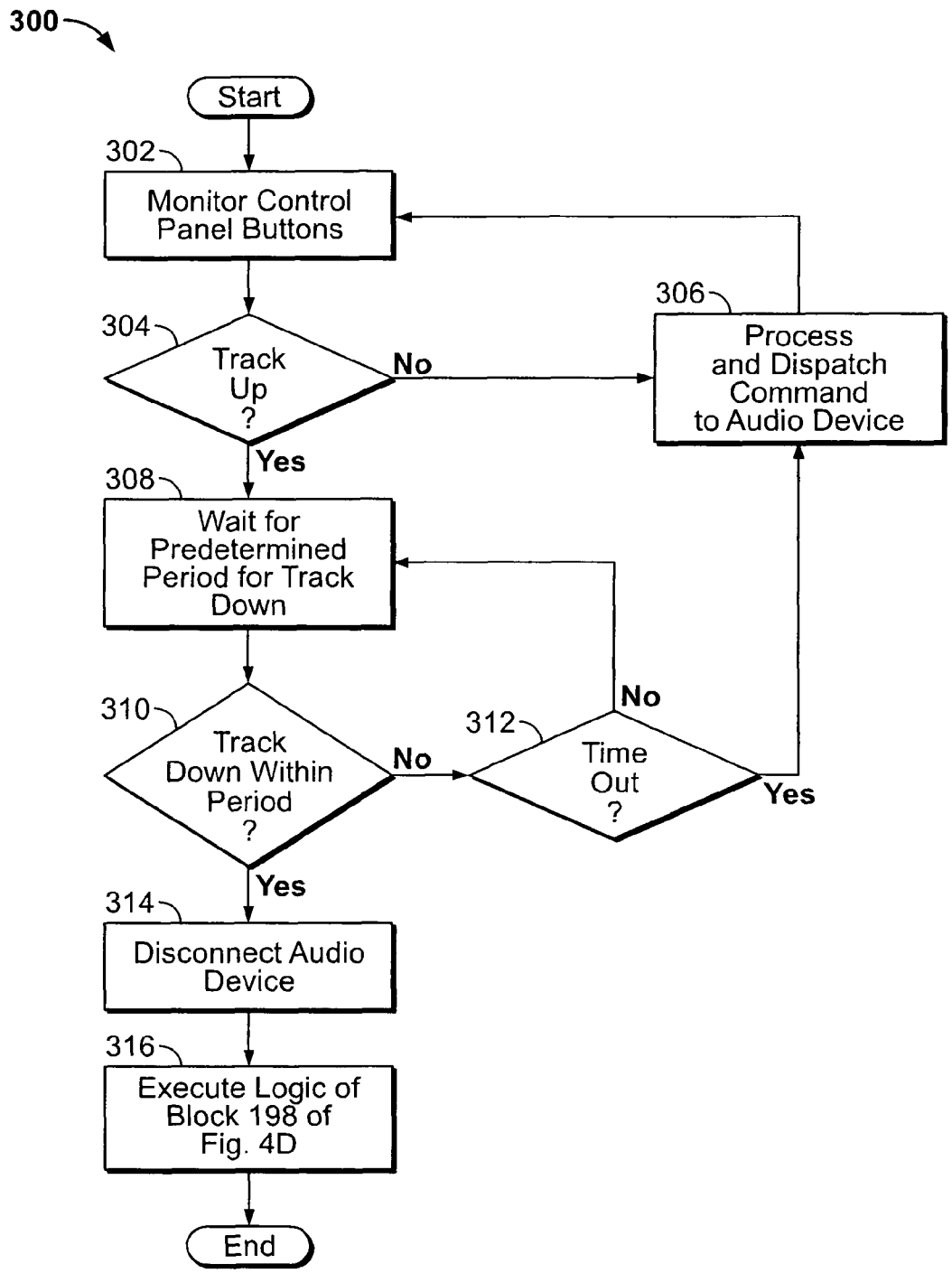
FIG. 5 is a flowchart showing processing logic according to the present invention for allowing a user to switch between an after-market audio device and one or more auxiliary input sources.

FIG. 5 is a flowchart showing processing logic, indicated generally at 300 for allowing a user to switch between an after-market audio device, and one or more auxiliary input sources. As was discussed earlier, the present invention allows a user to switch from one or more connected audio devices, such as an external CD player/changer, MP3 player, satellite receiver, DAB receiver, or the like, and activate one or more auxiliary input sources. A selection sequence, initiated by the user at the control panel of the car stereo, allows such switching. Beginning in step 302, the buttons of the control panel are monitored. In step 304, a determination is made as to whether a "Track Up" button or sequence has been initiated by the user. The "Track Up" button or sequence can for a CD player, MP3 player, or any other device. If a negative determination is made, step 306 is invoked, wherein the sensed button or sequence is processed in accordance with the present invention and dispatched to the external audio device for execution. Then, step 302 is re-invoked, so that additional buttons or sequences can be monitored.

In the event that a positive determination is made in step 304, step 308 is invoked, wherein the present invention waits for a predetermined period of time while monitoring the control panel buttons for additional buttons or sequences. In a preferred embodiment of the present invention, the predetermined period of time is 750 milliseconds, but of course, other time durations are considered within the spirit and scope of the present invention. In step 310, a determination is made as to whether the user has initiated a "Track Down" button or sequence at the control panel of the car stereo within the predetermined time period. These sequences can be used for a CD player, MP3 player, or any other device. If a negative determination is made, step 312 is invoked. In step 312, a determination is made as to whether a timeout has occurred (e.g., whether the predetermined period of time has expired). If a negative determination is made, step 308 is re-invoked. Otherwise, is a positive determination is made, step 312 invokes step 306, so that any buttons or key sequences initiated by the user that are not a "Track Down" command are processed in accordance with the present invention and dispatched to the audio device for execution.

In the event that a positive determination is made in step 310 (a "Track Down" button or sequence has been initiated within the predetermined time period), then step 314 is invoked. In step 314, the audio channels of the audio device are disconnected, and then step 316 is invoked. In step 316, the logic of block 198 of FIG. 4d (the auxiliary input handling process), discussed earlier, is invoked, so that the user can select from one of the auxiliary input sources in accordance with the present invention. Thus, at this point in time, the system has switched, under user control, from the audio device to a desired auxiliary input. Although the foregoing description of the process 300 has been described with reference to "Track Up" and "Track Down" buttons or commands initiated by the user, it is to be expressly understood that any desired key sequence, keystroke, button depress, or any other action, can be sensed in accordance with the present invention and utilized for switching modes.

When operating in auxiliary mode, the present invention provides an indication on the display of the car stereo corresponding to such mode. For example, the CD number could be displayed as "1", and the track number displayed as "99," thus indicating to the user that the system is operating in auxiliary mode and that audio and data is being supplied from an auxiliary input source. Of course, any other indication could be generated and displayed on the display of the car stereo, such as a graphical display (e.g., an icon) or textual prompt.

Figure 6:
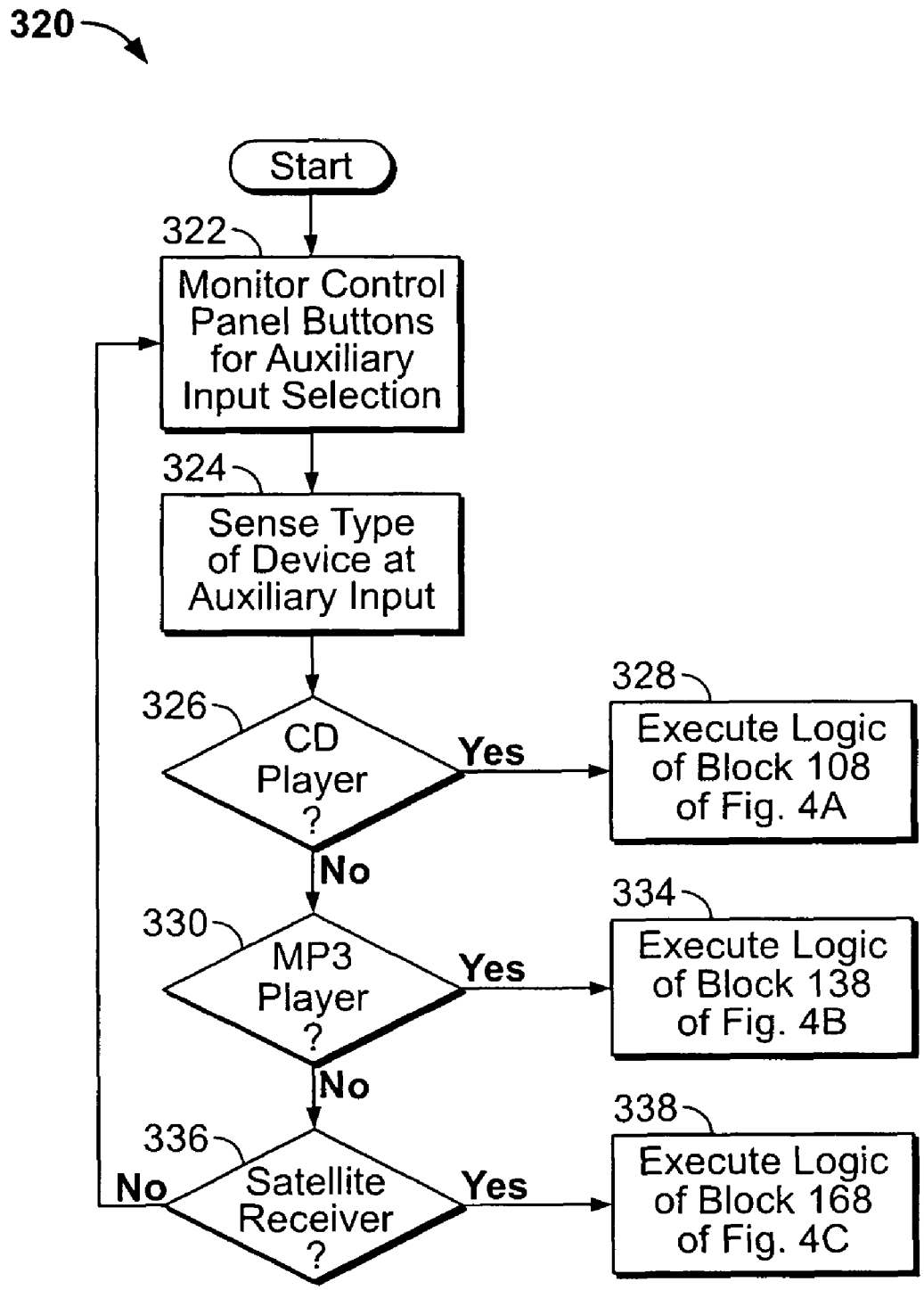
FIG. 6 is a flowchart showing processing logic according to the present invention for determining and handling various device types connected to the auxiliary input ports of the invention.

FIG. 6 is a flowchart showing processing logic, indicated generally at 320, for determining and handling various device types connected to the auxiliary input ports of the invention. The present invention can sense device types connected to the auxiliary input ports, and can integrate same with the car stereo using the procedures discussed earlier. Beginning in step 322, the control panel buttons of the car stereo are monitored for a button or sequence initiated by the user corresponding to an auxiliary input selection (such as the disc number method discussed earlier with reference to FIG. 4d). In response to an auxiliary input selection, step 324 is invoked, wherein the type of device connected to the selected auxiliary input is sensed by the present invention. Then, step 326 is invoked.

In step 326, a determination is made as to whether the device connected to the auxiliary input is a CD player/changer. If a positive determination is made, step 328 is invoked, wherein the logic of block 108 of FIG. 4a (the CD handling process), discussed earlier, is executed, and the CD player is integrated with the car stereo. If a negative determination is made in step 326, then step 330 is invoked. In step 330, a determination is made as to whether the device connected to the auxiliary input is an MP3 player. If a positive determination is made, step 334 is invoked, wherein the logic of block 138 if FIG. 4b (the MP3 handling process), discussed earlier, is executed, and the MP3 player is integrated with the car stereo. If a negative determination is made in step 330, then step 336 is invoked. In step 336, a determination is made as to whether the device connected to the auxiliary input is a satellite receiver or a DAB receiver. If a positive determination is made, step 338 is invoked, wherein the logic of block 168 of FIG. 4c (the satellite/DAB receiver handling process), discussed earlier, is executed, and the satellite receiver is integrated with the car stereo. If a negative determination is made in step 336, step 322 is re-invoked, so that additional auxiliary input selections can be monitored and processed accordingly. Of course, process 320 can be expanded to allow other types of devices connected to the auxiliary inputs of the present invention to be integrated with the car stereo.

The present invention can be expanded for allowing video information generated by an external device to be integrated with the display of an existing OEM or after-market car stereo. In such a mode, the invention accepts RGB (red/green/blue) input signals from the external device, and converts same to composite signals. The composite signals are then forwarded to the car stereo for display thereby, such as on an LCD panel of the stereo. Additionally, the present invention can accept composite input signals from an external device, and convert same to RGB signals for display on the car stereo. Further, information from the external device can be formatted and presented to the user in one or more graphical user interfaces or menus capable of being viewed and manipulated on the car stereo.

Figure 7A:
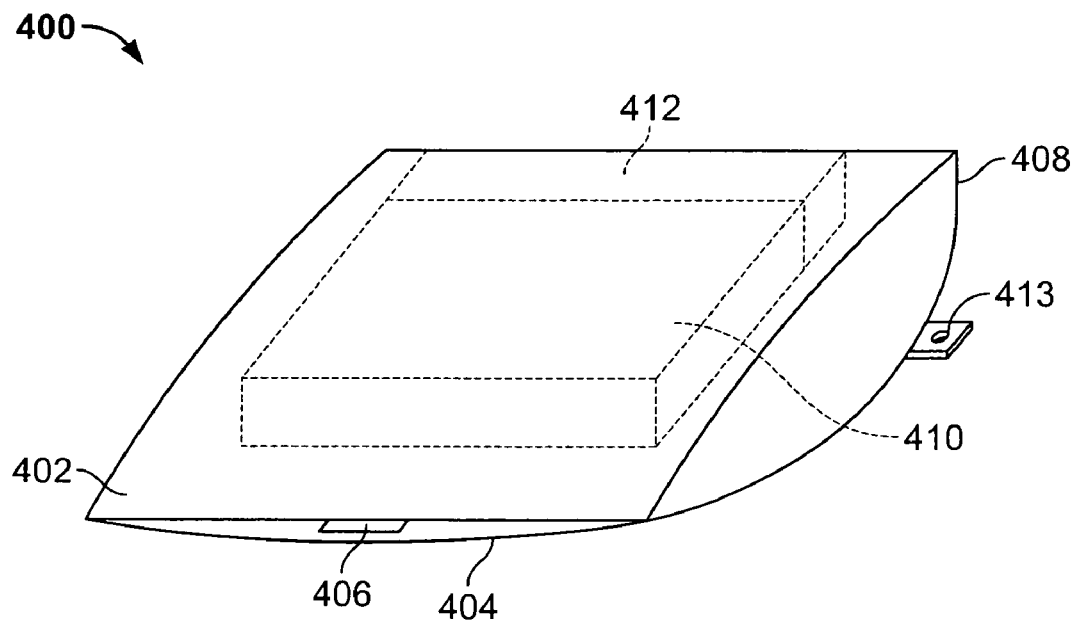
FIG. 7a is a perspective view of a docking station according to the present invention for retaining an audio device within a car.

FIG. 7a is a perspective view of a docking station 400 according to the present invention for retaining an audio device within a car. Importantly, the present invention can be adapted to allow portable audio devices to be integrated with an existing car stereo. The docking station 400 allows such portable devices to be conveniently docked and integrated with the car stereo. The docking station 400 includes a top portion 402 hingedly connected at a rear portion 408 to a bottom portion 404, preferably in a clam-like configuration. A portable audio device 410, such as the SKYFI radio distributed by DELPHI, Inc., is physically and electrically connected with the docking portion 412, and contained within the station 100. A clasp 406 can be provided for holding the top and bottom portions in a closed position to retain the device 410. Optionally, a video device could also be docked using the docking station 400, and tabs 413 can be provided for holding the docking station 400 in place against a portion of a car. Conceivably, the docking station 400 could take any form, such as a sleeve-like device for receiving and retaining a portable audio device and having a docking portion for electrically and mechanically mating with the audio device. It should be noted that the docking station 400 could be formed without the top portion 402.

Figure 7B:
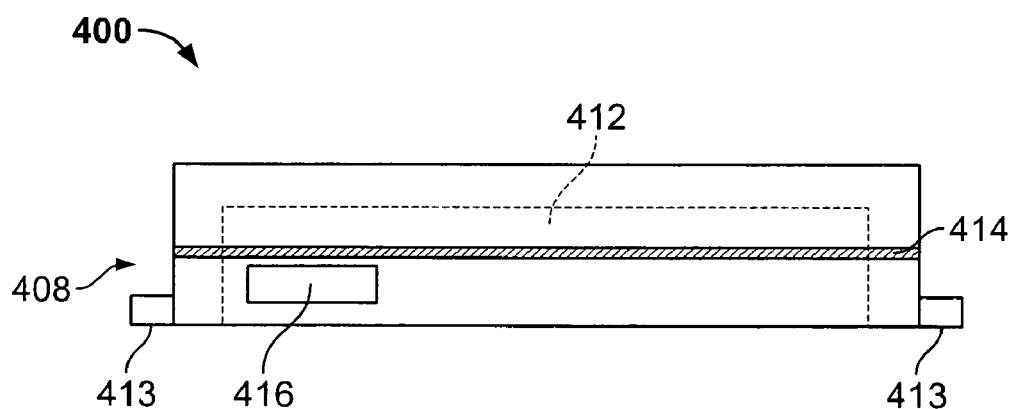

FIG. 7b is an end view showing the rear portion 408 of the docking station 400 of FIG. 7a. A hinge 414 connects the top portion and the bottom portions of the docking station 400. A data port 416 is provided for interfacing with the audio device docked within the station 400, and is in electrical communication therewith. In a preferred embodiment of the present invention, the data port 416 is an RS-232 serial or USB data port that allows for the transmission of data with the audio device, and which connects with the multimedia device integration system of the present invention for integrating the audio device with an OEM or after-market car stereo. Any known bus technology can be utilized to interface with any portable audio or video device contained within the docking station 400, such as FIREWIRE, D2B, MOST, CAN, USB/USB2, IE Bus, T Bus, I Bus, or any other bus technology known in the art. It should be noted that the present invention can be operated without a docking station, i.e., a portable audio or video device can be plugged directly into the present invention for integration with a car stereo or video system.

Figure 8A:
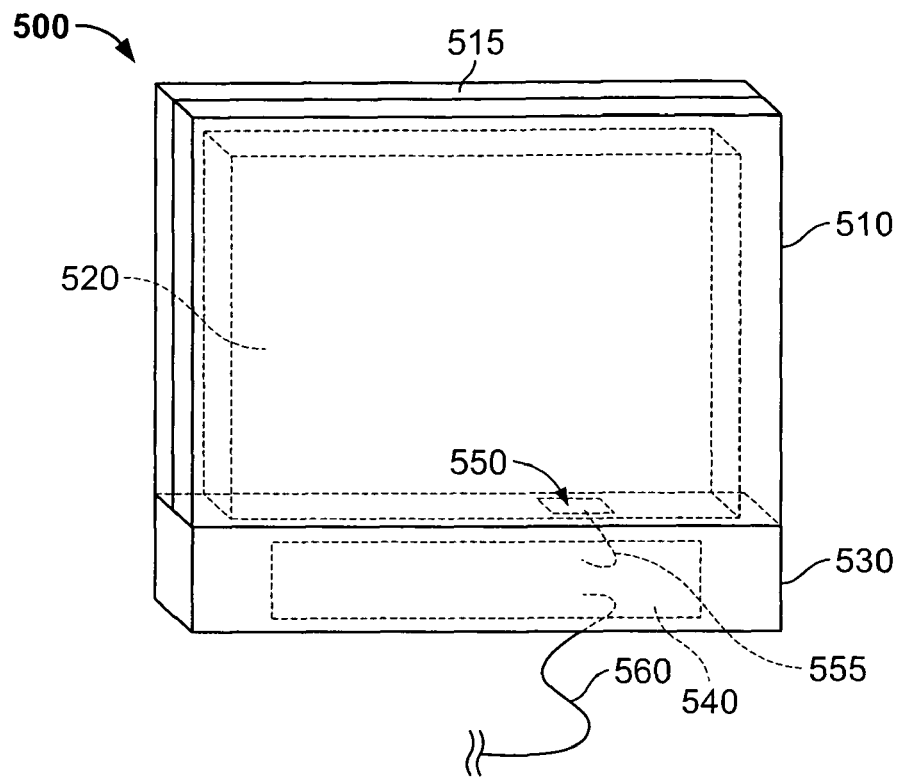
FIGS. 8a-8b are perspective views of another embodiment of the docking station of the present invention, which includes the multimedia device integration system of the present invention incorporated therewith.
Figure 8B:
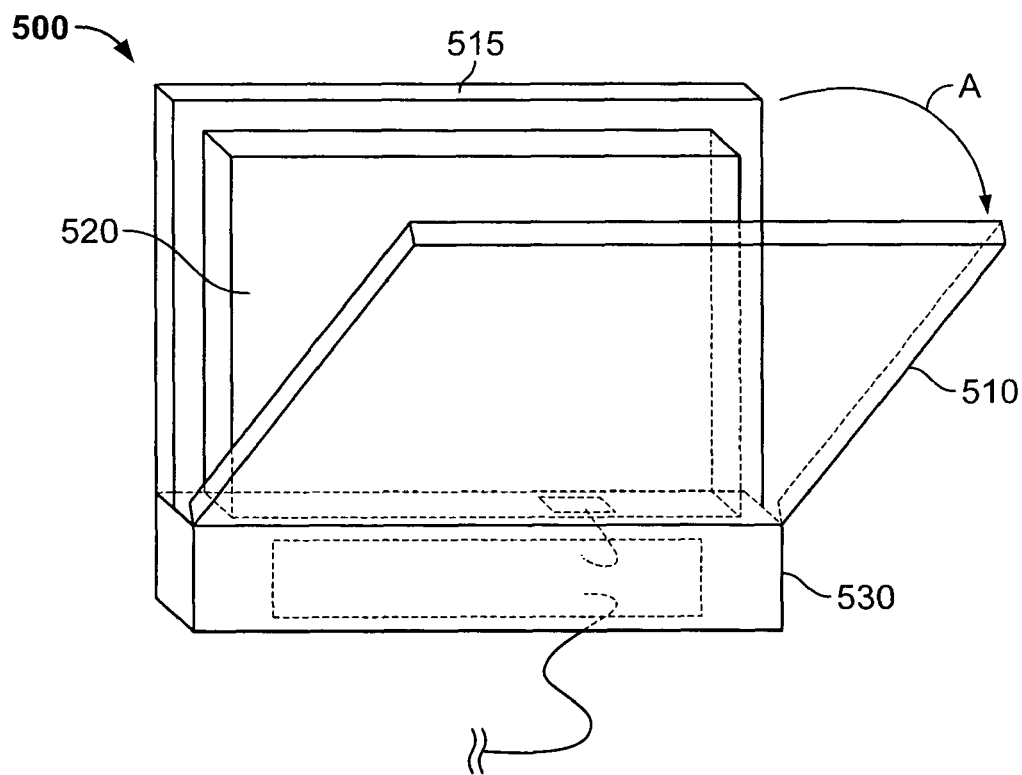

FIGS. 8a-8b are perspective views of another embodiment of the docking station of the present invention, indicated generally at 500, which includes the multimedia device integration system of the present invention, indicated generally at 540, incorporated therewith. As shown in FIG. 8a, the docking station 500 includes a base portion 530, a bottom member 515 interconnected with the base portion 530 at an edge thereof, and a top member 510 hingedly interconnected at an edge to the base portion 530. The top member 510 and the bottom member 515 define a cavity for docking and storing a portable audio device 520, which could be a portable CD player, MP3 player, satellite (e.g., XM, SIRIUS, or other type) tuner, or any other portable audio device. The docking station 500 would be configured to accommodate a specific device, such as an IPOD from Apple Computer, Inc., or any other portable device.

The multimedia device integration system 540, in the form of a circuit board, is housed within the base portion 530 and performs the integration functions discussed herein for integrating the portable device 520 with an existing car stereo or car video system. The integration system 540 is in communication with the portable device 520 via a connector 550, which is connected to a port on the device 520, and a cable 555 interconnected between the connector 550 and the integration system 540. The connector 550 could be any suitable connector and can vary according to the device type. For example, a MOLEX, USB, or any other connector could be used, depending on the portable device. The integration system 540 is electrically connected with a car stereo or car video system by cable 560. Alternatively, the integration system could wirelessly communicate with the car stereo or car video system. A transmitter could be used at the integration system to communicate with a receiver at the car stereo or car video system. Where automobiles include Bluetooth systems, such systems can be used to communicate with the integration system. As can be readily appreciated, the docking station 500 provides a convenient device for docking, storing, and integrating a portable device for use with a car stereo. Further, the docking station 500 could be positioned at any desired location within a vehicle, including, but not limited to, the vehicle trunk.

As shown in FIG. 8b, the top member 510 can be opened in the general direction indicated by arrow A to allow for access to the portable audio device 520. In this fashion, the device 520 can be quickly accessed for any desired purpose, such as for inserting and removing the device 520 from the docking station 500, as well as for providing access to the controls of the device 520.

Figure 9:
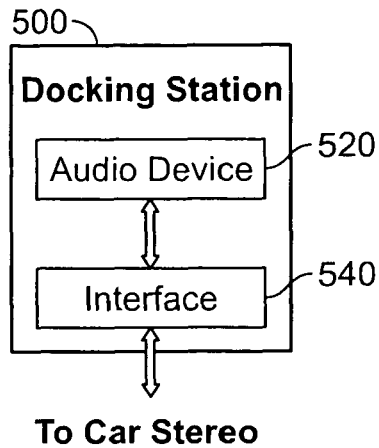
FIG. 9 is a block diagram showing the components of the docking station of FIGS. 8a-8b.

FIG. 9 is a block diagram showing the components of the docking station of FIGS. 8a-8b. The docking station 500 houses both a portable audio or video device 520 and a multimedia device integration system (or interface) 540. The shape and configuration of the docking station 500 can be varied as desired without departing from the spirit or scope of the present invention.

The integration system of the present invention provides for control of a portable audio or video device, or other device, through the controls of the car stereo or video system. As such, controls on the steering wheel, where present, may also be used to control the portable audio device or other device. Further, in all embodiments of the present invention, communication between the after-market device and a car stereo or video system can be accomplished using known wireless technologies, such as Bluetooth.

Figure 10:
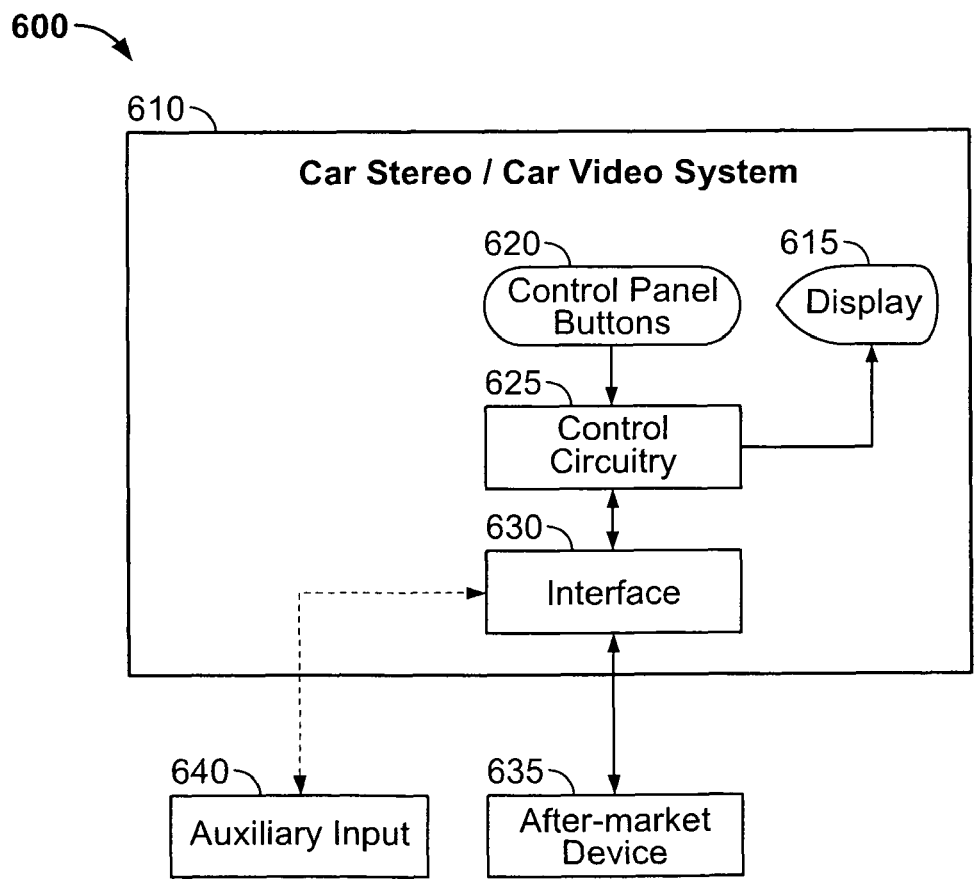
FIG. 10 is a block diagram showing an alternate embodiment of the multimedia device integration system of the present invention, wherein the interface is incorporated within a car stereo or car video system.

FIG. 10 is a block diagram showing an alternate embodiment of the multimedia device integration system of the present invention, indicated generally at 600, wherein the interface 630 is incorporated within a car stereo or car video system 610. The interface 630 is in electrical communication with the control panel buttons 620, display 615, and associated control circuitry 625 of the car stereo or video system 610. The interface 630 could be manufactured on a separate printed circuit board positioned within the stereo or video system 610, or on one or more existing circuit boards of the stereo or video system 610. An after-market device 635 can be put into electrical communication with the interface 630 via a port or connection on the car stereo or video system 610, and integrated for use with the car stereo or video system 610.

The device 635 can be controlled using the control panel buttons 620 of the car stereo or video system 610, and information from the device 635 is formatted by the interface 630 and displayed in the display 615 of the car stereo or video system 610. Additionally, control commands generated at the car stereo or car video device 610 are converted by the interface 630 into a format (protocol) compatible with the multimedia device 635, and are dispatched thereto for execution. A plurality of multimedia devices could be integrated using the interface 630, as well as one or more auxiliary input sources 640. The after-market device 635 could comprise any audio, video, or telecommunications device, including, but not limited to, a CD player, CD changer, digital media player (e.g., MP3 player, MP4 player, WMV player, Apple iPod, or any other player), satellite radio (e.g., XM, Sirius, Delphi, etc.), video device (e.g., DVD player), cellular telephone, or any other type of device or combinations thereof. Additionally, one or more interfaces could be connected to the interface 630 ("daisy-chained") to allow multiple products to be integrated. The device 600 could include one or more of the circuits disclosed in FIGS. 3a-3d and modified depending upon the type of the after-market device 635.

Figure 11A:
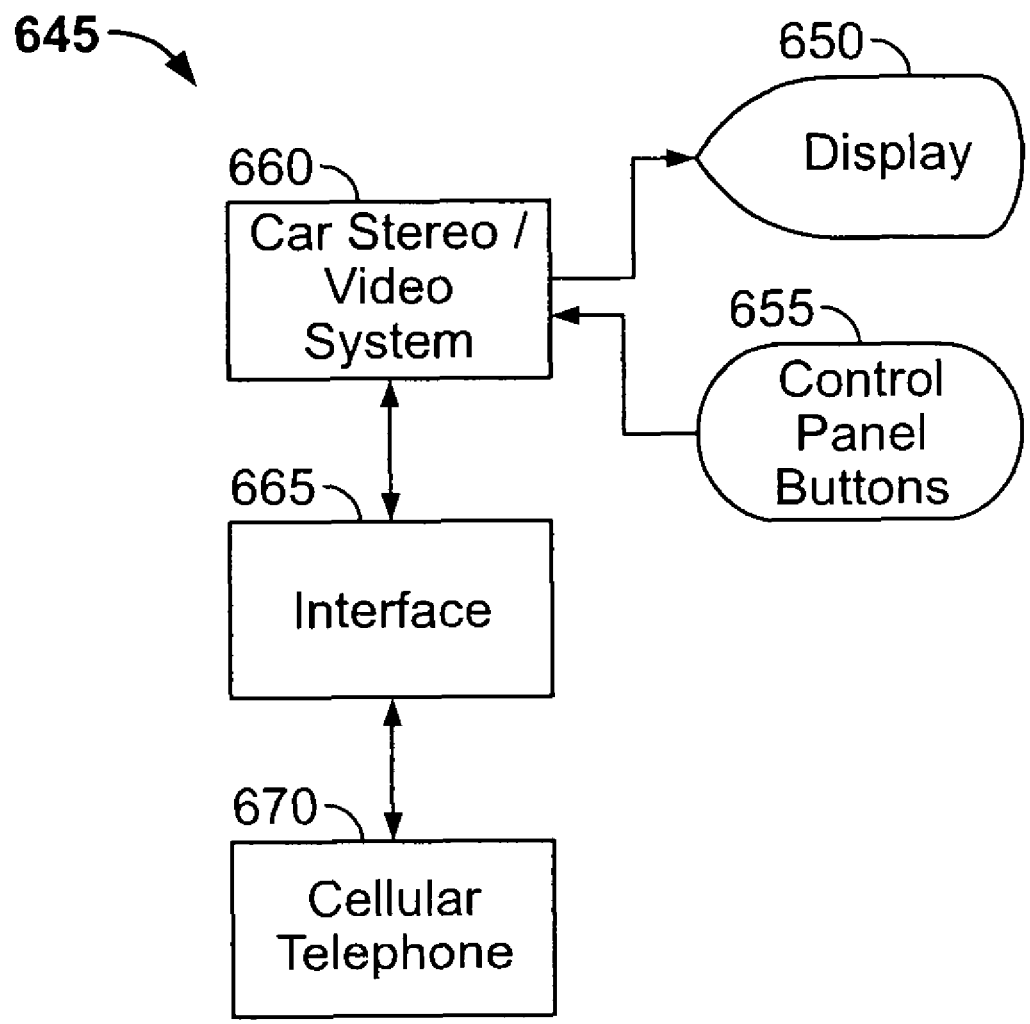
FIG. 11a is a diagram showing an alternate embodiment of the multimedia device integration system of the present invention for integrating a cellular telephone for use with a car stereo or video system.

FIG. 11a is a diagram showing an alternate embodiment of the present invention, indicated generally at 645, wherein a cellular telephone 670 is integrated for use with a car stereo. The telephone 670 is in electrical communication with the interface 665, which receives data from the cellular telephone and formats same for displaying on the display 650 of the car stereo or video system 660. Commands for controlling the telephone 670 can be entered using the control panel buttons 655 of the car stereo or video system 660. The commands are processed by the interface 665, converted into a format (protocol) compatible with the telephone 670, and transmitted to the telephone 670 for processing thereby. Additionally, audio from the telephone 670 can be channeled to the car stereo or video system 660 via the interface 665 and played through the speakers of the car stereo or video system 660. For example, if the telephone 670 is provided with the ability to download songs or music, such songs or music can be selected using the car stereo or video system 660 and played therethrough using the interface 665. It should be noted that control of the cellular telephone could be provided using one or more displays (e.g., LCD) of a car video system. Moreover, control of the cellular telephone 670 is not limited to the use of buttons on the car stereo or video system 660, and indeed, a software or graphically-driven menu or interface can be used to control the cellular telephone. The device 645 could include one or more of the circuits disclosed in FIGS. 3a-3d and modified for use with the cellular telephone 670.

Figure 11B:
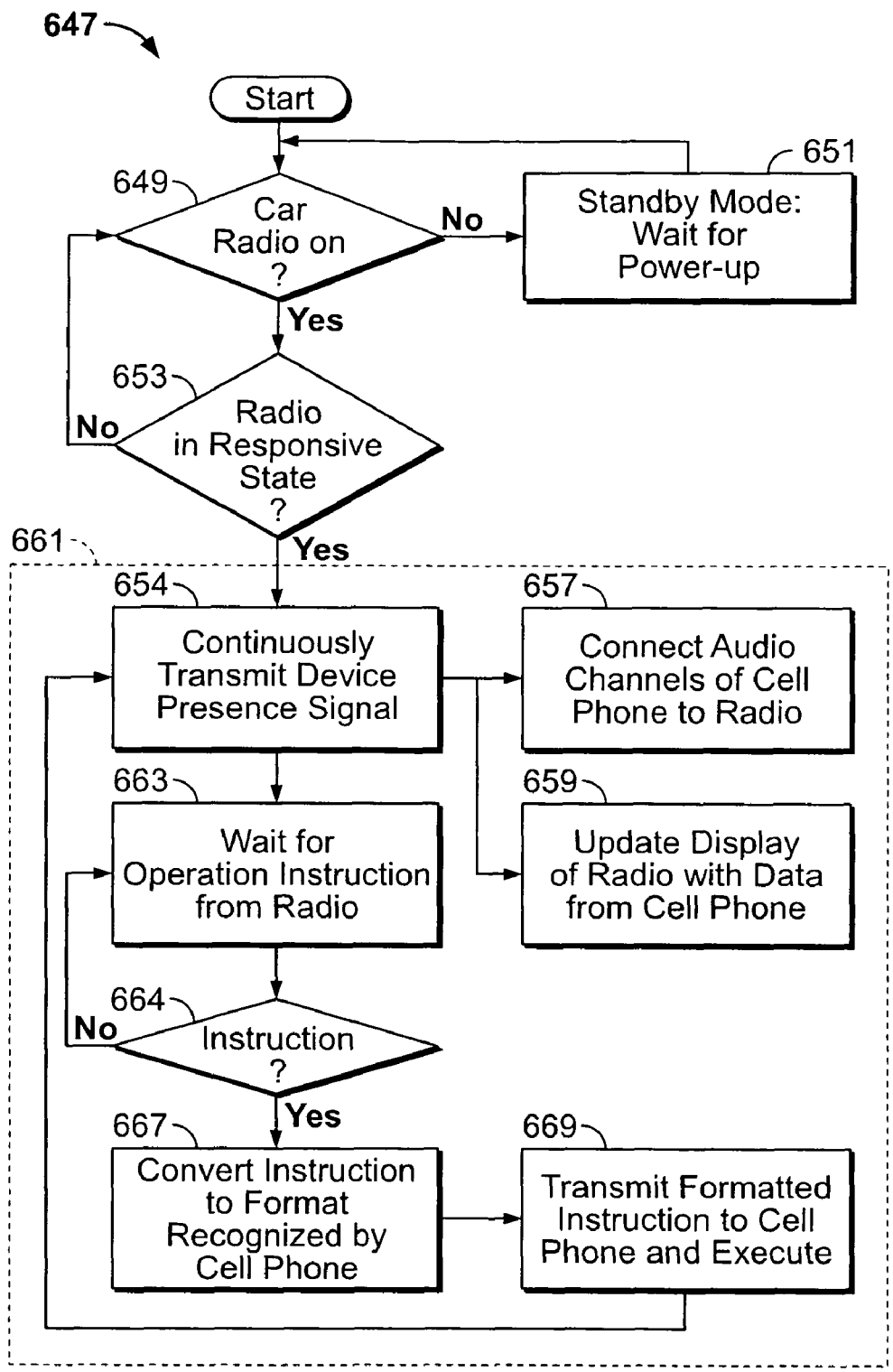
FIG. 11b is a flowchart showing processing logic for integrating a cellular telephone for use with a car stereo or video system.

FIG. 11b is a flowchart showing processing logic, indicated generally at 647, for integrating a cellular telephone with a car radio. Beginning in step 649, a determination is made as to whether the existing car stereo is powered on. If a negative determination is made, step 651 is invoked, wherein the present invention enters a standby mode and waits for the car stereo to be powered on. If a positive determination is made, step 653 is invoked, wherein a second determination is made as to whether the car stereo is in a state responsive to signals external to the car stereo. If a negative determination is made, step 649 is re-invoked.

If a positive determination is made in step 653, a cellular telephone handling process, indicated as block 661, is invoked. Beginning in step 654, a signal is generated by the present invention indicating that a cellular telephone is present, and the signal is continuously transmitted to the car stereo. Importantly, this signal prevents the car stereo from shutting off, entering a sleep mode, or otherwise being unresponsive to signals and/or data from an external source. In step 657, the audio channels of the cellular telephone are connected (channeled) to the car stereo system, allowing audio from the cellular telephone to be played through the car stereo. In step 659, data is retrieved by the present invention from the cellular telephone, such as song information corresponding to one or more songs downloaded onto the cellular telephone. After steps 654, 657, and 659 have been executed, control passes to step 663.

In steps 663, the present invention monitors the control panel buttons of the car stereo for cellular telephone operational commands. In step 664, if a command is not detected, step 663 is re-invoked. Otherwise, if a command is received, step 663 invokes step 667, wherein the received command is converted into a format recognizable by the cellular telephone connected to the present invention. Once the command has been formatted, step 669 is invoked, wherein the formatted command is transmitted to the cellular telephone and executed. Step 654 is then re-invoked, so that additional processing can occur.

Figure 12A:
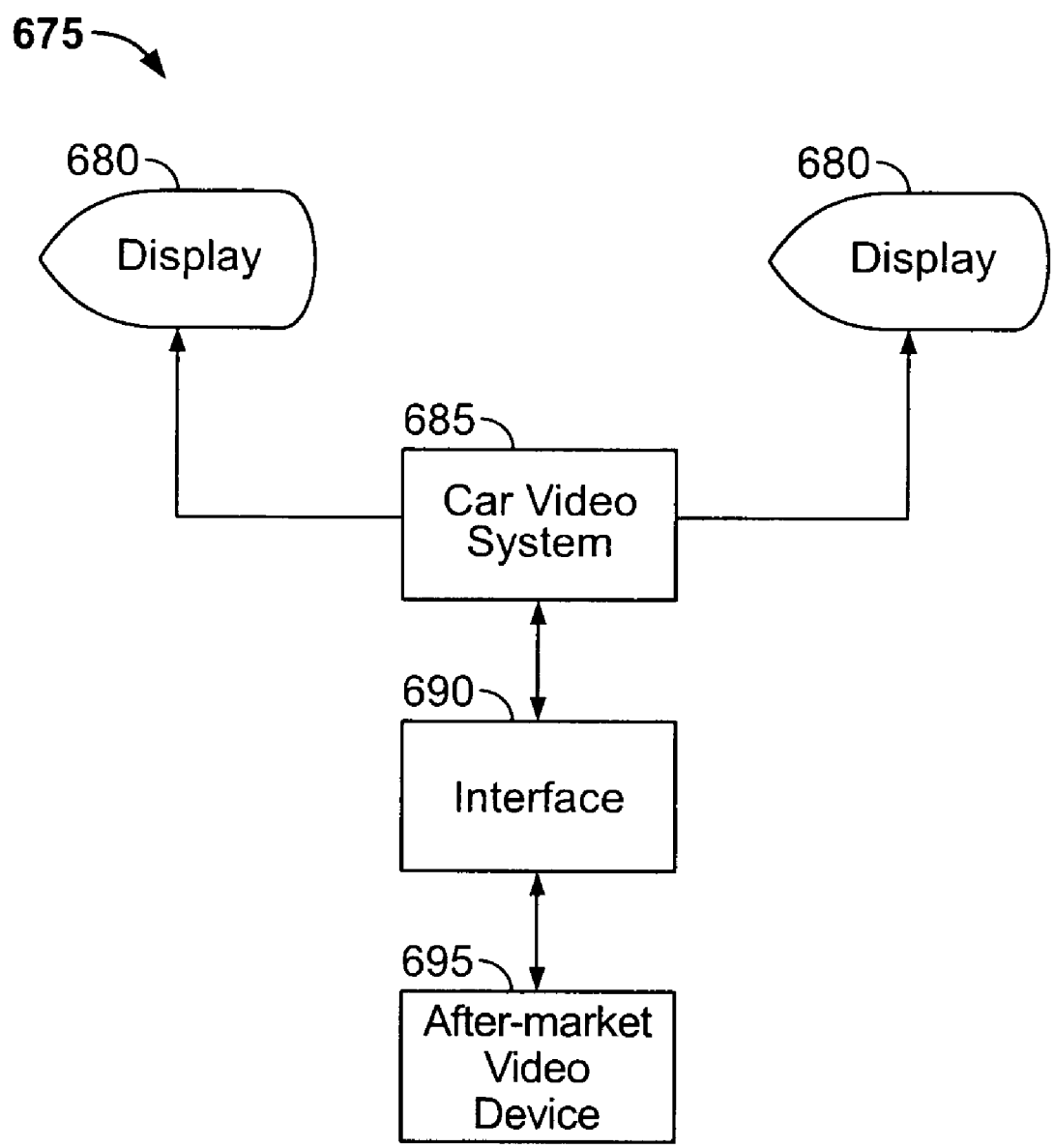
FIG. 12a is a diagram showing an alternate embodiment of the multimedia device integration system of the present invention for integrating an after-market video device for use with a car video system.

FIG. 12a is a diagram showing an alternate embodiment of the present invention, indicated generally at 675, wherein an after-market video device 695 is integrated for use with a car video system 685. The after-market video device 695 could comprise a portable DVD player, digital video (DV) camera, digital camera, or any other video device. The interface 690 receives output video signals from the device 695, and converts same for display on one or more displays 680 (e.g., LCD seat-back displays in a minivan, fold-down displays mounted on the roof of a vehicle, vehicle navigation displays, etc.) of the car video system 685. The interface 690 could convert between composite and red/green/blue (RGB) video signals, and vice versa, using commercially-available video format conversion chips such as the TDA8315, TDA4570, TDA3567, TDA3566A, and TDA3569A video conversion chips manufactured by Philips Corp., and the AL251 and AL250 video conversion chips manufactured by Averlogic Technologies, Inc., or any other suitable video conversion chips. Commands issued by a user using the car video system 685 or display(s) 680 for controlling the device 695 are received by the interface 690, converted into a format compatible with the device 695, and transmitted thereto for processing. The device 675 could include one or more of the circuits disclosed in FIGS. 3a-3d and modified for use with the video device 695.

Figure 12B:
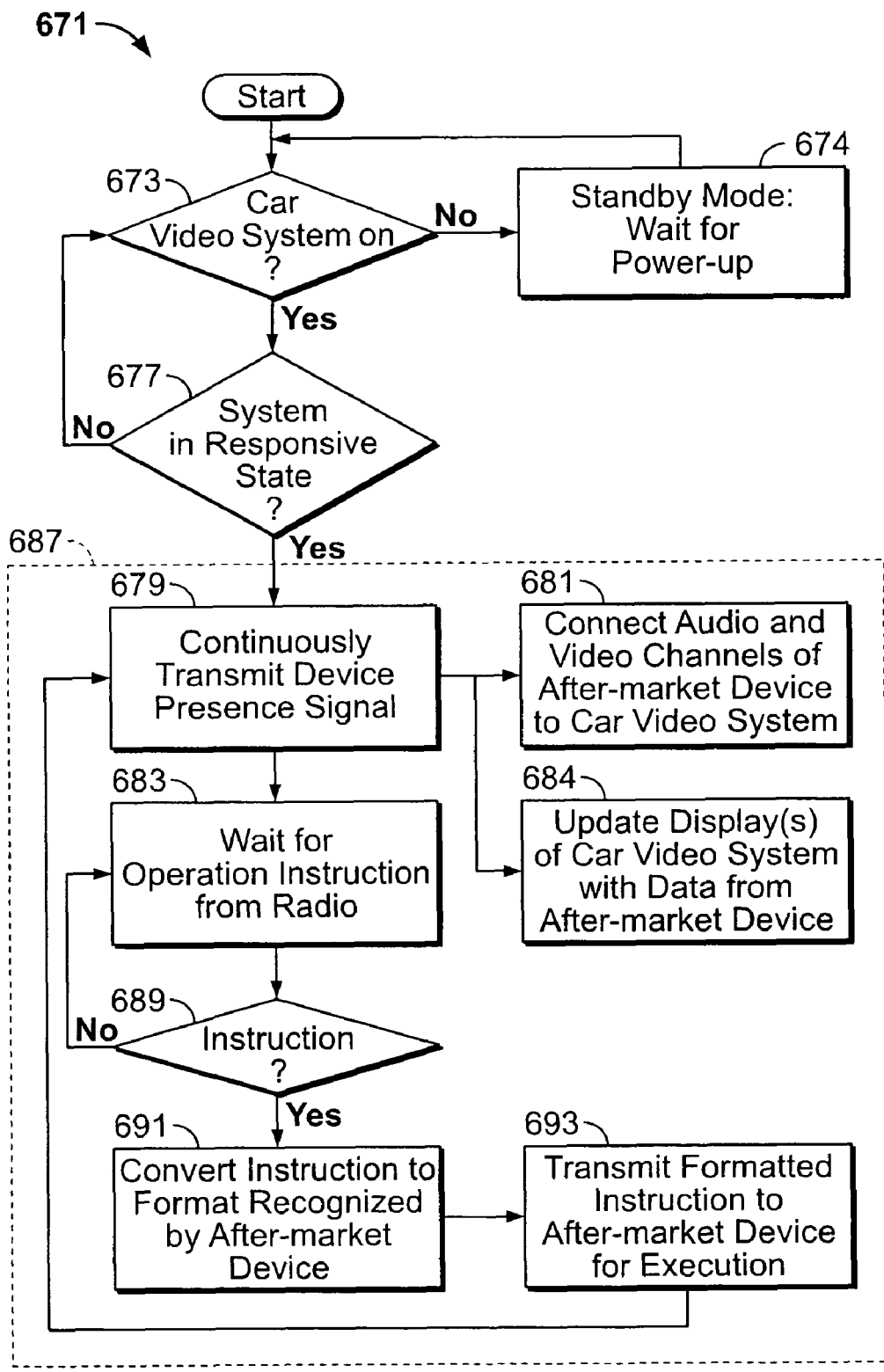
FIG. 12b is a flowchart showing processing logic for integrating an after-market video device for use with a car video system.

FIG. 12b is a flowchart showing processing logic, indicated generally at 671, for integrating an after-market video device with a car video system. Beginning in step 673, a determination is made as to whether the existing car video system is powered on. If a negative determination is made, step 674 is invoked, wherein the present invention enters a standby mode and waits for the car video system to be powered on. If a positive determination is made, step 677 is invoked, wherein a second determination is made as to whether the car video system is in a state responsive to signals external to the car video system. If a negative determination is made, step 673 is re-invoked.

If a positive determination is made in step 677, an after-market video device handling process, indicated as block 687, is invoked. Beginning in step 679, a signal is generated by the present invention indicating that an external device is present, and the signal is continuously transmitted to the car video system. Importantly, this signal prevents the car video system from shutting off, entering a sleep mode, or otherwise being unresponsive to signals and/or data from an external source. In step 681, the audio and video channels of the after-market device are connected (channeled) to the car video system, allowing audio and video from the after-market device to be played through the car video system. In step 684, the display(s) of the car video system are updated with data from the after-market device. After steps 679, 681, and 684 have been executed, control passes to step 683.

In step 683, the present invention monitors the car video system for after-market video device operational commands. In step 689, if a command is not detected, step 683 is re-invoked. Otherwise, if a command is received, step 689 invokes step 691, wherein the received command is converted into a format recognizable by the after-market video device connected to the present invention. Once the command has been formatted, step 693 is invoked, wherein the formatted command is transmitted to the after-market video device and executed. Step 679 is then re-invoked, so that additional processing can occur.

Figure 13A:
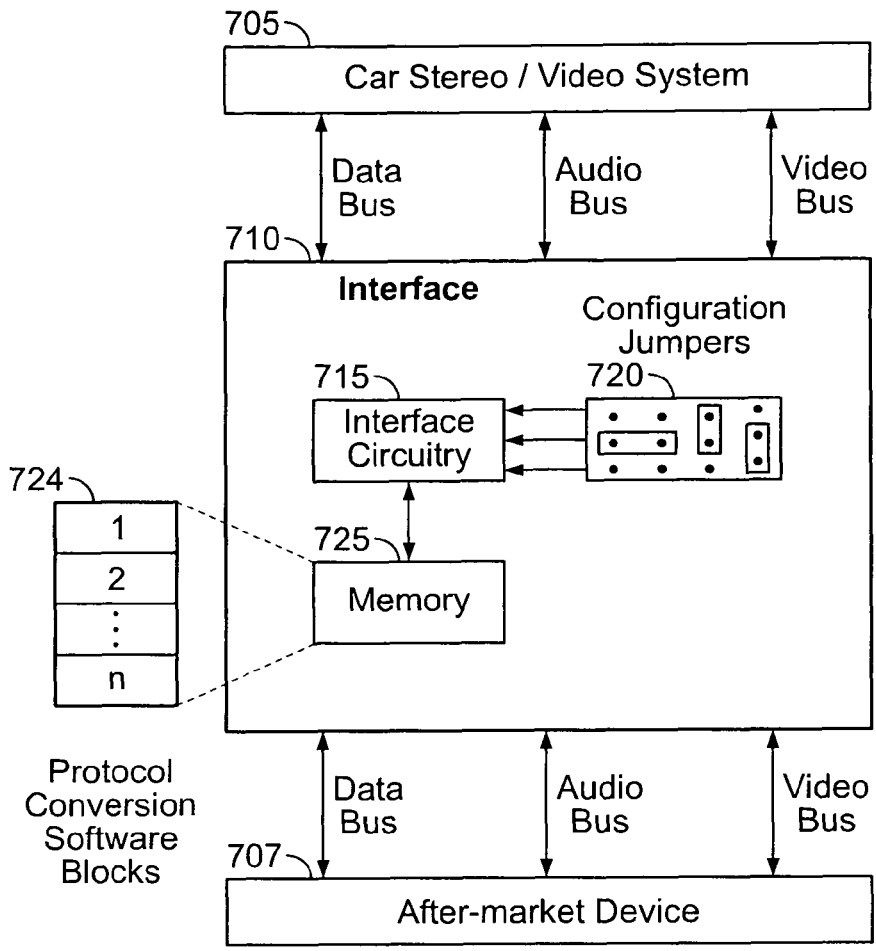
FIG. 13a is a block diagram showing an alternate embodiment of the multimedia device integration system of the present invention, wherein configuration jumpers and protocol conversion software blocks are provided for integrating after-market devices of various types using a single interface.

FIG. 13a is a block diagram showing an alternate embodiment of the multimedia device integration system 710 of the present invention, wherein configuration jumpers 720 and protocol conversion software blocks 724 are provided for integrating after-market devices of various types using a single interface. The jumpers 720 can be set to a plurality of different settings, each of which corresponds to an after-market device of a specific type (e.g., CD changer, CD player, digital media player, satellite radio, video device, cellular telephone, etc.) or from a specific manufacturer. Additionally, the jumpers 720 can be used to specify one or more device or manufacturer types for the car stereo or video system 705. The settings of the configuration jumpers 720 correspond to one or more protocol conversion software blocks 724 stored in memory (e.g., programmable flash memory, ROM, EEPROM, etc.) 725 of the interface 710. Each of the software blocks 724 controls the interface circuitry 715 and contains instructions for converting data from the device 707 into a format compatible with the car stereo or video system 705, and vice versa. For example, a first block could contain software for allowing communication between an Apple iPod and an in-dash car stereo manufactured by Sony, and a second block could contain software for allowing communication between a DVD player and a car video system. Any desired number of blocks could be stored in the memory 725 and can be selected as desired by the user via configuration jumpers 720. As such, a single interface 710 can be used for integrating numerous devices of various types and manufactures for use with one or more car stereo or video systems. The device 710 could include one or more of the circuits shown in FIGS. 3a-3d, with modifications depending upon the device types of the devices 705 and 707.

Figure 13B:
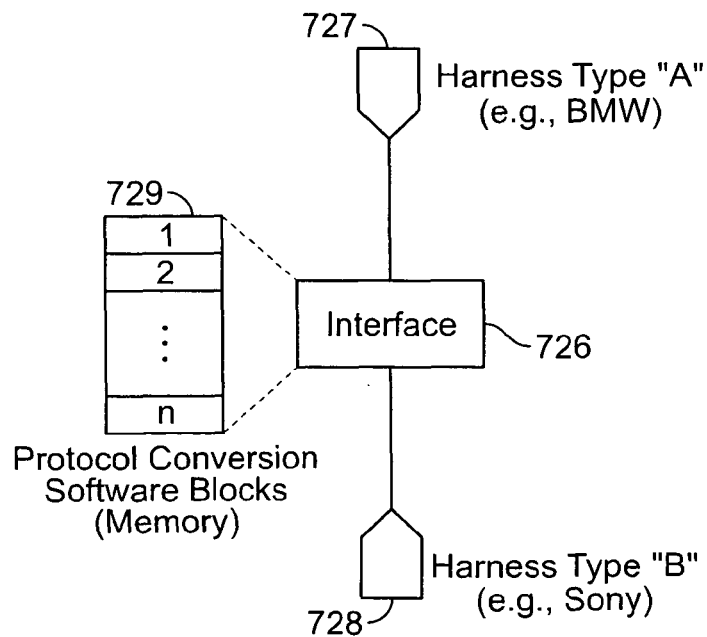
FIG. 13b is a block diagram showing an alternate embodiment of the multimedia device integration system of the present invention, wherein wiring harnesses and protocol conversion software blocks are provided for integrating after-market devices of various types using a single interface.

FIG. 13b is a block diagram showing an alternate embodiment of the multimedia device integration system of the present invention, wherein wiring harnesses 727 and 728 and protocol conversion software blocks 729 are provided for integrating multimedia devices of various types using a single interface 726. In this embodiment, the electrical configurations (pinouts) of each of the harnesses 727 and 728 correspond to car stereo/video systems and after-market devices of specific types and made by specific manufacturers (e.g., harness 727 could correspond to a BMW car stereo, and harness 728 could correspond to an ALPINE satellite tuner). The electrical configurations (pinouts) of the harnesses are utilized by the interface 726 to retrieve a specific protocol conversion software block 729 that allows communication between the devices. The interface 726 could be provided with a plurality of protocol conversion software blocks pre-loaded into memory in the interface, and could be provided with any desired harnesses. The interface 726 could include one or more of the circuits shown in FIGS. 3a-3d, with modification depending upon the device types of the devices attached to the wiring harnesses 727 and 728.

Figure 14:
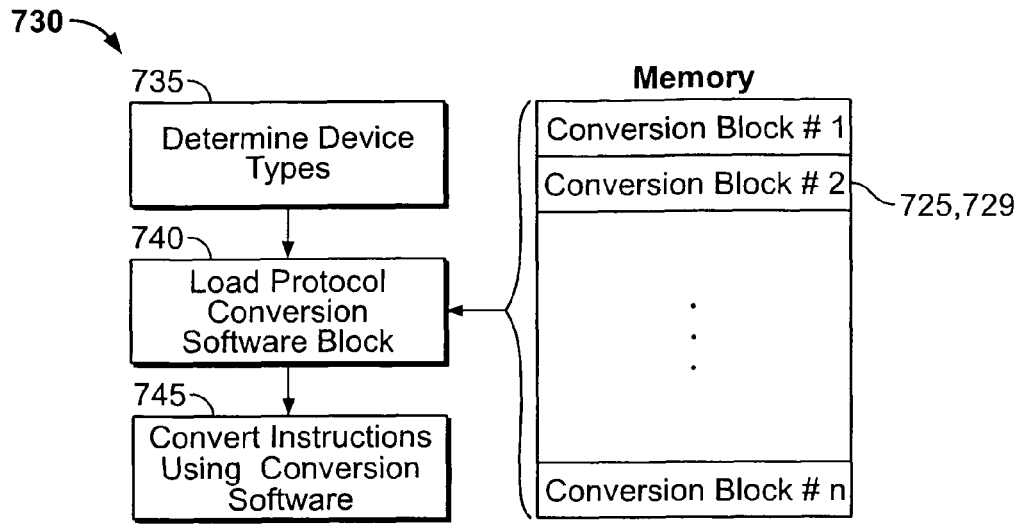
FIG. 14 is a flowchart showing processing logic of the multimedia device integration system of the present invention for integrating after-market devices of various types using a single interface.

FIG. 14 is a flowchart showing processing logic, indicated generally at 730, of the multimedia device integration system of the present invention for integrating after-market devices of various types using a single interface. In step 735, the interface determines types of devices that are connected thereto, including the car stereo or video system and one or more after-market devices to be integrated therewith. This could be achieved by the configuration jumper settings or the harness types connected to the interface and discussed with respect to FIGS. 13a and 13b. Then, in step 740, a protocol conversion software block is selected from blocks of conversion software (e.g., from the blocks 725 and 729 shown in FIGS. 13a and 13b). In step 745, instructions are converted using the selected conversion block to allow the car stereo or video system to operate with the multimedia device.

Figure 15:
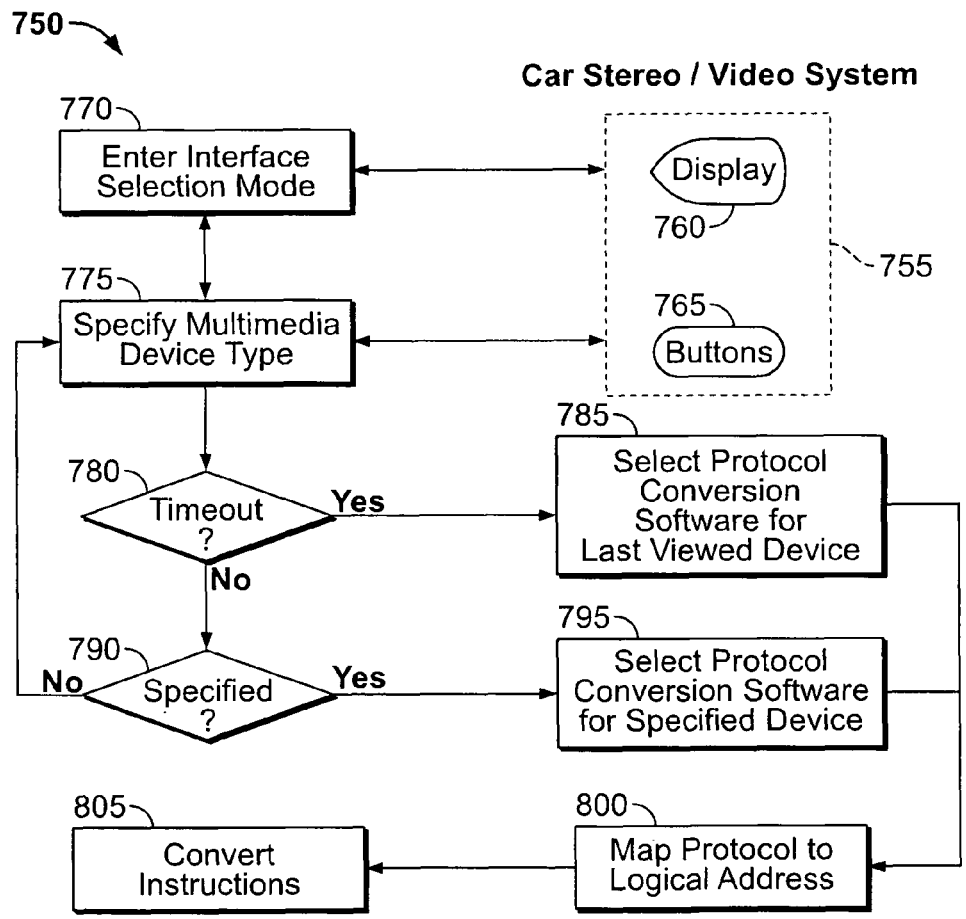
FIG. 15 is a flowchart showing processing logic of the multimedia device integration system of the present invention for allowing a user to specify one or more after-market device types for integration using a single interface.

FIG. 15 is a flowchart showing processing logic, indicated generally at 750, of the multimedia device integration system of the present invention for allowing a user to specify one or more after-market device types for integration using a single interface. In step 770, a user is provided with one or more lists of devices to be integrated, which are displayed on the display 760 of the car stereo or video device 755. Then, in step 775, using the buttons 765 of the car video device, the user can specify the type of multimedia device to be integrated (e.g., by scrolling through the lists). Additionally, the device type could be specified using a graphical or software menu displayed on the car stereo or car video system. In step 780, a determination is made as to whether a timeout has occurred (e.g., the user has not selected a device type within a predetermined period of time). If a positive determination is made, step 785 occurs, wherein a protocol conversion software block is selected from memory corresponding to the last device type displayed by the car stereo or video system. If a negative determination is made, step 790 is invoked, wherein a determination is made as to whether the user has specified a device type. If a negative determination is made, step 775 is re-invoked so that the user can specify a device type. If a positive determination is made, step 795 is invoked, wherein a protocol conversion software block is selected from memory corresponding to the device specified by the user. In step 800, the protocol conversion software block is mapped to a logical address in memory. Then, in step 805, instructions to be exchanged between the car stereo or video system and the after-market device are converted using the software block to allow communication between the devices using compatible formats. Accordingly, the logic of FIG. 15 allows a single interface having multiple protocol conversion software blocks to be used integrate a plurality of after-market devices with a car stereo or video system.

Figure 16:
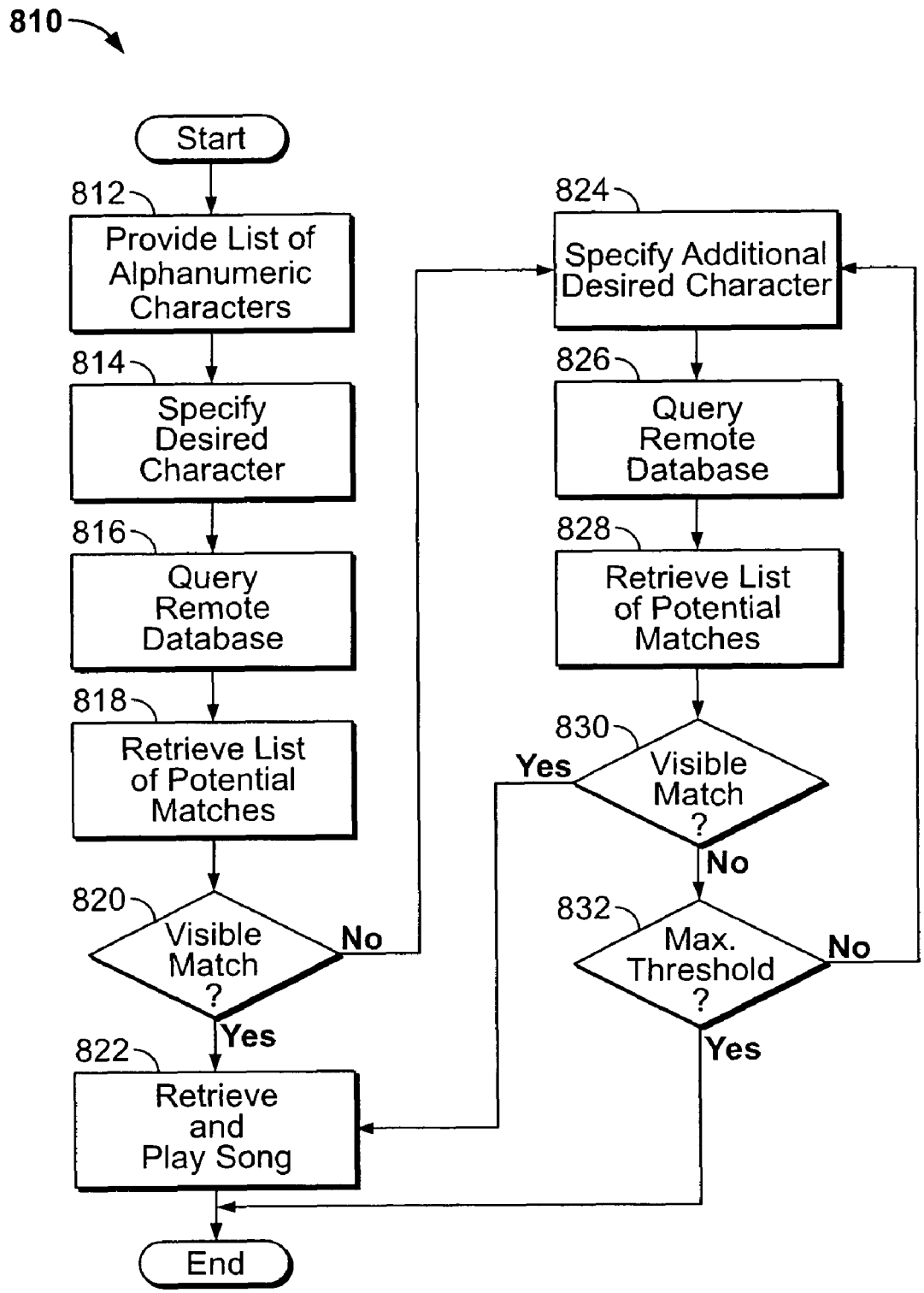
FIG. 16 is a flowchart showing processing logic of the multimedia device integration system of the present invention for allowing a user to quickly navigate through a list of songs on one or more after-market devices using the controls of a car stereo or video system.

FIG. 16 is a flowchart showing processing logic of the multimedia device integration system of the present invention, indicated generally at 810, for allowing a user to quickly navigate through a list of songs on one or more after-market devices using the controls of a car stereo or video system (fast navigation technique). This method allows a user to quickly select a song from a list of songs available on an after-market device for playing on the car stereo or video system, and could be applied for use with any type of after-market device, including, but not limited to, a digital media player such as an MP3 player or Apple iPod player. Beginning in step 812, a user is provided with a list of alphanumeric characters on a display of the car stereo or video system. This list could include the letters A through Z, as well as the numbers 0 through 9. In step 814, the user can specify a desired alphanumeric character, which can be specified by scrolling through the list using one or more controls of the car stereo or video system and pressing a button once the desired character has been highlighted, or optionally, if an alphanumeric keypad (or touchscreen interface) is provided on the car stereo or video system, the user can directly enter the desired alphanumeric character.

When the desired alphanumeric character has been specified, in step 816 a remote database is queried using the alphanumeric character. The remote database could comprise a list of songs stored in one or more after-market devices integrated by the present invention for use with the car stereo or video system. In step 818, a list of potentially matching songs is retrieved from the database and presented on the display of the car stereo or video system for perusal by the user. For example, if the user specified the letter "A," the list could include all songs in the remote database having titles (or artists) beginning with the letter "A." In step 820, a determination is made as to whether a desired song appears in the list and is immediately viewable by the user, without requiring the user to scroll through the list. If a positive determination is made, step 822 is invoked, wherein the desired song is selected by the user and retrieved from the after-market device for playing on the car stereo or video system.

In the event that a negative determination is made in step 820, step 824 is invoked, wherein the user can specify an additional alphanumeric character using the car stereo or video system. For example, if the user initially specified the letter "A" and the desired song is not visible in the list of songs without scrolling, the user can refine the query by adding an additional alphanumeric character. Thus, for example, the user can specify the letters "AN" to search for songs having titles (or artists) beginning with the letters "AN." In step 826, the remote database of the after-market device is queried using the specified letters. In step 828, a list of potential matches is presented to the user at the car stereo or video system. In step 830, a determination is made as to whether the desired song appears in the list and is immediately viewable without requiring the user to scroll through the list. If a positive determination is made, step 822 is invoked, wherein the user can select the desired song for retrieval from the after-market device and playing on the car stereo or video system. If a negative determination is made, step 832 is invoked, wherein a determination is made as to whether a threshold number of alphanumeric characters has been specified by the user. For example, a maximum threshold of 3 alphanumeric characters could be specified, or any other desired number. If a negative determination is made, steps 824-832 are re-invoked in the manner disclosed herein to allow the user to specify additional alphanumeric characters for querying the remote database. If a positive determination is made (threshold met), then processing terminates and the user must scroll through the list of retrieved songs or repeat the processing disclosed in FIG. 16 to begin a new query.

Figure 17:
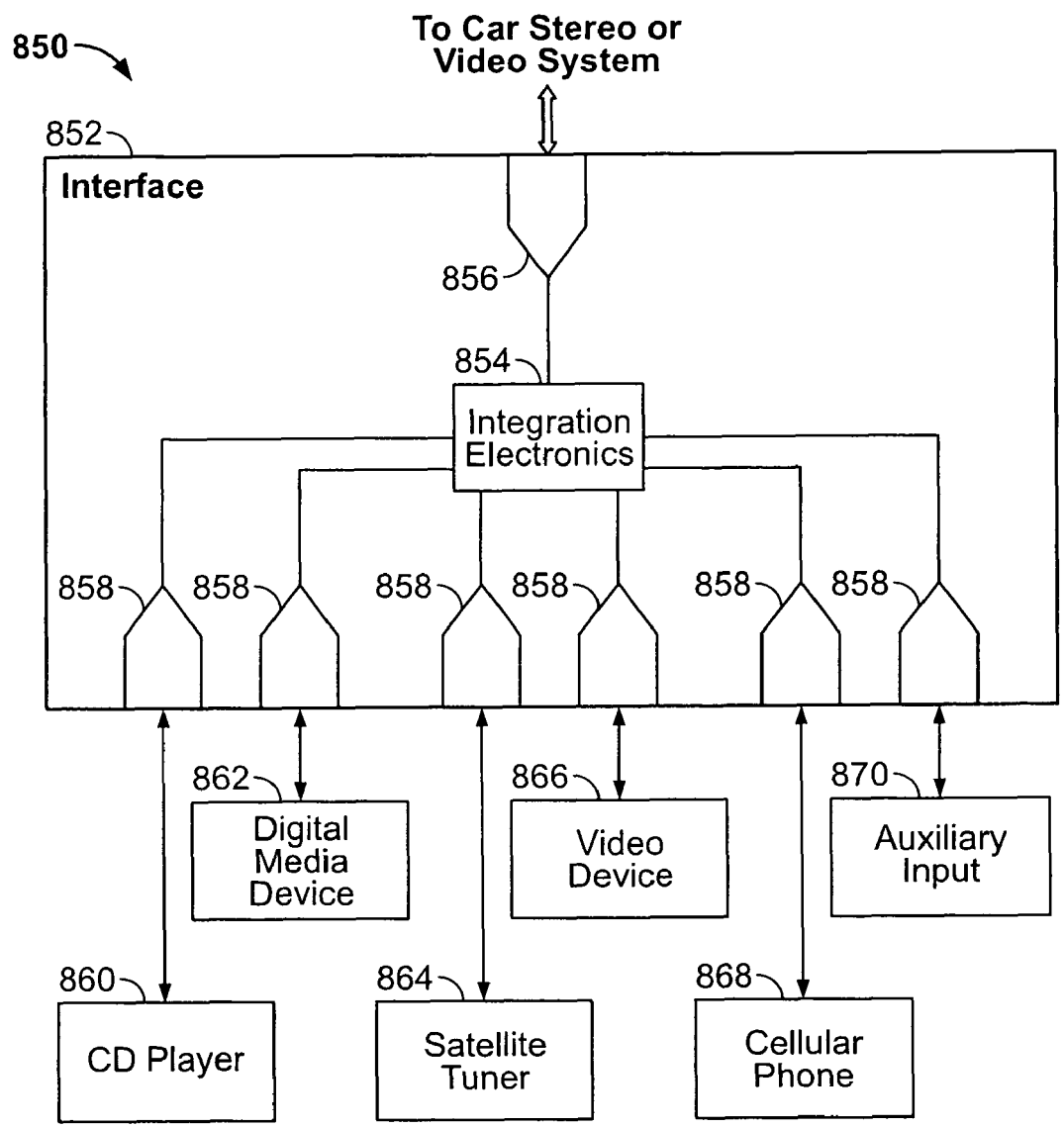
FIG. 17 is a diagram showing another embodiment of the present invention, wherein a plurality of external devices are integrated using a single interface.

FIG. 17 is a diagram showing an another embodiment of the present invention, indicated generally at 850, wherein a plurality of external devices are integrated using a single interface 852. Any desired number or combination of devices can be integrated for use with a car stereo or video system using the interface 852. The interface 852 houses a plurality of ports 858 for connecting any desired number of external devices, and a port 856 for connection with a car stereo or video system. The ports 858 and 856 could be any suitable type of input port, and could vary depending upon the types of devices to be integrated. Additionally, the interface 852 includes integration electronics 854, which could include any desired electronics disclosed herein for integrating a plurality of external devices.

As shown in FIG. 17, a CD player 860, a digital media device 862, a satellite tuner 864, a video device 866, a cellular phone 868, and an auxiliary input 870 are connected to the interface 852 and integrated for use with a car stereo or video system. The CD player 860 could comprise any desired CD player or changer. The digital media device 862 could comprise any portable digital media device, such as an Apple iPod, MP3 player, MP4, player, WMV player, portable music center, or any other desired device. The satellite tuner 864 could comprise any desired satellite tuner, such as an XM or Sirius tuner. The video device 866 could comprise any desired video device, such as a DVD player. The cellular phone 868 could comprise any cellular telephone capable of downloading and storing music or video files. The auxiliary input 870 could comprise any desired external device. Any desired number of interfaces 852 could be interconnected ("daisy-chained"). Further, the interface 852 could form part of an existing car stereo or video system. Control of the external devices connected to the interface 852 is provided through the car stereo or video system.

Figure 18:
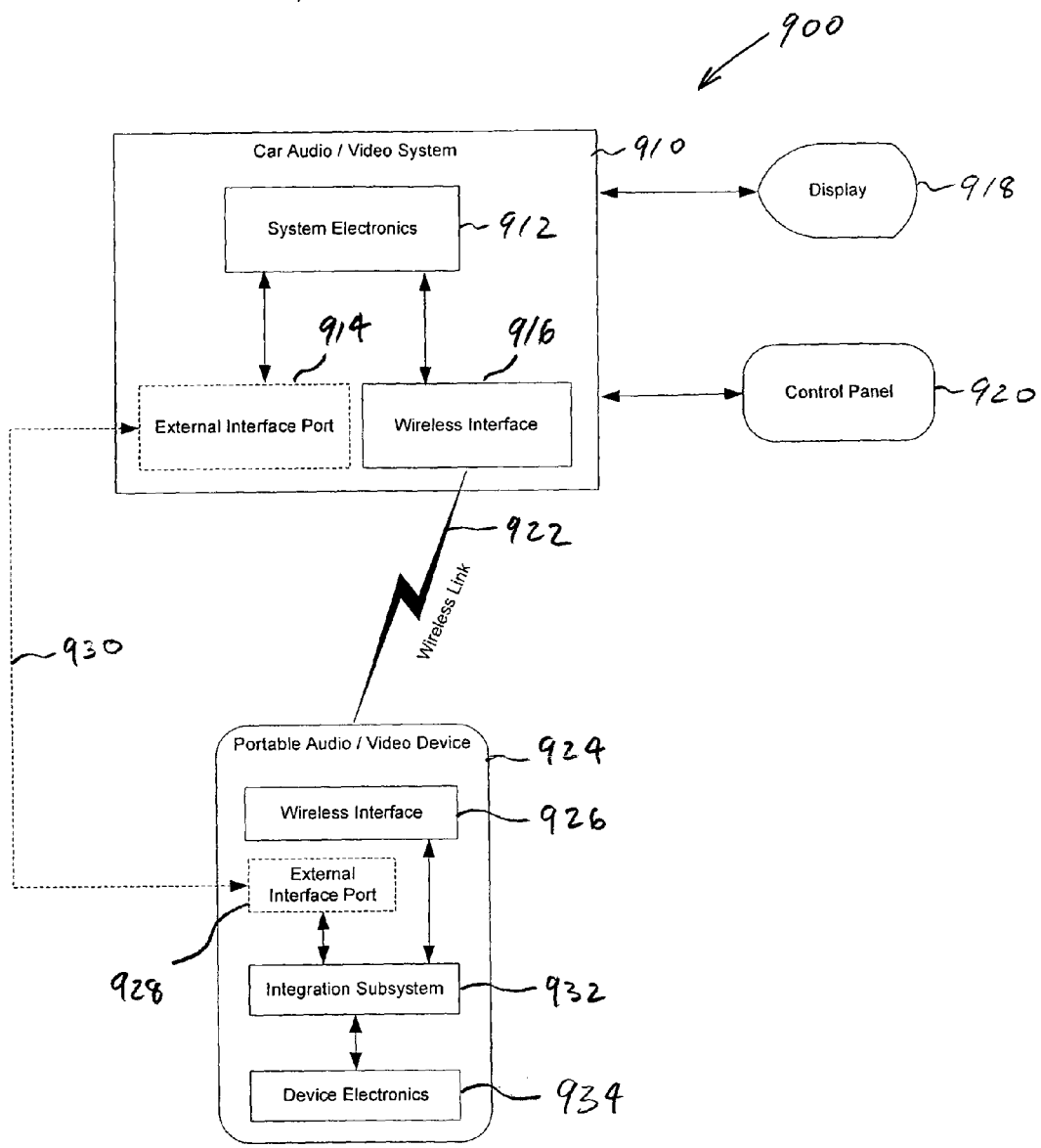
FIG. 18 is a diagram showing another embodiment of the present invention, wherein wireless integration is provided between a car audio and/or video system and a portable audio and/or video device using a wireless transceiver and an integration module positioned within the portable device.

FIG. 18 is a diagram showing another embodiment of the present invention, indicated generally at 900, wherein wireless integration is provided between a car audio and/or video system 910 and a portable audio and/or video device 924. The car system 910 could be any OEM or after-market car audio and/or video system. The portable device 924 could comprise a CD player, CD changer, digital media player (e.g., MP3 player, MP4 player, WMV player, Apple iPod, Apple video ipod), portable media center, portable media player, satellite receiver, digital audio broadcast (DAB) receiver (also commonly referred to as a high-definition (HD) radio receiver), video device (e.g., DVD player or digital media player, such as the SONY PSP digital media player), cellular telephone, or any other portable device.

The car system 910 includes system electronics 912 (e.g., circuitry and components provided by an OEM or after-market car audio and/or video system manufacturer), a display 918, a control panel 920 (e.g., buttons, touch screen display, etc.) for allowing user interaction and control, and a wireless interface or transceiver 916. The wireless interface 916 could comprise an AT76C551 Bluetooth transceiver manufactured by Atmel, Inc., which includes a Bluetooth baseband controller with an integrated digital signal processor (DSP), and an AT7024 2.4-2.5 GHz band RF front end transceiver manufactured by Atmel, Inc., which includes a low-noise amplifier and transmit/receive switch driver. Any other suitable wireless transceiver (e.g., IEEE 802.11a, 802.11b, or 802.11g) could also be substituted. The display 918 could comprise any display associated with the car system 910, including, but not limited to, a display panel, a seat-back display, a dashboard display, an LCD or plasma display, or any other display in a car or associated with a car audio and/or video system, positioned anywhere within a vehicle.

The portable device 924 includes device electronics 934 (e.g., circuitry and components provided by the portable device manufacturer), a wireless interface or transceiver 926, and an integration subsystem or module 932 positioned within the portable device 924. Optionally, the wireless interface 926 could be positioned external to the portable device 924. The wireless interface 926 is identical to the wireless interface 916, and both interfaces 916 and 926 establish a wireless communications channel or link 922 between the car system 910 and the portable device 924.

The integration subsystem 932 receives control commands that are issued at the car system 910 and wirelessly transmitted to the portable device 924 via the wireless communications link 922, processes the commands into a format compatible with the device electronics 934 of the portable device 924, and dispatches same to the device electronics 934 for execution thereby, so as to provide remote, wireless control of the portable device 924 using the car system 910. For example, a "Play" command could be entered at the car system 910 (which could be a BMW car stereo), wirelessly transmitted to the portable device 924 (which could be an Apple ipod), converted by the integration subsystem 932 into a format recognizable by the device electronics 934, and executed thereby. The integration subsystem 932 also receives data generated by the device electronics 934 (including, but not limited to, track information, artist information, song title, time information, etc.), processes same into a format compatible with the car system 910, and transmits the processed data to the car system 910 using the wireless link 922 for display thereon using the display 918. For example, playlists or other data generated by the portable device 924 could be processed by the integration subsystem 932 into a format compatible with the car system 910, and wirelessly transmitted thereto for display on the display 918.

Audio and video information generated by the portable device 924 can be transmitted digitally to the car system 910 using the wireless link 922. This information could also be transmitted via one or more analog RF carrier signals, using suitable digital-to-analog and analog-to-digital conversion circuitry known in the art. The integration subsystem 932 could also include conversion circuitry (e.g., using the video format conversion chips discussed above with respect to FIG. 12*a*) for converting video information generated by the portable device 924 for display on the display 918 of the car system 910 (e.g., by converting composite video signals to red, green, and blue (RGB) video signals, or vice versa). It should be noted that the integration subsystem 932 could also be utilized to process data, video, and audio information provided by the portable device 924 where the portable device 924 is connected to the Internet (e.g., via a wireless Internet connection established by a cellular telephone). In such circumstances, the display 918 of the car system 910 would function as an Internet browser, and the controls 920 of the car system 910 could be utilized to navigate the Internet.

The integration subsystem 932 contains circuitry similar to the circuitry disclosed in the various embodiments of the present invention discussed herein, and could include a PIC16F872 or PIC16F873 microcontroller manufactured by Microchip, Inc. and programmed in accordance with the flowchart discussed below with respect to FIG. 24. Additionally, the integration subsystem 932 generates a device presence signal for maintaining the car system 910 in a state responsive to the portable device 924. It should be noted that a non-wireless connection 930 could be provided between a optional external interfaces ports 914 and 928 of the car system 910 and the portable device 924, respectively, using any suitable wired connection type such as serial, FIREWIRE, CAN/CAN2, USB/USB2, EE Bus, T Bus, I Bus, or any other connection, to allow for wired integration between the car system 910 and the portable device 924. Additionally, the non-wireless connection 930 could include a fiber-optic connection, such as a D2B or MOST fiber-optic connection. The device presence can be transmitted to the car system 910 using the wireless link 922 or, optionally, the non-wireless connection 930.

Figure 19:
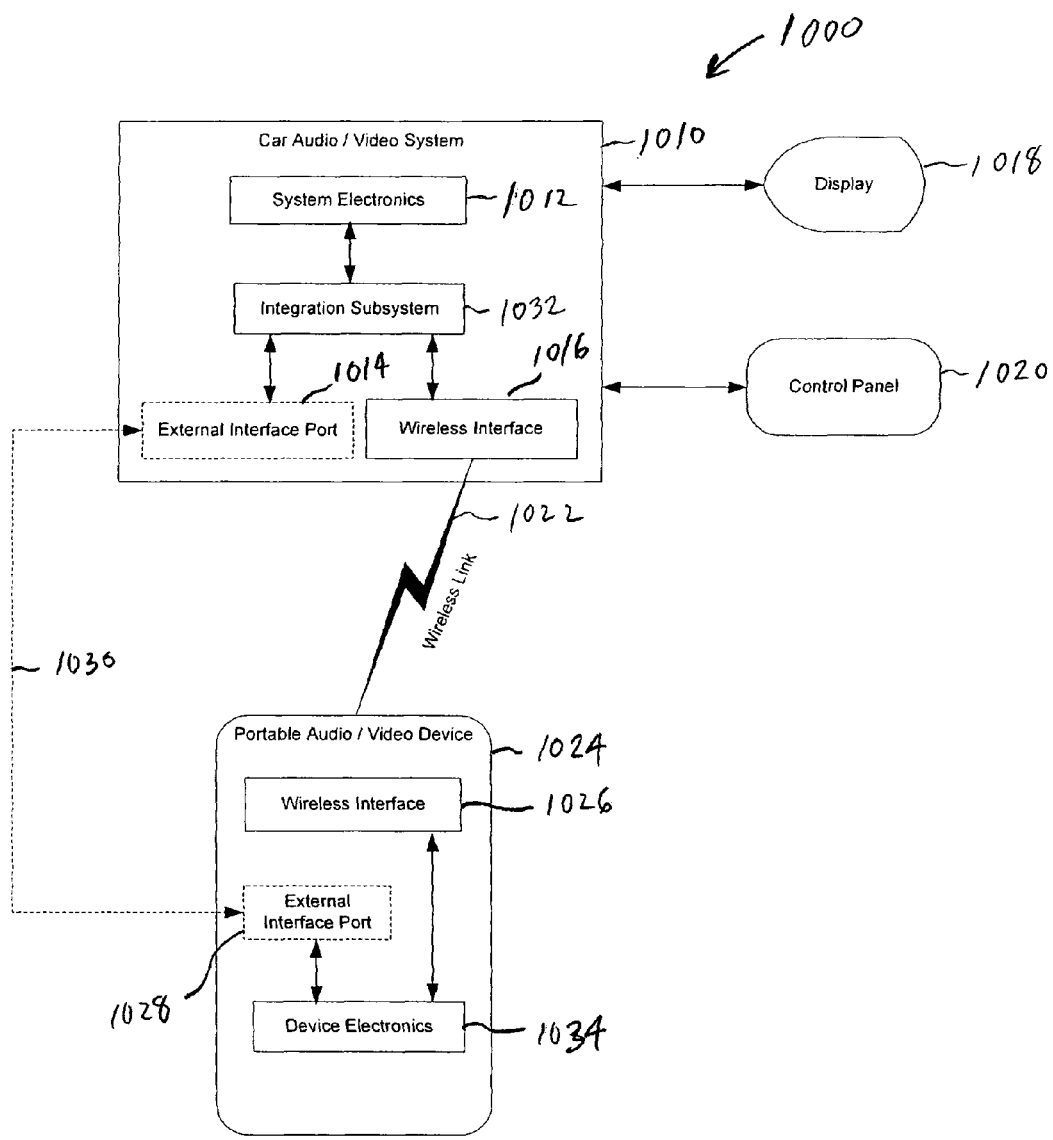
FIG. 19 is a diagram showing another embodiment of the present invention, wherein wireless integration is provided between a car audio and/or video system and a portable audio and/or video device using a wireless transceiver and an integration module positioned within the car audio and/or video system.

FIG. 19 is a diagram showing another embodiment of the present invention, indicated generally at 1000, wherein wireless integration is provided between a car audio and/or video system 1010 and a portable audio and/or video device 1024. The components shown in FIG. 19 are identical to the components shown in FIG. 18, and reference numerals of corresponding components have been increased by 100. In this embodiment, the integration subsystem 1032 is positioned internally within the car system 1010, which also includes system electronics 1012, wireless interface 1016, display 1018, control panel 1020, and, optionally, external interface port 1014. The portable device 1024 includes a wireless interface 1026 in communication with device electronics 1034, and optionally, an external interface port 1028 for communicating with the external interface port 1014 of the car system 1010 via non-wireless connection 1030.

Figure 20:
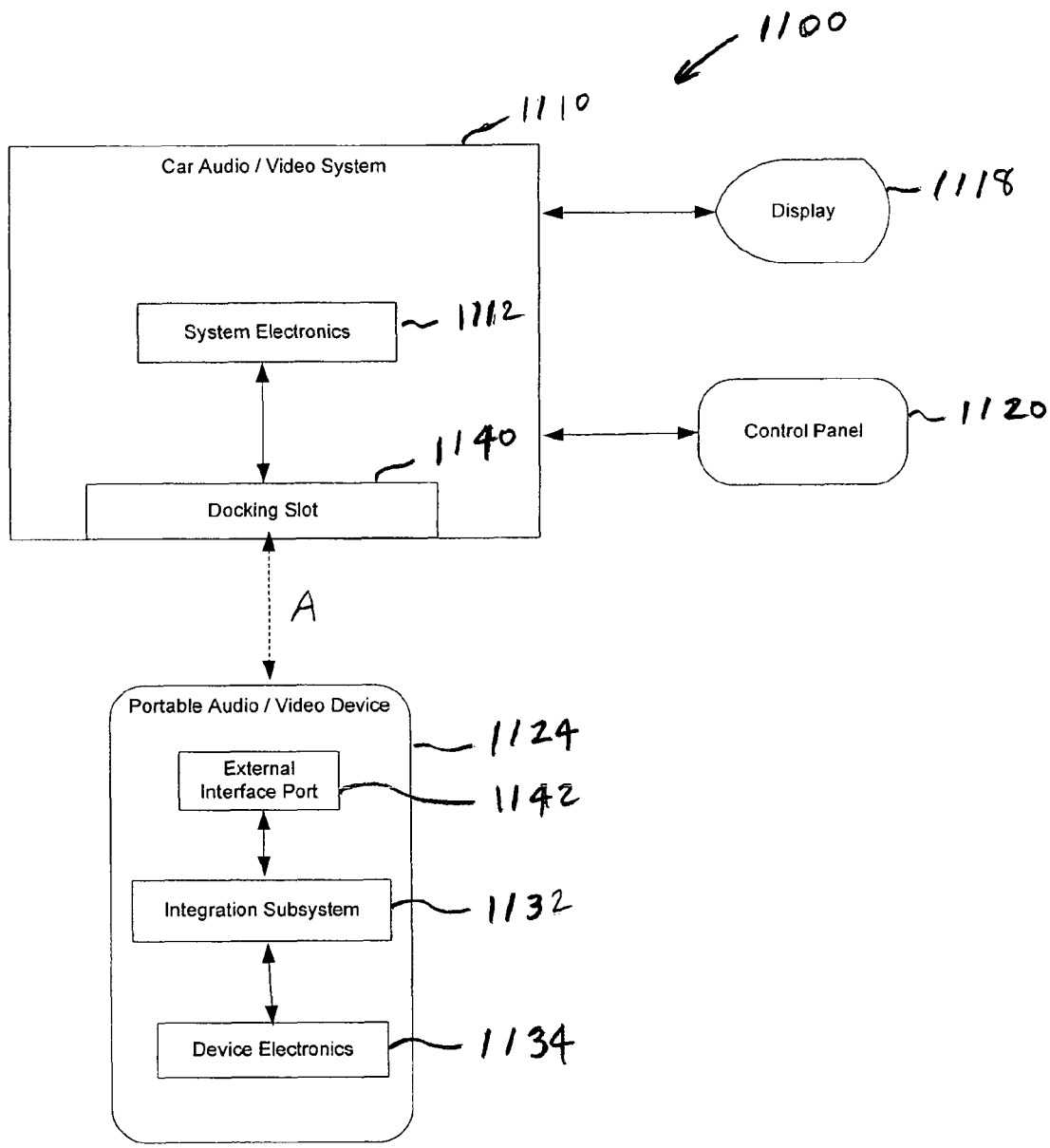
FIG. 20 is a diagram showing another embodiment of the present invention, wherein a docking slot is provided in a car audio and/or video system for receiving a portable audio and/or video device, and an integration module is positioned within the portable device.

FIG. 20 is a diagram showing another embodiment of the present invention, indicated generally at 1100, wherein a docking slot 1140 is provided in a car audio and/or video system 1110 for receiving a portable audio and/or video device 1124. The car system 1110 includes system electronics 1112 (e.g., circuitry and components provided by an OEM or after-market car audio or video system manufacturer), a display 1118, and a control panel 1120. The portable device 1124 includes an integration subsystem or module 1132, device electronics 1134 (e.g., circuitry and components provided by the manufacturer of the portable device 1124) and an external interface port 1142 that interfaces with the docking slot 1140 to allow electrical communication between the integration subsystem 1132 of the car system 1110 and the device electronics 1134 of the portable device 1124. The electrical connection formed by the external interface port 1142 and the docking slot 1140 could include a FIREWIRE, CAN/CAN2, USB/USB2, IE Bus, T Bus, or I Bus connection, or any other suitable connection type. Additionally, a fiber-optic connection could be formed between the external interface port 1142 and the docking slot 1140, using a D2B, MOST, or other suitable fiber-optic connection.

The portable device 1124 is inserted into the docking slot 1140 in the general direction indicated by arrow A. Once docked, the integration subsystem 1132 processes control commands issued at the car system 1110 into a format compatible with the portable device 1124, and processes data generated by the portable device 1124 into a format compatible with the car system 1110 in the manner described herein. Audio and video signals generated by the portable device 1124 are channeled by the integration subsystem 1132 to the system electronics 1112, for playing through the car system 1110. The portable device 1124 could comprise a digital media player (e.g., MP3 player, MP4 player, WMV player, Apple ipod, Apple video iPod, or other device), a portable media center, a portable media player, a satellite receiver, a digital audio broadcast (DAB) receiver or high-definition (HD) radio receiver, a portable video device, a cellular telephone, or any other portable device.

Figure 21:
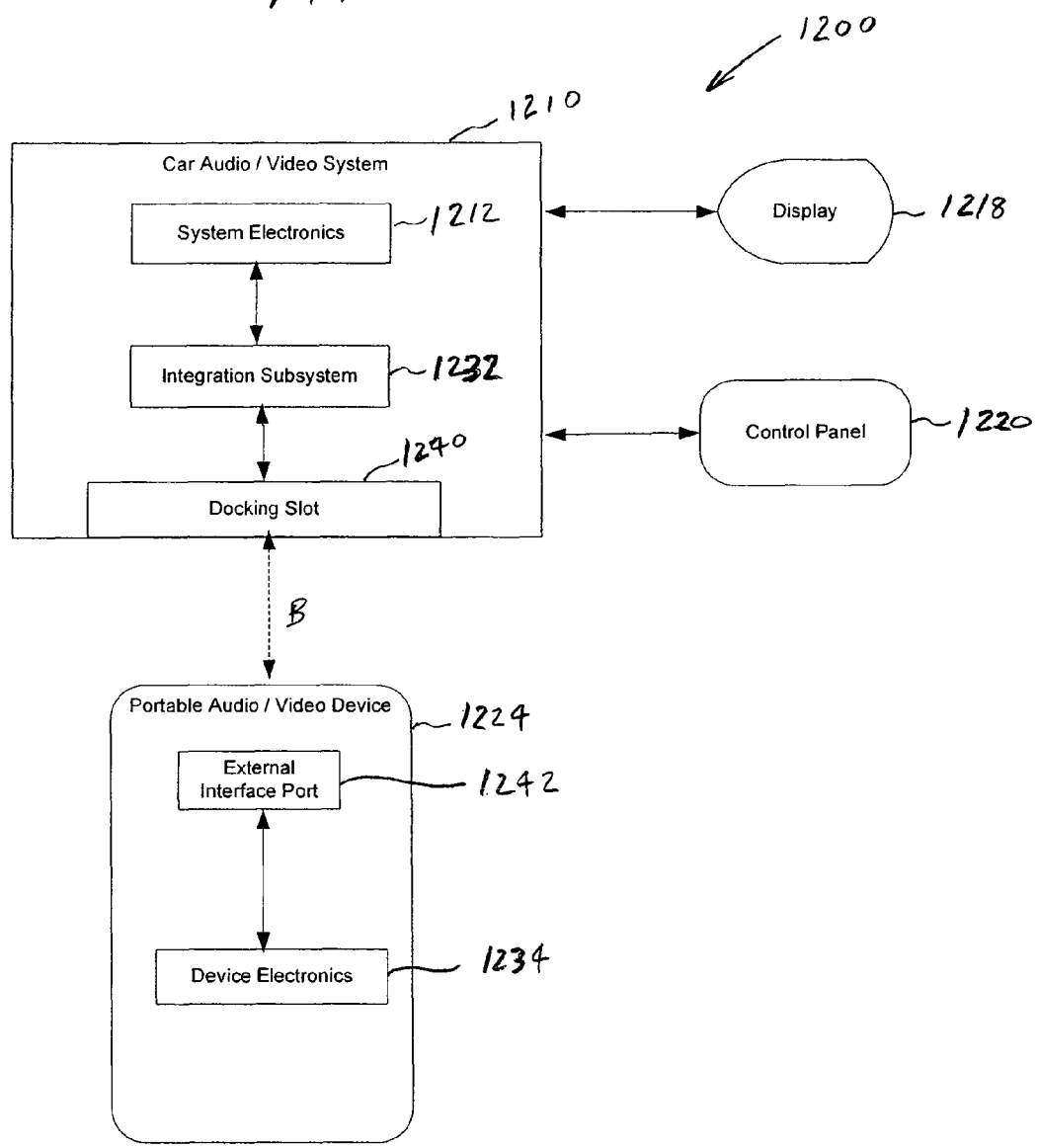
FIG. 21 is a diagram showing another embodiment of the present invention, wherein a docking slot is provided in a car audio and/or video system for receiving a portable audio and/or video device, and an integration module is positioned within the car audio and/or video system.

FIG. 21 is a diagram showing another embodiment of the present invention, indicated generally at 1200, wherein a docking slot 1240 is provided in a car audio and/or video system 1210 for receiving a portable audio and/or video device 1224. The components shown in FIG. 21 are identical to those disclosed in FIG. 20, and reference numerals of corresponding components have been increased by 100. In this embodiment, the integration subsystem 1232 is positioned within the car system 1210, which also includes system electronics 1212, display 1218, and control panel 1220. The portable device 1224 includes device electronics 1234 and an external interface port 1242 for interfacing with the docking slot 1240 and providing electrical (and/or optical) communication with the integration subsystem 1232.

Figure 22:
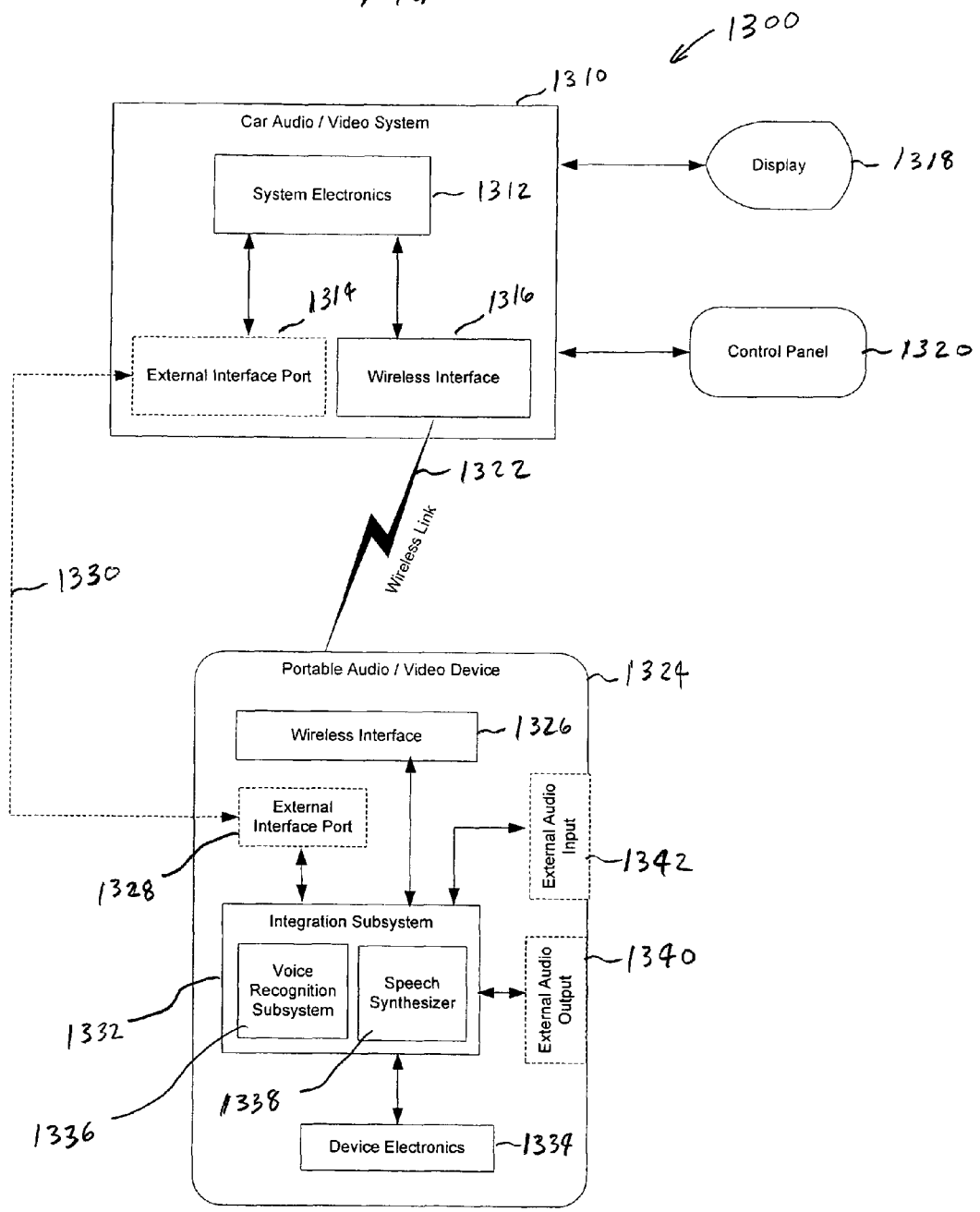
FIG. 22 is a diagram showing another embodiment of the present invention, wherein wireless integration is provided between a car audio and/or video system and a portable audio and/or video device, and the portable device includes an integration module having speech synthesis and recognition capabilities.

FIG. 22 is a diagram showing another embodiment of the present invention, indicated generally at 1300, wherein wireless integration is provided between a car audio and/or video system 1310 and a portable audio and/or video device 1324, and voice synthesis and speech recognition capabilities are provided. More particularly, the portable device 1324 includes an integration subsystem or module 1332 having a voice recognition subsystem 1336 and a speech synthesizer 1338. As with the embodiments discussed earlier with respect to FIGS. 18-19, the car system 1310 includes system electronics 1312 (e.g., circuitry and components provided by an OEM or after-market car audio or video system manufacturer), an optional external interface port 1314, a wireless interface or transceiver 1316 (which could be a Bluetooth or other suitable wireless transceiver), a display 1318, and a control panel 1320.

The portable device 1324 could comprise a CD player, CD changer, digital media player (e.g., MP3 player, MP4 player, WMV player, Apple iPod, Apple video iPod, or other device), portable media center, portable media player, satellite receiver, digital audio broadcast (DAB) receiver, high-definition (HD) radio receiver, video device (e.g., DVD player or digital media player, such as the SONY PSP digital media player), cellular telephone, or any other portable device. The portable device 1324 includes a wireless interface 1326 which communicates with the wireless interface 1316 to provide a wireless communications channel or link 1322, an optional external interface port 1328 for providing a non-wireless connection 1330 with the external interface port 1314 (which could include any suitable wired connection, such as FIREWIRE, CAN/CAN2, USB/USB2, IE Bus, T Bus, I Bus, etc., or any suitable optical connection, such as D2B or MOST), device electronics 1334, and optional external audio output 1340 and optional external audio input 1342.

The voice recognition subsystem 1336 of the integration subsystem 1332 could comprise the HM2007 speech recognition processor manufactured by Hualon Microelectric Corporation, the VRP6679 speech recognition processor manufactured by Oki, Inc., or any other suitable speech recognition processor. The voice recognition subsystem 1336 receives control commands that are spoken by a user and are transmitted to the portable device 1324 via the wireless link 1322 or the non-wireless connection 1330 (where the car system 1310 another vehicle component connected to the car system 1310 includes a microphone for receiving voice commands). Optionally, a microphone could be connected to the external audio input 1342 of the portable device 1324 for receiving voice commands. Any desired, spoken commands could be received by the integration subsystem 1332 and processed by the voice recognition subsystem 1336 into a format compatible with the device electronics 1334 of the portable device 1324 for execution thereby. For example, a user could speak a desired artist name, whereupon the voice recognition subsystem 1336 processes the spoken artist name into a digital format, passes the processed artist name to the integration subsystem 1332, and the integration subsystem 1332 constructs a query command and passes the query command to the device electronics 1334 along with the processed artist name to the device electronics 1334. The device electronics 1334 then queries the portable device 1324 for all songs (e.g., by searching ID3 tags associated with each song and stored in the portable device 1324) having a matching artist name. The resulting list is then passed to the integration subsystem 1332, whereupon the information is processed into a format compatible with the car system 1310. Then, the information is transmitted to the car system 1310 via the wireless link 1322 or the non-wireless connection 1330 for display on the display 1318 of the car system 1310.

Voice recognition could also be used to retrieve other media files, such as video clips that are stored on the portable device 1324. Such files, one retrieved, could then be processed by the integration subsystem 1332 in the manner described herein, transmitted to the car system 1310 (via the wireless link 1322 or the non-wireless connection 1330), and displayed on the display 1318 of the car system 1310. An index of such files could also be generated by the integration subsystem 1332 for quick browsing and retrieval using car system 1310 or voice commands.

The speech synthesizer 1338 provides synthesized speech corresponding to data produced by the portable device 1324. For example, track lists, artist names, song titles, and other information (e.g., video clip titles, movie titles, etc.) could be retrieved from the portable device 1324 by the integration subsystem 1332 (e.g., in response to a command issued by the user at the car system 1310 or a spoken command processed by the voice recognition subsystem 1336), and synthesized speech corresponding to the retrieved information could be generated by the speech synthesizer 1338 using known text-to-speech software. The speech synthesizer 1338 could include the RC 8650 or RC 8660 speech synthesis chipsets manufactured by RC Systems, Inc., or any other suitable speech synthesizers. Synthesized speech could be transmitted to the car system 1310 via the wireless link 1322 or the non-wireless connection 1330 and played through the car system 1310, or optionally, the speech could be channeled to an external device via the optional external audio output 1340. It should be noted that the voice recognition subsystem 1336 and the speech synthesizer 1338 could be formed on a single integrated circuit forming part of the integration subsystem 1332. Additionally, the integration subsystem 1332 provides full control of the portable device 1324 using the car system 1310 and exchange of data, audio, and video signals between the portable device 1324 and the car system 1310, in the manner described herein.

FIG. 23 is a diagram showing another embodiment of the present invention, indicated generally at 1400, wherein wireless integration is provide between a car audio and/or video system 1410 and a portable audio and/or video device 1424 and voice recognition and speech synthesis capabilities are provided. The components shown in FIG. 23 are functionally identical to the components shown in FIG. 22, and reference numerals of corresponding components have been increased by 100. In this embodiment, the integration subsystem 1432 is positioned in the car system 1410, which includes system electronics 1412, an optional external interface port 1414, a wireless interface 1416, a display 1418, and a control panel 1420. The integration subsystem 1432 includes a voice recognition subsystem 1436 and a speech synthesizer 1438, which provide the voice recognition and speech synthesis capabilities described above with reference to FIG. 22. The portable device 1424 includes a wireless interface 1426, and optional external interface port 1428, device electronics 1434, an optional external audio output port 1440, and an optional external audio input port 1442.

FIG. 24 is a flowchart showing processing logic according to the present invention, indicated generally at 1450, for wirelessly integrating a portable audio and/or video device for use with a car audio and/or video system. In step 1452, a wireless link is established between the portable device and the car audio and/or video system. As discussed above, the wireless link could be any suitable wireless communications link, such as a Bluetooth wireless link, an IEEE 802.11 link, or any other suitable link. In step 1454, the car audio and/or video system type is determined, such as the manufacturer name and/or model identifier. In step 1456, the portable audio and/or video device type is identified, such as the manufacturer name and/or model identifier. In step 1458, a protocol conversion software block is loaded from memory, based upon the corresponding device types of the car audio and/or video system and the portable audio and/or video device. The protocol conversion software block includes code for converting commands issued at the car audio and/or video system into a format compatible with the portable audio and/or video device, as well as code for converting data generated by the portable audio and/or video device into a format compatible with the car audio and/or video system.

In step 1460, data generated by the portable audio and/or video device is processed by the protocol conversion software block. Then, in step 1466, the processed data is transmitted to the car audio and/or video system for display thereon, using the wireless link. In step 1462, audio and/or video signal generated by the portable audio and/or video device are channeled to the car audio and/or video system using the wireless link. In step 1464, a determination is made as to whether commands from the car audio and/or video system are to be processed. If a negative determination is made, step 1458 is re-invoked. Otherwise, step 1468 is invoked, wherein the commands are processed using the protocol conversion software block. Then, in step 1470, the processed commands are transmitted to the car audio and/or video system using the wireless link. Step 1458 is then re-invoked, so that additional processing can occur.

Importantly, the present invention allows video files in any format (including video clips, movies, pictures, etc.) that are stored on a portable device to be displayed on one or more displays of a car audio and/or video system, and playback of such files to be controlled using the car audio and/or video system. Examples of such files include, but are not limited to, MPEG, WMV, AVI, JPEG, GIF, TIFF, MP4, or any other suitable video format. Such files could be stored on a cell phone, a portable media center, a portable media player, or any other portable device which is integrated by the present invention (through a wired or wireless connection) for use with a car audio and/or video system. Thus, for example, a video clip downloaded to a cellular telephone or a video clip stored on a portable device (e.g., an Apple video ipod) can be displayed on one or more displays of a car audio and/or video system. Further, the present invention allows for live video streams, such as live television video received by a cellular telephone or other portable device, to be displayed on one or more displays of the car audio and/or video system.

Having thus described the invention in detail, it is to be understood that the foregoing description is not intended to limit the spirit and scope thereof.

What is claimed is:

1. A multimedia device integration system, comprising:
   an integration subsystem in communication with a portable device, the portable device external to a car audio/video system; and
   a first wireless interface in communication with said integration subsystem, said first wireless interface establishing a wireless communication link with a second wireless interface in communication with the car audio/video system,
   wherein said integration subsystem obtains information about an audio file stored on the portable device, transmits the information over said wireless communication link to the car audio/video system for subsequent display of the information on a display of the car audio/video system, instructs the portable device to play the audio file in response to a user selecting the audio file using controls of the car audio/video system, and transmits audio generated by the portable device over said wireless communication link to the car audio/video system for playing on the car audio/video system.

2. The system of claim 1, wherein said integration subsystem is positioned within the portable device.

3. The system of claim 2, wherein said first wireless interface is positioned within the portable device.

4. The system of claim 3, wherein said second wireless interface is positioned within the car audio/video system.

5. The system of claim 1, wherein said integration subsystem receives, over said wireless communication link, a control command issued at the car audio/video system in a format incompatible with the portable device, processes the control command into a formatted command compatible with the portable device, and dispatches the processed control command to the portable device for execution thereby.

6. The system of claim 1, wherein said integration subsystem receives data generated by the portable device in a format incompatible with the car audio/video system, processes the data into formatted data compatible with the car audio/video system, and transmits the processed data to the car audio/video system over the wireless communication link for subsequent display of the processed data on a display of the car audio/video system.

7. The system of claim 1, wherein said integration subsystem further comprises a voice recognition subsystem for receiving and processing spoken control commands issued by a user.

8. The system of claim 7, wherein said integration subsystem instructs said portable device to play a desired file in response to a spoken command processed by the voice recognition subsystem.

9. The system of claim 1, wherein said integration subsystem further comprises a speech synthesizer for generating synthesized speech corresponding to data generated by the portable device.

10. The system of claim 9, wherein said integration subsystem transmits the synthesized speech to the car audio/video system over said wireless communication link for subsequent playing of the synthesized speech by the car audio/video system.

11. The system of claim 1, wherein said integration subsystem generates a device presence signal and transmits the device presence signal to the car audio/video system over said wireless communications link to maintain the car audio/video system in a state responsive to the portable device.

12. The system of claim 1, wherein the portable device comprises a portable receiver.

13. The system of claim 12, wherein the portable receiver comprises a digital audio broadcast (DAB) receiver, a high-definition (HD) radio receiver, or a satellite receiver.

14. The system of claim 1, wherein the portable device comprises a portable digital media player.

15. The system of claim 14, wherein the portable digital media player comprises a video device, a portable media center, a portable media player, an MP3 player, an MP4 player, a WMV player, an Apple iPod, or an Apple video iPod.

16. The system of claim 1, wherein the portable device comprises a cellular telephone.

17. The system of claim 1, further comprising a non-wireless connection established between the car audio/video system and the portable device.

18. The system of claim 1, wherein said integration subsystem transmits, over said wireless communication link, information about a video file stored on the portable device to the car audio/video system for subsequent display of the information on a display of the car audio/video system, instructs the portable device to play the video file in response to a user selecting the video file using controls of the car audio/video system, and transmits video generated by the portable device over said wireless communication link to the car audio/video system for playing on the car audio/video system.

19. The system of claim 18, wherein the video file comprises a movie stored on the portable device.

20. The system of claim 18, wherein the video file comprises a picture stored on the portable device.

21. The system of claim 18, wherein the video file comprises a video clip stored on the portable device.

22. The system of claim 18, wherein said integration subsystem receives video generated by the portable device in a first format incompatible with the car audio/video system, processes the video into processed video in a second format compatible with the car audio/video system, and transmits the processed video over the wireless communication link to the car audio/video system for subsequent display of the processed video on a display of the car audio/video system.

23. The system of claim 1, wherein the audio file comprises a song stored on the portable device.

24. The system of claim 1, wherein the portable device is connected to the Internet, and said integration device processes information generated by the portable device and transmits processed information to the car audio/video system so that the display of the car audio/video system operates as an Internet browser.

25. A multimedia device integration system, comprising:
   an integration subsystem in communication with a portable device, the portable device external to a car audio/video system; and
   a first wireless interface in communication with said integration subsystem, said first wireless interface establishing a wireless communication link with a second wireless interface in communication with the car audio/video system,
   wherein said integration subsystem obtains information about an audio file received by the portable device, transmits the information over said wireless communication link to the car audio/video system for subsequent display of the information on a display of the car audio/video system, instructs the portable device to play the audio file in response to a user selecting the audio file using controls of the car audio/video system, and transmits audio generated by the portable device over said wireless communication link to the car audio/video system for playing on the car audio/video system.

26. The system of claim 25, wherein said integration subsystem is positioned within the portable device.

27. The system of claim 26, wherein said first wireless interface is positioned within the portable device.

28. The system of claim 27, wherein said second wireless interface is positioned within the car audio/video system.

29. The system of claim 25, wherein said integration subsystem receives a control command issued at the car audio/video system in a format incompatible with the portable device, processes the control command into a formatted command compatible with the portable device, and dispatches the processed control command to the portable device for execution thereby.

30. The system of claim 25, wherein said integration subsystem receives data generated by the portable device in a format incompatible with the car audio/video system, processes the data into formatted data compatible with the car audio/video system, and transmits the processed data to the car audio/video system over the wireless communication link for subsequent display of the processed data on a display of the car audio/video system.

31. The system of claim 25, wherein said integration subsystem further comprises a voice recognition subsystem for receiving and processing spoken control commands issued by a user.

32. The system of claim 31, wherein said integration subsystem instructs said portable device to play a desired file in response to a spoken command processed by the voice recognition subsystem.

33. The system of claim 25, wherein said integration subsystem further comprises a speech synthesizer for generating synthesized speech corresponding to data generated by the portable device.

34. The system of claim 33, wherein said integration subsystem transmits the synthesized speech to the car audio/video system over said wireless communication link for subsequent playing of the synthesized speech by the car audio/video system.

35. The system of claim 25, wherein said integration subsystem generates a device presence signal and transmits the device presence signal to the car audio/video system over said wireless communications link to maintain the car audio/video system in a state responsive to the portable device.

36. The system of claim 25, wherein the portable device comprises a portable receiver.

37. The system of claim 36, wherein the portable receiver comprises a digital audio broadcast (DAB) receiver, a high-definition (HD) radio receiver, or a satellite receiver.

38. The system of claim 25, wherein the portable device comprises a portable digital media player.

39. The system of claim 38, wherein the portable digital media player comprises a video device, a portable media center, a portable media player, an MP3 player, an MP4 player, a WMV player, an Apple iPod, or an Apple video iPod.

40. The system of claim 25, wherein the portable device comprises a cellular telephone.

41. The system of claim 25, further comprising a non-wireless connection established between the car audio/video system and the portable device.

42. The system of claim 25, wherein said integration subsystem transmits, over said wireless communication link, information about a video file received by the portable device to the car audio/video system for subsequent display of the information on a display of the car audio/video system, instructs the portable device to play the video file in response to a user selecting the video file using controls of the car audio/video system, and transmits video generated by the portable device over said wireless communication link to the car audio/video system for playing on the car audio/video system.

43. The system of claim 42, wherein the video file comprises a streaming movie received by the portable device.

44. The system of claim 42, wherein the video file comprises a picture received by the portable device.

45. The system of claim 42, wherein the video file comprises a streaming video clip received by the portable device.

46. The system of claim 25, wherein said integration subsystem receives video generated by the portable device in a first format incompatible with the car audio/video system, processes the video into processed video in a second format compatible with the car audio/video system, and transmits the processed video over the wireless communication link to the car audio/video system for subsequent display of the processed video on a display of the car audio/video system.

47. The system of claim 25, wherein the audio file comprises a song received by the portable device.

48. The system of claim 25, wherein the portable device is connected to the Internet, and said integration device processes information generated by the portable device and transmits processed information to the car audio/video system so that the display of the car audio/video system operates as an Internet browser.

49. A multimedia device integration system, comprising:
an integration subsystem in communication with a car audio/video system; and
a first wireless interface in communication with said integration subsystem, said first wireless interface establishing a wireless communication link with a second wireless interface in communication with a portable device external to the car audio/video system,
wherein said integration subsystem obtains, using said wireless communication link, information about an audio file stored on the portable device, transmits the information to the car audio/video system for subsequent display of the information on a display of the car audio/video system, instructs the portable device to play the audio file in response to a user selecting the audio file using controls of the car audio/video system, and receives audio generated by the portable device over said wireless communication link for playing on the car audio/video system.

50. The system of claim 49, wherein said integration subsystem is positioned within the car audio/video system.

51. The system of claim 50, wherein said first wireless interface is positioned within the car audio/video system.

52. The system of claim 51, wherein said second wireless interface is positioned within the portable device.

53. The system of claim 49, wherein said integration subsystem receives a control command issued at the car audio/video system in a format incompatible with the portable device, processes the control command into a formatted command compatible with the portable device, and dispatches the processed control command to the portable device for execution thereby.

54. The system of claim 49, wherein said integration subsystem receives data generated by the portable device in a format incompatible with the car audio/video system, processes the data into formatted data compatible with the car audio/video system, and transmits the processed data to the car audio/video system for subsequent display of the processed data on a display of the car audio/video system.

55. The system of claim 49, wherein said integration subsystem further comprises a voice recognition subsystem for receiving and processing spoken control commands issued by a user.

56. The system of claim 49, wherein said integration subsystem generates a device presence signal and transmits the device presence signal to the car audio/video system to maintain the car audio/video system in a state responsive to the portable device.

57. The system of claim 49, wherein said integration subsystem instructs said portable device to play a desired file in response to a spoken command processed by the voice recognition subsystem.

58. The system of claim 49, wherein said integration subsystem further comprises a speech synthesizer for generating synthesized speech corresponding to data generated by the portable device.

59. The system of claim 58, wherein said integration subsystem transmits the synthesized speech to the car audio/video system for subsequent playing of the synthesized speech by the car audio/video system.

60. The system of claim 49, wherein the portable device comprises a portable receiver.

61. The system of claim 60, wherein the portable receiver comprises a digital audio broadcast (DAB) receiver, a high-definition (HD) radio receiver, or a satellite receiver.

62. The system of claim 49, wherein the portable device comprises a portable digital media player.

63. The system of claim 62, wherein the portable digital media player comprises a video device, a portable media center, a portable media player, an MP3 player, an MP4 player, a WMV player, an Apple iPod, or an Apple video iPod.

64. The system of claim 49, wherein the portable device comprises a cellular telephone.

65. The system of claim 49, further comprising a non-wireless connection established between the car audio/video system and the portable device.

66. The system of claim 49, wherein said integration subsystem obtains, using said wireless communication link, information about a video file stored on the portable device for subsequent display of the information on a display of the car audio/video system, instructs the portable device to play the video file in response to a user selecting the video file using controls of the car audio/video system, and receives video generated by the portable device over said wireless communication link for playing on the car audio/video system.

67. The system of claim 66, wherein the video file comprises a movie stored on the portable device.

68. The system of claim 66, wherein the video file comprises a picture stored on the portable device.

69. The system of claim 66, wherein the video file comprises a video clip stored on the portable device.

70. The system of claim 66, wherein said integration subsystem receives video generated by the portable device in a first format incompatible with the car audio/video system, processes the video into processed video in a second format compatible with the car audio/video system, and transmits the processed video to the car audio/video system for subsequent display of the processed video on a display of the car audio/video system.

71. The system of claim 49, wherein the audio file comprises a song stored on the portable device.

72. The system of claim 49, wherein the portable device is connected to the Internet, and said integration device processes information generated by the portable device and transmits processed information to the car audio/video system so that the display of the car audio/video system operates as an Internet browser.

73. A multimedia device integration system, comprising:
an integration subsystem in communication with a car audio/video system; and
a first wireless interface in communication with said integration subsystem, said first wireless interface establishing a wireless communication link with a second wireless interface in communication with a portable device external to the car audio/video system,
wherein said integration subsystem obtains, using said wireless communication link, information about an audio file received by the portable device, transmits the information to the car audio/video system for subsequent display of the information on a display of the car audio/video system, instructs the portable device to play the audio file in response to a user selecting the audio file using controls of the car audio/video system, and receives audio generated by the portable device over said wireless communication link for playing on the car audio/video system.

74. The system of claim 73, wherein said integration subsystem is positioned within the car audio/video system.

75. The system of claim 74, wherein said first wireless interface is positioned within the car audio/video system.

76. The system of claim 75, wherein said second wireless interface is positioned within the portable device.

77. The system of claim 73, wherein said integration subsystem receives a control command issued at the car audio/video system in a format incompatible with the portable device, processes the control command into a formatted command compatible with the portable device, and dispatches the processed control command to the portable device for execution thereby.

78. The system of claim 73, wherein said integration subsystem receives data generated by the portable device in a format incompatible with the car audio/video system, processes the data into formatted data compatible with the car audio/video system, and transmits the processed data to the car audio/video system for subsequent display of the processed data on a display of the car audio/video system.

79. The system of claim 73, wherein said integration subsystem further comprises a voice recognition subsystem for receiving and processing spoken control commands issued by a user.

80. The system of claim 79, wherein said integration subsystem instructs said portable device to play a desired file in response to a spoken command processed by the voice recognition subsystem.

81. The system of claim 73, wherein said integration subsystem further comprises a speech synthesizer for generating synthesized speech corresponding to data generated by the portable device.

82. The system of claim 81, wherein said integration subsystem transmits the synthesized speech to the car audio/video system for subsequent playing of the synthesized speech by the car audio/video system.

83. The system of claim 73, wherein said integration subsystem generates a device presence signal and transmits the device presence signal to the car audio/video system to maintain the car audio/video system in a state responsive to the portable device.

84. The system of claim 73, wherein the portable device comprises a portable receiver.

85. The system of claim 84, wherein the portable receiver comprises a digital audio broadcast (DAB) receiver, a high-definition (HD) radio receiver, or a satellite receiver.

86. The system of claim 73, wherein the portable device comprises a portable digital media player.

87. The system of claim 86, wherein the portable digital media player comprises a video device, a portable media center, a portable media player, an MP3 player, an MP4 player, a WMV player, an Apple iPod, or an Apple video iPod.

88. The system of claim 73, wherein the portable device comprises a cellular telephone.

89. The system of claim 73, further comprising a non-wireless connection established between the car audio/video system and the portable device.

90. The system of claim 89, wherein the video file comprises a streaming movie received by the portable device.

91. The system of claim 89, wherein the video file comprises a picture received by the portable device.

92. The system of claim 89, wherein the video file comprises a streaming video clip received by the portable device.

93. The system of claim 89, wherein said integration subsystem receives video generated by the portable device in a first format incompatible with the car audio/video system, processes the video into processed video in a second format compatible with the car audio/video system, and transmits the processed video to the car audio/video system for subsequent display of the processed video on a display of the car audio/video system.

94. The system of claim 73, wherein said integration subsystem obtains, over said wireless communication link, information about a video file received by the portable device for subsequent display of the information on a display of the car audio/video system, instructs the portable device to play the video file in response to a user selecting the video file using controls of the car audio/video system, and receives video generated by the portable device over said wireless communication link for playing on the car audio/video system.

95. The system of claim 73, wherein the audio file comprises a song stored on the portable device.

96. The system of claim 73, wherein the portable device is connected to the Internet, and said integration device processes information generated by the portable device and transmits processed information to the car audio/video system so that the display of the car audio/video system operates as an Internet browser.

97. A multimedia device integration system, comprising:
first and second wireless interfaces establishing a wireless communication link between a car audio/video system and a portable device external to the car audio/video system; and
an integration subsystem in communication with said wireless communication link,
wherein said integration subsystem channels audio generated by the portable device to the car audio/video system using the wireless communication link for subsequent playing of the audio on the car audio/video system, the audio corresponding to an audio file played by the portable device, and
wherein said integration subsystem receives a control command issued by a user through one or more controls of the car audio/video system in a format incompatible with the portable device, processes the control command into a formatted command compatible with the portable device, and dispatches the formatted command to the portable device for execution thereby.

98. The system of claim 97, wherein said integration subsystem is positioned within the portable device.

99. The system of claim 97, wherein said integration subsystem is positioned within the car audio/video system.

100. The system of claim 97, where the audio file is stored on the portable device.

101. The system of claim 97, wherein the audio file is received by the portable device.

102. The system of claim 97, wherein said integration subsystem further comprises a voice recognition subsystem for receiving and processing spoken control commands issued by the user.

103. The system of claim 102, wherein said integration subsystem instructs said portable device to play a desired file in response to a spoken command processed by the voice recognition subsystem.

104. The system of claim 97, wherein said integration subsystem further comprises a speech synthesizer for generating synthesized speech corresponding to data generated by the portable device.

105. The system of claim 104, wherein said integration subsystem transmits the synthesized speech to the car audio/video system for subsequent playing of the synthesized speech by the car audio/video system.

106. The system of claim 97, wherein said integration subsystem generates a device presence signal and transmits the device presence signal to the car audio/video system to maintain the car audio/video system in a state responsive to the portable device.

107. The system of claim 97, wherein the portable device comprises a portable receiver.

108. The system of claim 107, wherein the portable receiver comprises a digital audio broadcast (DAB) receiver, a high-definition (HD) radio receiver, or a satellite receiver.

109. The system of claim 97, wherein the portable device comprises a portable digital media player.

110. The system of claim 109, wherein the portable digital media player comprises a video device, a portable media center, a portable media player, an MP3 player, an MP4 player, a WMV player, an Apple iPod, or an Apple video iPod.

111. The system of claim 97, wherein the portable device comprises a cellular telephone.

112. The system of claim 97, further comprising a non-wireless connection established between the car audio/video system and the portable device.

113. The system of claim 97, wherein said integration subsystem channels video generated by the portable device to the car audio/video system over the wireless communication link for subsequent playing of the audio on the car audio/video system, the video corresponding to a video file played by the portable device.

114. The system of claim 113, wherein the video file comprises a movie stored on the portable device.

115. The system of claim 113, wherein the video file comprises a picture stored on the portable device.

116. The system of claim 113, wherein the video file comprises a video clip stored on the portable device.

117. The system of claim 113, wherein the video file comprises streaming video received by the portable device.

118. The system of claim 113, wherein the video file comprises a navigation map generated by the portable device.

119. The system of claim 113, wherein said integration subsystem receives video generated by the portable device in a first format incompatible with the car audio/video system, processes the video into processed video in a second format compatible with the car audio/video system, and transmits the processed video to the car audio/video system for subsequent display of the processed video on a display of the car audio/video system.

120. A multimedia device integration system, comprising:
first and second wireless interfaces establishing a wireless communication link between a car audio/video system and a portable device external to the car audio/video system; and an integration subsystem in communication with said wireless communication link, wherein said integration subsystem instructs the portable device to play an audio file in response to a user selecting the audio file using controls of the car audio/video system, wherein said integration subsystem channels audio generated by the portable device to the car audio/video system using the wireless communication link for subsequent playing of the audio on the car audio/video system, the audio corresponding to the audio file played by the portable device, and wherein said integration subsystem receives data generated by the portable device in a format incompatible with the car audio/video system, processes the data into formatted data compatible with the car audio/video system, and transmits the processed data to the car audio/video system for subsequent display of the processed data on a display of the car audio/video system.

121. A method of playing a media file on an entertainment system installed in a vehicle, the method comprising:

establishing a first communication link between an integration subsystem and a portable device, the portable device being configured to store the media file or to receive the media file, the portable device being external to the entertainment system installed in the vehicle;

establishing a second wireless link between the integration subsystem and the entertainment system installed in the vehicle;

receiving, at the integration subsystem, a command to play the media file from a user of the entertainment system, the command being entered by the user through one or more controls of the entertainment system;

in response to the command, sending a signal from the integration subsystem to the portable device, the signal causing the portable device to play the media file;

receiving, at the integration subsystem, a first signal containing audio generated by the portable device from the media file;

sending, from the integration subsystem, a second signal containing the audio to the entertainment system, thereby causing the entertainment system to play the audio.

* * * * *